US008607052B2

(12) United States Patent
Nakano et al.

(10) Patent No.: US 8,607,052 B2
(45) Date of Patent: Dec. 10, 2013

(54) MANAGEMENT APPARATUS AND COPYING APPARATUS

(75) Inventors: Toshihisa Nakano, Osaka (JP);
Masataka Minami, Hyogo (JP);
Masaya Yamamoto, Osaka (JP);
Takahiro Yamaguchi, Osaka (JP);
Kaoru Murase, Nara (JP)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 13/032,886

(22) Filed: Feb. 23, 2011

(65) Prior Publication Data

US 2011/0208967 A1 Aug. 25, 2011

Related U.S. Application Data

(60) Provisional application No. 61/307,940, filed on Feb. 25, 2010.

(51) Int. Cl.
*H04L 21/00* (2006.01)

(52) U.S. Cl.
USPC ........... 713/169; 713/168; 713/170; 713/189; 713/193; 726/26; 726/27; 726/28; 726/29; 726/30; 726/31; 726/32; 726/33; 380/200; 380/201; 380/202

(58) Field of Classification Search
USPC ............................... 726/26–33; 713/168–170
See application file for complete search history.

(56) References Cited

U.S. PATENT DOCUMENTS

| | | | |
|---|---|---|---|
| 5,502,733 A * | 3/1996 | Kishi et al. | 714/748 |
| 5,832,429 A * | 11/1998 | Gammel et al. | 704/255 |
| 6,222,807 B1 | 4/2001 | Min-Jae | |
| 7,058,284 B2 | 6/2006 | Zou et al. | |
| 7,178,037 B2 | 2/2007 | Shimada et al. | |
| 7,856,487 B2 * | 12/2010 | Kalis | 709/220 |

(Continued)

FOREIGN PATENT DOCUMENTS

| | | |
|---|---|---|
| JP | 11-259971 | 9/1999 |
| JP | 2002-245003 | 8/2002 |

(Continued)

OTHER PUBLICATIONS

International Search Report issued May 24, 2011 in corresponding International (PCT) Application No. PCT/JP2011/000954.

(Continued)

*Primary Examiner* — David Pearson
*Assistant Examiner* — Josnel Jeudy
(74) *Attorney, Agent, or Firm* — Wenderoth, Lind & Ponack, L.L.P.

(57) ABSTRACT

The management apparatus 105a manages copying of information from an original recording medium 101a to a copy recording medium 102a. The management apparatus 105a comprises: a transmission/reception unit 701a configured to receive an original-medium identifier from the copying apparatus 104a and to transmit permission information to the copying apparatus 104a, the original-medium identifier identifying the original recording medium, and the permission information indicating permission for the copying of the information; and a control unit 708a configured to determine whether to permit the copying of the information based on the received original-medium identifier and a registered original-medium identifier that identifies a registered original recording medium, and to allow the transmission/reception unit 701a to transmit the permission information when determining to permit the copying.

32 Claims, 28 Drawing Sheets

(56) References Cited

U.S. PATENT DOCUMENTS

| | | |
|---|---|---|
| 2002/0078027 A1* | 6/2002 | Staring et al. .................. 707/1 |
| 2002/0114461 A1 | 8/2002 | Shimada et al. |
| 2005/0289139 A1 | 12/2005 | Takashima et al. |
| 2006/0106721 A1* | 5/2006 | Hori et al. .................. 705/51 |
| 2007/0050849 A1* | 3/2007 | Takashima .................. 726/26 |
| 2007/0064854 A1* | 3/2007 | Hirasawa .................. 375/377 |
| 2008/0232785 A1* | 9/2008 | Isozaki et al. .................. 386/126 |
| 2010/0131562 A1* | 5/2010 | Eom et al. .................. 707/793 |

FOREIGN PATENT DOCUMENTS

| | | |
|---|---|---|
| JP | 2002-328846 | 11/2002 |
| JP | 2003-208754 | 7/2003 |
| JP | 2004-102629 * | 4/2004 |
| JP | 2005-348153 | 12/2005 |
| JP | 2006-40245 | 2/2006 |
| JP | 2009-199309 | 9/2009 |

* cited by examiner

FIG. 14

| Title | Resolution | Title key | Disc identifier | Permitted copy count | Current copy count | Copy-destination card identifier |
|---|---|---|---|---|---|---|
| ABC | VGA | FE···23 | 00··11 | 5 | | |
| | | | 00··12 | 5 | | |
| | | | ·· | ·· | | |
| | | | 00··A3 | 5 | | |
| | QVGA | D6···32 | 00··11 | 5 | | |
| | | | 00··12 | 5 | | |
| | | | ·· | ·· | | |
| | | | 00··A3 | 5 | | |

| Title | Resolution | Title key | Disc identifier | Permitted copy count | Current copy count | Copy-destination card identifier | |
|---|---|---|---|---|---|---|---|
| ABC | VGA | FE···23 | 00···11 | 5 | 2 | F2···01 | 12···96 |
| | | | 00···12 | 5 | 0 | | |
| | | | ⋮ | ⋮ | ⋮ | | |
| | | | 00···A3 | 5 | 0 | | |
| | QVGA | D6···32 | 00···11 | 5 | 0 | | |
| | | | 00···12 | 5 | 1 | 62···B8 | |
| | | | ⋮ | ⋮ | ⋮ | | |
| | | | 00···A3 | 5 | 0 | | |

FIG. 20

711d Content management information set

| Title identifier | Title name | Copyable-content information set | | Disc management information set | | | Copy-destination card identifier 740 | |
|---|---|---|---|---|---|---|---|---|
| | | Resolution | Title key | Disc identifier | Permitted copy count 714 | Current copy count | | |
| 000123 | ABC | VGA | FE…23 | 00…11 | 5 | 2 | F2…01 | 12…96 |
| | | | | 00…12 | 5 | 0 | | |
| | | | | … | … | … | | |
| | | | | 00…A3 | 5 | 0 | | |
| | | QVGA | D6…32 | 00…11 | 5 | 0 | 62…B8 | |
| | | | | 00…12 | 5 | 1 | | |
| | | | | … | … | … | | |
| | | | | 00…A3 | 5 | 0 | | |
| … | 742 | 743 745 | 712 713 | 715 716 731 | 717 718 719 | | 732 721 | 722 |
| 741 | | | | | | | | |

MANAGEMENT APPARATUS AND COPYING APPARATUS

This application claims benefit to U.S. provisional application No. 61/307,940, filed on Feb. 25, 2010.

TECHNICAL FIELD

The present invention relates to technologies to mange copying of information from an original recording medium storing the information to a copy recording medium.

BACKGROUND ART

Along with the developments in large-capacity recording media and broadband networks, a content distribution system via a recording medium has been prevalent, where a digital content (hereinafter, simply "content"), such as a digitized movie work or a digitized music work, is recorded on a recording medium and distributed.

In such a system, it is necessary that a content is played back or copied only under restrictions imposed by an agreement between the copyright holder and the user of the content, in order to protect the copyright of the content.

As a conventional technique for protecting digital works from unauthorized copying and the like, a method using encryption is well-known. Meanwhile, due to a rapid increase in the use of mobile phones and smart phones, there is a growing demand from users to enjoy browsing contents with such mobile phones.

CITATION LIST

Patent Literature

Patent Literature 1

Japanese Patent Application Publication No. 2002-328846

Patent Literature 2

Japanese Patent Application Publication No. 2005-348153

SUMMARY OF INVENTION

Technical Problem

However, a DVD or a Blu-ray Disc developed for the users to enjoy its content with a household stationary apparatus cannot satisfy the users' demand because of the following reason. In general, a content of such a DVD or a Blu-ray Disc is not permitted to be taken out or copied for viewing on a mobile terminal, since the content needs to be protected from unauthorized copying and the like.

In view of the aforementioned problem, an object of the present invention is to provide a management apparatus, a management method, a copying apparatus and a copying method for securely copying information recorded on an original recording medium to a copy recording medium while preventing unauthorized copying and improving user convenience.

Solution to Problem

To solve the problem, one aspect of the present invention provides a management apparatus for managing copying of information from an original recording medium that stores the information thereon to a copy recording medium, the management apparatus comprising: a transmission/reception unit configured to receive an original-medium identifier from a copying apparatus and to transmit permission information to the copying apparatus, the original-medium identifier identifying the original recording medium, and the permission information indicating permission for the copying of the information; and a control unit configured to determine whether to permit the copying of the information based on the received original-medium identifier and a registered original-medium identifier that identifies a registered original recording medium, and to allow the transmission/reception unit to transmit the permission information when determining to permit the copying.

Another aspect of the present invention is a copying apparatus for copying information from an original recording medium that stores the information thereon to a copy recording medium, the copying apparatus comprising: an identifier acquisition unit configured to acquire an original-medium identifier that identifies the original recording medium; a transmission/reception unit configured to transmit the acquired original-medium identifier to a management apparatus, and to receive permission information from the management apparatus, the permission information indicating permission for the copying of the information; a reading unit configured to read the information from the original recording medium; and a writing unit configured to write the read information onto the copy recording medium, and when receiving the permission information, to write the received permission information onto the copy recording medium.

Advantageous Effects of Invention

With the stated structures, the present invention is capable of copying information recorded on the original recording medium to a copy recording medium. Thus it is possible to improve user convenience while preventing unauthorized copying.

BRIEF DESCRIPTION OF DRAWINGS

These and the other objects, advantages and features of the invention will become apparent from the following description thereof taken in conjunction with the accompanying drawings which illustrate a specific embodiment of the invention.

FIG. 14 shows a database 711a as an example of a database that is under the management of the server apparatus 105 and is in an initial state thereof.

FIG. 15 shows a database 711b as an example of a database that is under the management of the server apparatus 105 and is in a state after operations of the database is started.

FIG. 20 shows a database 711d as a specific example of the database 711c.

DESCRIPTION OF EMBODIMENTS

Figure 1:
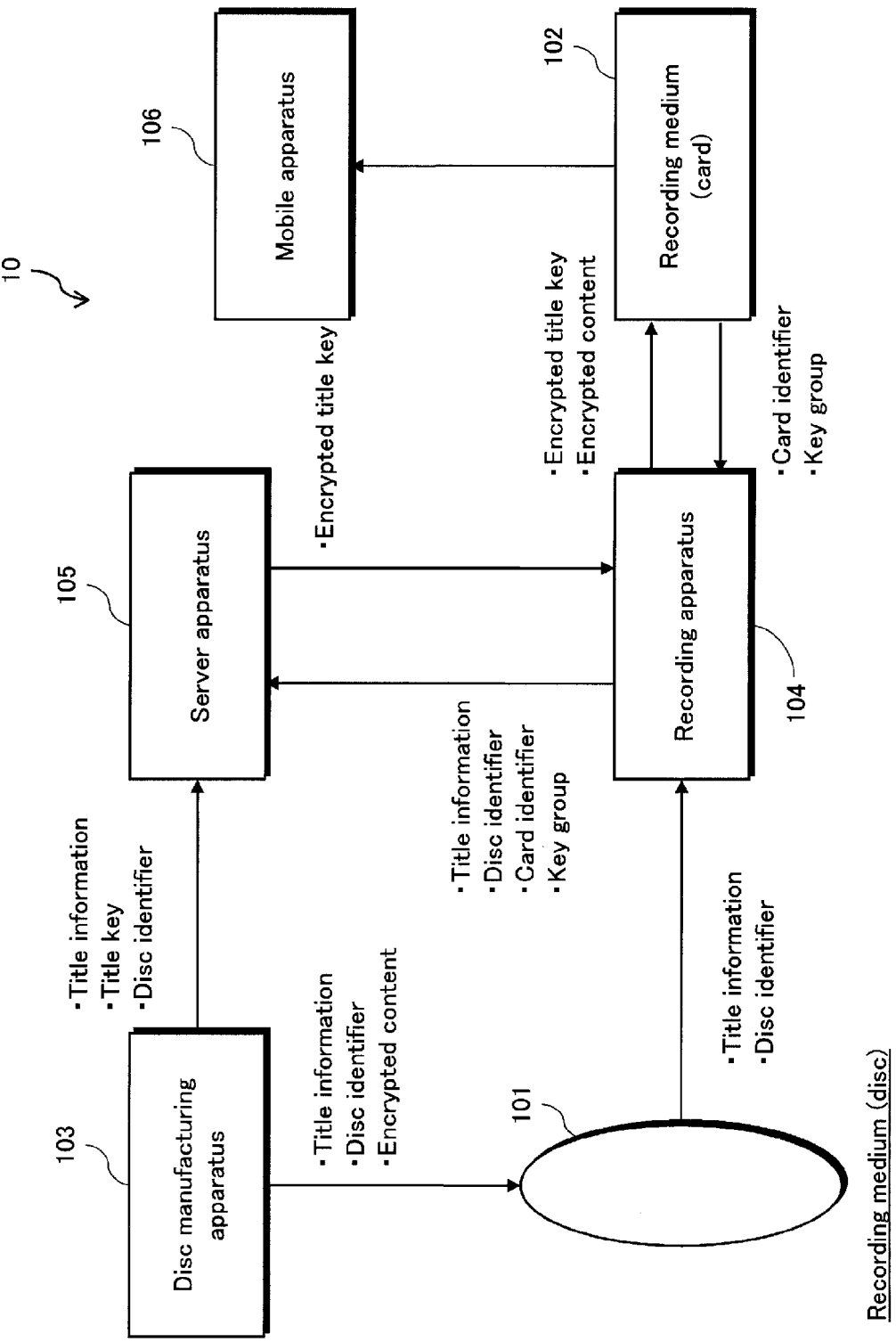
FIG. 1 is a block diagram showing the structure of a content recording system 10 pertaining to Embodiment 2.

One aspect of the present invention is a management apparatus for managing copying of information from an original recording medium that stores the information thereon to a copy recording medium, the management apparatus comprising: a transmission/reception unit configured to receive an original-medium identifier from a copying apparatus and to transmit permission information to the copying apparatus, the original-medium identifier identifying the original recording medium, and the permission information indicating permission for the copying of the information; and a control unit configured to determine whether to permit the copying of the information based on the received original-medium identifier and a registered original-medium identifier that identifies a registered original recording medium, and to allow the transmission/reception unit to transmit the permission information when determining to permit the copying.

The management apparatus may further comprise: a management unit configured to hold a database for storing therein the registered original-medium identifier that identifies the registered original recording medium, wherein the control unit determines whether the received original-medium identifier matches the registered original-medium identifier that identifies the registered original recording medium, and allow the transmission/reception unit to transmit the permission information when determining that the received original-medium identifier matches the registered original-medium identifier.

The transmission/reception unit may further be configured to transmit/receive part or all of the database to/from another management apparatus, and the management unit may further be configured to share part or all of the database with the other management apparatus.

The transmission/reception unit may further be configured to receive a copy-medium identifier from the copying apparatus, the copy-medium identifier identifying the copy recording medium, and the control unit may perform the determination further based on the received copy-medium identifier and a registered copy-medium identifier that identifies a registered copy recording medium.

The management apparatus may further comprise: a management unit configured to hold a database for storing therein the registered original-medium identifier that identifies the registered original recording medium and the registered copy-medium identifier that identifies the registered copy recording medium in association with each other, wherein the control unit may determine whether the received original-medium identifier matches the registered original-medium identifier that identifies the registered original recording medium and whether the received copy-medium identifier matches the registered copy-medium identifier that identifies the registered copy recording medium, and allow the transmission/reception unit to transmit the permission information when determining that the received original-medium identifier matches the registered original-medium identifier and the received copy-medium identifier does not match the registered copy-medium identifier, and when the control unit determines that the received original-medium identifier matches the registered original-medium identifier and the received copy-medium identifier does not match the registered copy-medium identifier, the management unit may register the received copy-medium identifier into the database in association with the registered original-medium identifier.

The transmission/reception unit may further be configured to receive from the copying apparatus a retransmission request for retransmitting the permission information, and the control unit, in response to the retransmission request from the copying apparatus, may determine whether the received original-medium identifier matches the registered original-medium identifier that identifies the registered original recording medium and whether the received copy-medium identifier matches the registered copy-medium identifier that identifies the registered copy recording medium, and allow the transmission/reception unit to retransmit the permission information when determining that the received original-medium identifier matches the registered original-medium identifier and the received copy-medium identifier matches the registered copy-medium identifier.

The transmission/reception unit may further be configured to receive a device identifier from the copying apparatus, the device identifier identifying the copying apparatus, the management apparatus may further comprise a holding unit for holding a permitted retransmission count threshold and a retransmission request count in association with the device identifier that identifies the copying apparatus, the retransmission request count indicating a count of retransmission requests made by the copying apparatus identified by the device identifier, and the control unit may further be configured to count up the retransmission requests to obtain the retransmission request count, and to prohibit the transmission/reception unit from retransmitting the permission information when the retransmission request count exceeds the permitted retransmission count threshold.

The transmission/reception unit may further be configured to transmit/receive part or all of the database to/from another management apparatus, and the management unit may further be configured to share part or all of the database with the other management apparatus.

The transmission/reception unit may further be configured to receive an information identifier from the copying apparatus, the information identifier identifying the information stored on the original recording medium, and the control unit may determine whether to permit the copying of the information further based on the received information identifier and a registered information identifier that identifies information stored on the registered original recording medium.

The management apparatus may further comprise: a management unit configured to hold a database for storing therein the registered information identifier that identifies the information stored on the registered original recording medium and the original-medium identifier that identifies the original recording medium, in association with each other, wherein the control unit may determine whether the received information identifier matches the registered information identifier that identifies the information stored on the registered original recording medium and whether the received original-medium identifier matches the registered original-medium identifier that identifies the registered original recording medium, and allow the transmission/reception unit to transmit the permission information when determining that the received information identifier matches the registered information identifier and the received original-medium identifier matches the registered original-medium identifier.

The information stored on the original recording medium may be an encrypted content generated by encrypting a content by using a title key, the management apparatus may further comprise an encryption unit configured to generate an encrypted title key as the permission information by encrypting the title key, and the transmission/reception unit may transmit the encrypted title key as the permission information.

The transmission/reception unit may further be configured to receive a copy-medium identifier from the copying apparatus, the copy-medium identifier identifying the copy recording medium, the management apparatus may further comprise a key conversion unit configured to generate a key by using the received copy-medium identifier, the key being available only for the copy recording medium, and the encryption unit may encrypt the title key by using the key generated by the key conversion unit.

The transmission/reception unit may further be configured to receive a key group from the copying apparatus, the key group being a group of one or more encrypted media keys, the management apparatus may further comprise a key group processing unit configured to extract from the key group an encrypted media key that corresponds to the management apparatus, and to generate a media key by decrypting the extracted encrypted media key by using a device key held therein, and the key conversion unit may generate the key that is available only for the copy recording medium, by using both the generated media key and the copy-medium identifier received by the transmission/reception unit.

The management apparatus may further comprise: a mutual authentication unit configured to perform mutual authentication with the copying apparatus, to share a common key with the copying apparatus, and to establish a secure communication path, wherein the encryption unit may encrypt the encrypted title key by using the shared key.

The transmission/reception unit may further be configured to receive a retransmission request and a device identifier, the retransmission request being a request for retransmitting the permission information, and the device identifier identifying the copying apparatus, the management apparatus may further comprise a holding unit for holding a permitted retransmission count threshold and a retransmission request count in association with the device identifier that identifies the copying apparatus, the retransmission request count indicating a count of retransmission requests made by the copying apparatus identified by the device identifier, and the control unit may further be configured to count up the retransmission requests to obtain the retransmission request count, and to prohibit the transmission/reception unit from retransmitting the permission information when the retransmission request count exceeds the permitted retransmission count threshold.

Another aspect of the present invention is a copying apparatus for copying information from an original recording medium that stores the information thereon to a copy recording medium, the copying apparatus comprising: an identifier acquisition unit configured to acquire an original-medium identifier that identifies the original recording medium; a transmission/reception unit configured to transmit the acquired original-medium identifier to a management apparatus, and to receive permission information from the management apparatus, the permission information indicating permission for the copying of the information; a reading unit configured to read the information from the original recording medium; and a writing unit configured to write the read information onto the copy recording medium, and when receiving the permission information, to write the received permission information onto the copy recording medium.

The copying apparatus may further comprise: a determination unit configured to determine whether the information stored on the original recording medium is for the copying; and a control unit configured to cause the transmission/reception unit to transmit the acquired original-medium identifier to the management apparatus when the determination unit determines that the information stored on the original recording medium is for the copying, wherein the transmission/reception unit may transmit the acquired original-medium identifier to the management apparatus, under control of the control unit.

The copying apparatus may further comprise: a determination unit configured to determine whether the information stored on the original recording medium is for the copying and whether the original-medium identifier is stored on the original recording medium; a display unit configured to display a message for prompting a user to input the original-medium identifier when the determination unit determines that the information stored on the original recording medium is for the copying and the original-medium identifier is not stored on the original recording medium; and an input reception unit configured to receive the original-medium identifier from the user, wherein the transmission/reception unit may transmit the received original-medium identifier to the management apparatus.

The original recording medium may store thereon the original-medium identifier that identifies the original recording medium, and the identifier acquisition unit may acquire the original-medium identifier by reading the original-medium identifier from the original recording medium.

The copying apparatus may further comprise: a display unit configured to display the original-medium identifier acquired by the identifier acquisition unit, and a message for prompting a user to select whether to cause the transmission/reception unit to transmit the original-medium identifier read from the original recording medium or to manually input another original-medium identifier; an input reception unit configured to receive the other original-medium identifier from the user when the user selects to manually input the other original-medium identifier, wherein the input/reception unit may transmit the original-medium identifier read from the original-recording medium when the user selects to cause the transmission/reception unit to transmit the original-medium identifier read from the original recording medium, and transmit the other original-medium identifier when the user selects to manually input the other original-medium identifier.

The identifier acquisition unit may acquire the original-medium identifier by receiving the original-medium identifier from a user.

The copying apparatus may further comprise: a capacity check unit configured to compare a size of a free space on the copy recording medium with a size of the information recorded on the original recording medium; and a display unit configured to display a message for prompting a user to replace the copy recording medium with another copy recording medium when the size of the free space is smaller than the size of the information.

The copying apparatus may further comprise: a connection state check unit configured to determine whether the copy recording medium is used as a local storage for the copying apparatus; and a display unit configured to display a message for prompting a user to replace the copy recording medium with another copy recording medium when the connection state check unit determines that the copy recording medium is used as a local storage for the copying apparatus.

The copying apparatus may further comprise: a connection state check unit configured to determine whether the copy recording medium is directly coupled to the copying apparatus or is coupled to a mobile apparatus that is connected to the copying apparatus via a wired/wireless connection; an input reception unit configured to receive an identifier of the mobile apparatus; a list holding unit configured to hold a list that shows, in association with the identifier of the mobile apparatus, whether the copying apparatus is permitted to copy the information recorded on the original recording medium to the mobile apparatus when the mobile apparatus is connected to the copying apparatus via a wired/wireless connection; a determination unit configured to determine whether the copying apparatus is under a condition that allows the copying apparatus to copy the information to the copy recording medium via the mobile apparatus, based on the received identifier and the determination by the connection state check unit; and a display unit configured to display a message for prompting a user to connect the mobile apparatus to the copying apparatus in a different manner when the determination unit determines that the copying apparatus is not under a condition that allows the copying apparatus to copy the information to the copy recording medium via the mobile apparatus.

The list holding unit may receive and hold the list that has been updated and is transmitted from the management apparatus via the transmission/reception unit.

The original recording medium may store thereon a plurality of information sets for the copying, and the copying apparatus may further comprise: an input reception unit configured to receive an identifier of the mobile apparatus; a list holding unit configured to hold a list that shows functions that the mobile apparatus has; a selection unit configured to select a recommended information set from among the plurality of information sets by using the list and the identifier of the mobile apparatus; and a display unit configured to display the recommended information set selected by the selection unit.

The list holding unit may receive and hold the list that has been updated and is transmitted from the management apparatus via the transmission/reception unit.

Another aspect of the present invention is a management method used in a management apparatus for managing copying of information from an original recording medium that stores the information thereon to a copy recording medium, the management method comprising: a transmission/reception step of receiving an original-medium identifier from a copying apparatus and transmitting permission information to the copying apparatus, the original-medium identifier identifying the original recording medium, and the permission information indicating permission for the copying of the information; and a control step of determining whether to permit the copying of the information based on the received original-medium identifier and a registered original-medium identifier that identifies a registered original recording medium, and allowing the transmission/reception step to transmit the permission information when determining to permit the copying.

In the transmission/reception step, a copy-medium identifier may further be received from the copying apparatus, the copy-medium identifier identifying the copy recording medium, and in the control step, the determination may be performed further based on the received copy-medium identifier and a registered copy-medium identifier that identifies a registered copy recording medium.

In the transmission/reception step, an information identifier may further be received from the copying apparatus, the information identifier identifying the information stored on the original recording medium, and in the control step, whether to permit the copying of the information may be determined further based on the received information identifier and a registered information identifier that identifies information stored on the registered original recording medium.

Another aspect of the present invention is a copying method used in a copying apparatus for copying information from an original recording medium that stores the information thereon to a copy recording medium, the copying method comprising: an identifier acquisition step of acquiring an original-medium identifier that identifies the original recording medium; a transmission/reception step of transmitting the acquired original-medium identifier to a management apparatus, and receiving permission information from the management apparatus, the permission information indicating permission for the copying of the information; a reading step of reading the information from the original recording medium; and a writing step of writing the read information onto the copy recording medium, and when receiving the permission information, writing the received permission information onto the copy recording medium.

The copying method may further comprise: a determination step of determining whether the information stored on the original recording medium is for the copying; and a control step of causing the transmission/reception step to transmit the acquired original-medium identifier to the management apparatus when the information stored on the original recording medium is determined in the determination step as being for the copying, wherein in the transmission/reception step, the acquired original-medium identifier may be transmitted to the management apparatus, under control of the control step.

The copying method may further comprise: a determination step of determining whether the information stored on the original recording medium is for the copying and whether the original-medium identifier is stored on the original recording medium; a display step of displaying a message for prompting a user to input the original-medium identifier when the information stored on the original recording medium is determined in the determination step as being for the copying and the original-medium identifier is determined in the determination step as not being stored on the original recording medium; and an input reception step of receiving the original-medium identifier from the user, wherein in the transmission/reception step, the received original-medium identifier is transmitted to the management apparatus.

The original recording medium may store thereon the original-medium identifier that identifies the original recording medium, and in the identifier acquisition step, the original-medium identifier may be acquired by reading the original-medium identifier from the original recording medium.

Another aspect of the present invention is an integrated circuit included in a management apparatus for managing copying of information from an original recording medium that stores the information thereon to a copy recording medium, the integrated circuit comprising: a transmission/reception circuit configured to receive an original-medium identifier from a copying apparatus and to transmit permission information to the copying apparatus, the original-medium identifier identifying the original recording medium, and the permission information indicating permission for the copying of the information; and a control circuit configured to determine whether to permit the copying of the information based on the received original-medium identifier and a registered original-medium identifier that identifies a registered original recording medium, and to allow the transmission/reception circuit to transmit the permission information when determining to permit the copying.

Another aspect of the present invention is an integrated circuit included in a copying apparatus for copying information from an original recording medium that stores the information thereon to a copy recording medium, the integrated circuit comprising: an identifier acquisition circuit configured to acquire an original-medium identifier that identifies the original recording medium; a transmission/reception circuit configured to transmit the acquired original-medium identifier to a management apparatus, and to receive permission information from the management apparatus, the permission information indicating permission for the copying of the information; a reading circuit configured to read the information from the original recording medium; and a writing circuit configured to write the read information onto the copy recording medium, and when receiving the permission information, to write the received permission information onto the copy recording medium.

Another aspect of the present invention is a computer-readable program recording medium storing thereon a management computer program used in a management apparatus for managing copying of information from an original recording medium that stores the information thereon to a copy recording medium, the management computer program causing a computer to perform: a transmission/reception step of receiving an original-medium identifier from a copying apparatus and transmitting permission information to the copying apparatus, the original-medium identifier identifying the original recording medium, and the permission information indicating permission for the copying of the information; and a control step of determining whether to permit the copying of the information based on the received original-medium identifier and a registered original-medium identifier that identifies a registered original recording medium, and allowing the transmission/reception step to transmit the permission information when determining to permit the copying.

Another aspect of the present invention is a computer-readable program recording medium storing thereon a copying computer program used in a copying apparatus for copying information from an original recording medium that stores the information thereon to a copy recording medium, the copying computer program causing a computer to perform: an identifier acquisition step of acquiring an original-medium identifier that identifies the original recording medium; a transmission/reception step of transmitting the acquired original-medium identifier to a management apparatus, and receiving permission information from the management apparatus, the permission information indicating permission for the copying of the information; a reading step of reading the information from the original recording medium; and a writing step of writing the read information onto the copy recording medium, and when receiving the permission information, writing the received permission information onto the copy recording medium.

Another aspect of the present invention is an information copying system that includes (i) a management apparatus for managing copying of information from an original recording medium that stores the information thereon to a copy recording medium and (ii) a copying apparatus for copying the information, the management apparatus comprising: a transmission/reception unit configured to receive an original-medium identifier from the copying apparatus and to transmit permission information to the copying apparatus, the original-medium identifier identifying the original recording medium, and the permission information indicating permission for the copying of the information; and a control unit configured to determine whether to permit the copying of the information based on the received original-medium identifier and a registered original-medium identifier that identifies a registered original recording medium, and to allow the transmission/reception unit to transmit the permission information when determining to permit the copying, and the copying apparatus comprising: an identifier acquisition unit configured to acquire the original-medium identifier that identifies the original recording medium; a transmission/reception unit configured to transmit the acquired original-medium identifier to the management apparatus, and to receive the permission information from the management apparatus, the permission information indicating permission for the copying of the information; a reading unit configured to read the information from the original recording medium; and a writing unit configured to write the read information onto the copy recording medium, and when receiving the permission information, to write the received permission information onto the copy recording medium.

The following describes embodiments of the present invention, with reference to the drawings.

Embodiment 1

First, a copy management system $10a$ as an embodiment of the present invention is described.

Figure 17:
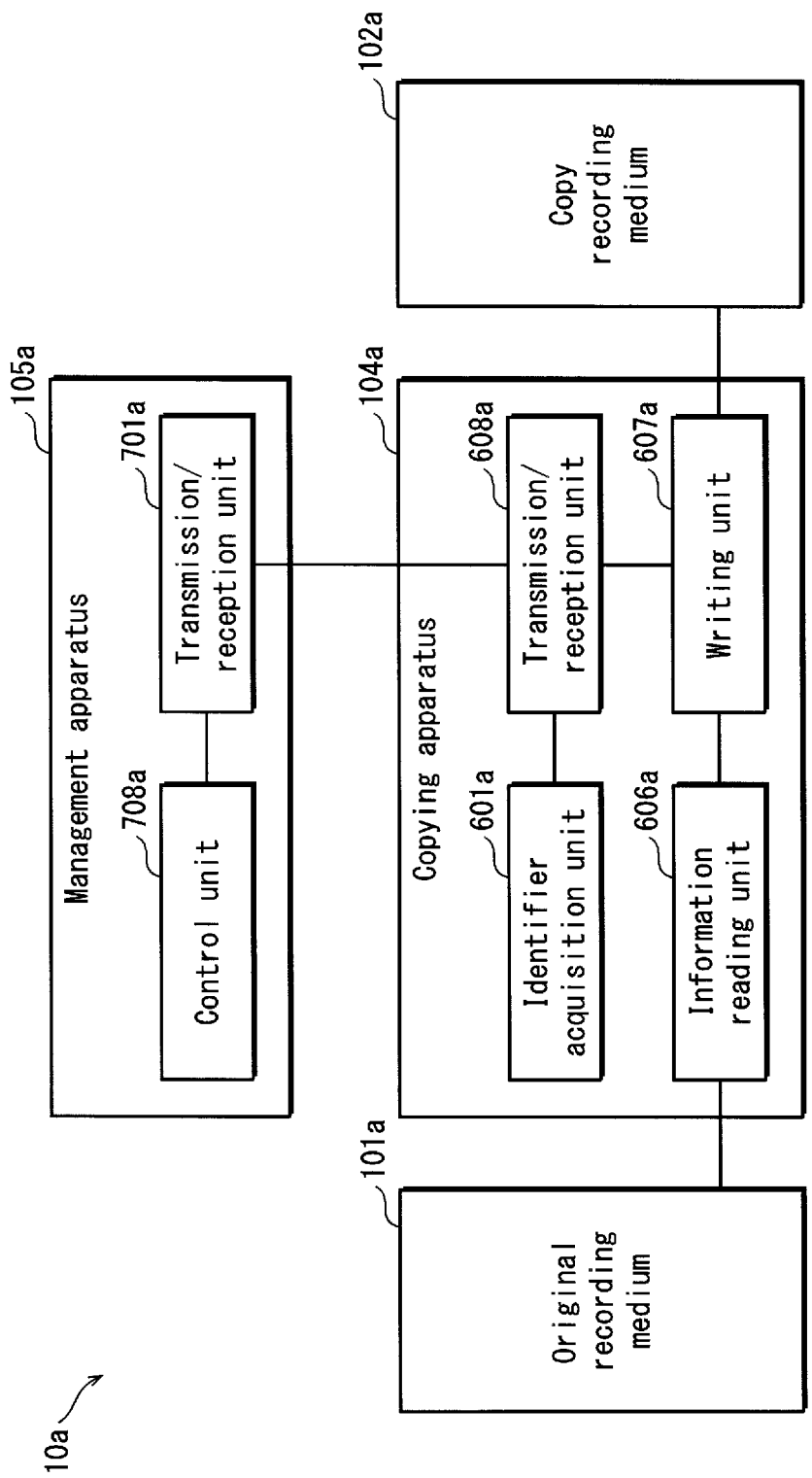
FIG. 17 is a block diagram showing the structure of a copy management system 10a pertaining to Embodiment 1.

As shown in FIG. 17, the copy management system $10a$ includes a management apparatus $105a$ and a copying apparatus $104a$.

The management apparatus 105a manages copying of information from an original recording medium 101a, which stores the information thereon, to a copy recording medium 102a. The management apparatus 105a includes a transmission/reception unit 701a and a control unit 708a.

The transmission/reception unit 701a receives an original-medium identifier that identifies the original recording medium 101a, from the copying apparatus 104a. Also, the transmission/reception unit 701a transmits permission information that indicates permission for copying of the information, to the copying apparatus 104a.

The control unit 708a determines whether to permit the copying of the information recorded on the original recording medium 101a identified by the received original-medium identifier, based on the received original-medium identifier and an original-medium identifier that has been registered in advance. If it is determined to permit the copying, the control unit 708a allows the transmission/reception unit 701a to transmit the permission information.

The management apparatus 104a copies the information recorded on the original recording medium 101a to the copy recording medium 102a. The copying apparatus 104a includes an identifier acquisition unit 601a, a transmission/reception unit 608a, an information reading unit 606a and a writing unit 607a.

The identifier acquisition unit 601a acquires an original-medium identifier that identifies the original recording medium 101a.

The transmission/reception unit 608a transmits the acquired original-medium identifier to the management apparatus 105a. Also, the transmission/reception unit 608a receives permission information indicating permission for copying of information, from the management apparatus 105a.

The information reading unit 606a reads the information from the original recording medium 101a.

The writing unit 607a writes the read information onto the copy recording medium 102a. When received the permission information, the writing unit 607a writes the received permission information onto the copy recording medium 102a.

Embodiment 2

The following describes a content recording system 10 as another embodiment pertaining to the present invention.

2.1 Structure of Content Recording System 10

As shown in FIG. 1, the content recording system 10 includes a recording medium 101 (hereinafter, disc 101), a recording medium 102 (hereinafter, card 102), a disc manufacturing apparatus 103, a recording apparatus 104, a server apparatus 105, and a mobile apparatus 106.

The disc 101 stores a copyable content. When the disc 101 is mounted into the recording apparatus 104, the recording apparatus 104 connects to the server apparatus 105 to obtain permission to copy the copyable content. After obtaining the permission, the recording apparatus 104 writes the copyable content onto the card 102. Then, a user mounts the card 102 into the mobile apparatus 106 to view and listen to the copyable content.

Figure 2:
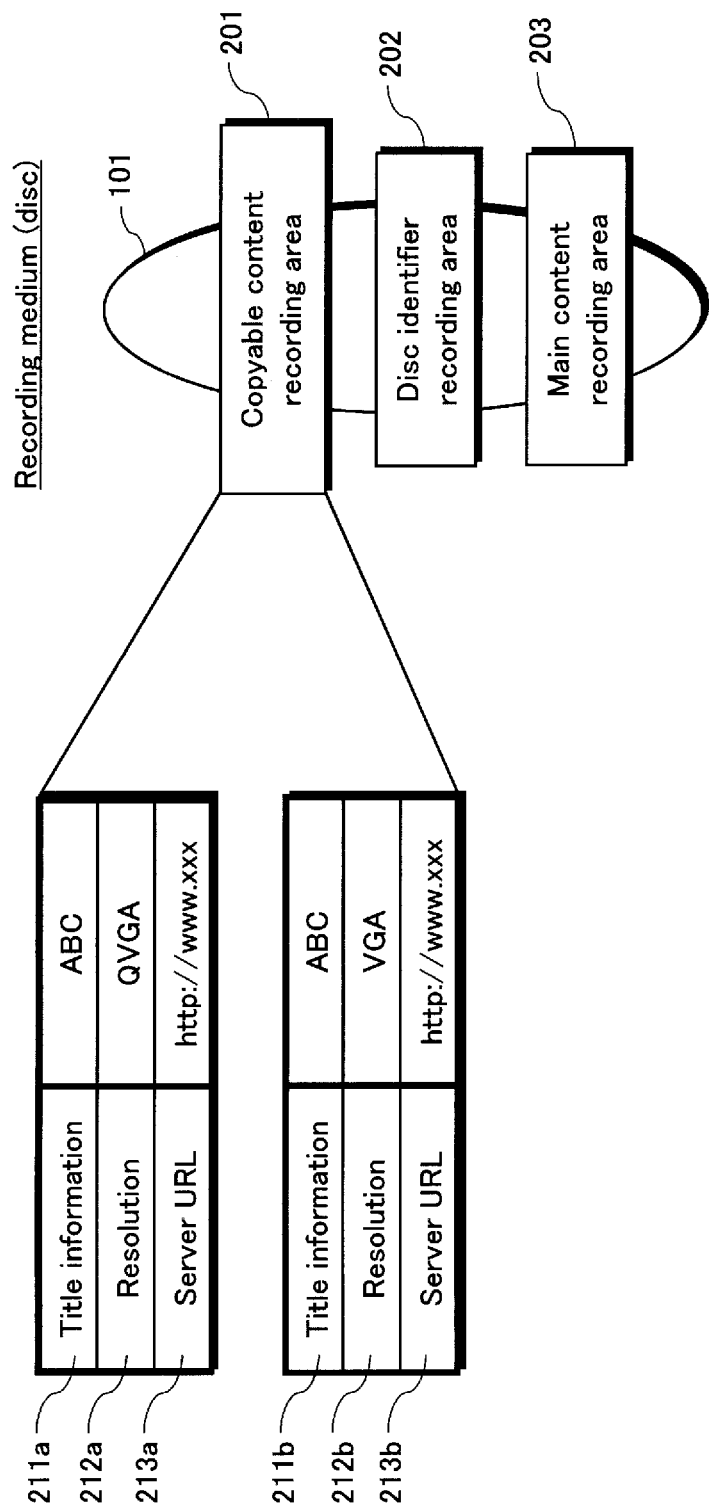
FIG. 2 shows an example of data to be recorded on a disc 101.

As shown in FIG. 2, the disc 101 includes a copyable content recording area 201, a disc identifier recording area 202, and a main content recording area 203. The copyable content recording area 201 stores one or more contents copyable to the card 102.

FIG. 2 shows an example of the disc 101 that stores images of a movie named (titled) "ABC" at two different resolutions, i.e., VGA (Video Graphics Array) and QVGA (Quarter VGA). Images in VGA have the size of 640×480 pixels. Images in QVGA have the size of 320×240 pixels. The copyable content recording area 201 stores information such as connection information, in addition to the title of the movie, denoted by 211a or 211b, and resolution information, denoted by 212a or 212b. The connection information (URL), denoted by 213a or 213b, is the URL of the server apparatus 105 to which the recording apparatus 104 requests copy permission.

The disc identifier recording area 202 stores an identifier (ID) for uniquely identifying the disc. The identifier is used for copy management by the server apparatus 105.

The main content recording area 203 stores main content having a higher picture quality than the copyable content. It is assumed that the user views and listens to the main content on a television with a large screen, and views and listens to the copyable content having a lower resolution on the mobile apparatus 106 with a small screen. The data structure, playback procedures, etc. of the main content may be in a general-purpose format such as DVD-Video, and a description thereof is omitted.

Figure 3:
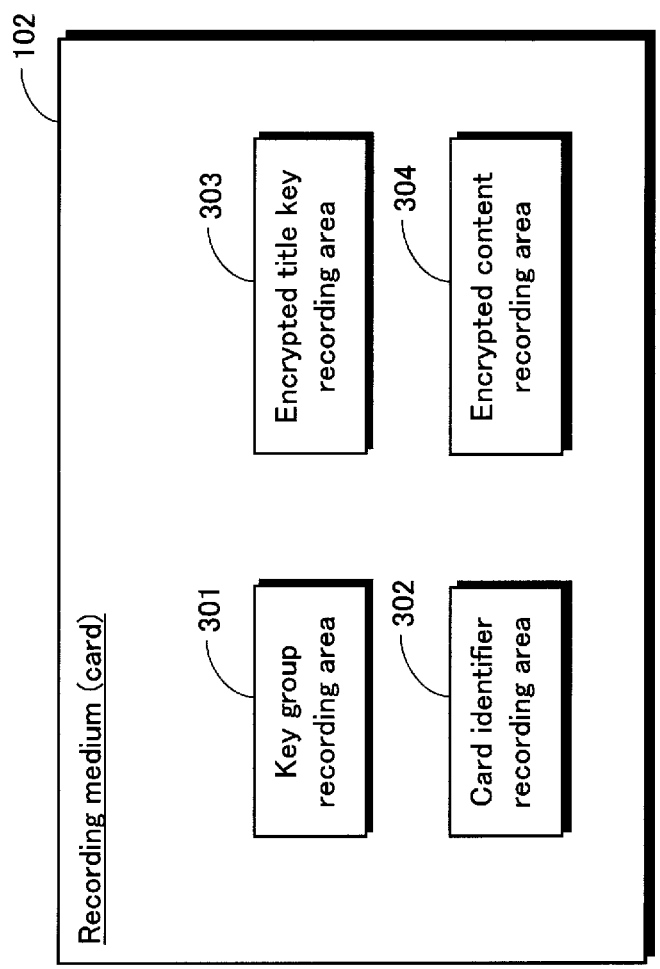
FIG. 3 shows an example of data to be recorded on a card 102.

As shown in FIG. 3, the card 102 includes a key group recording area 301, a card identifier recording area 302, an encrypted title key recording area 303, and an encrypted content recording area 304. The key group recording area 301 stores one or more device keys that are encrypted by a media key (i.e., a group of one or more encrypted media keys).

Figure 4:
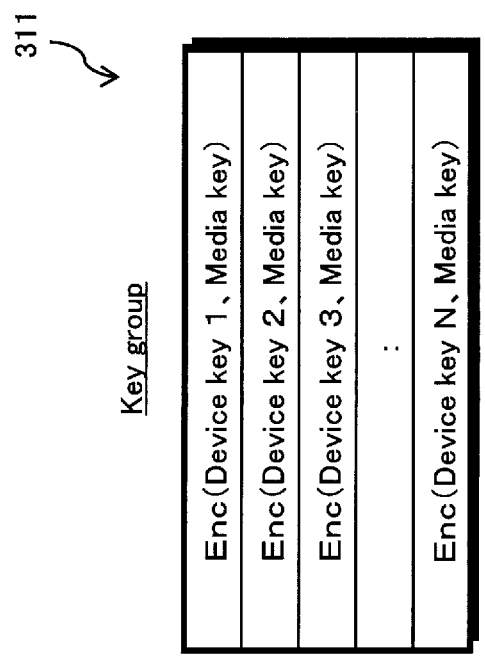
FIG. 4 shows an example of a key group 311.

FIG. 4 shows an example of a key group 311. In this example, a media key is encrypted by each of N device keys, namely a device key 1, a device key 2, . . . , a device key N. Here, Enc (A, B) denotes that data B is encrypted with data A as a key. It is acceptable to employ a general-purpose encryption algorithm such as DES (Data Encryption Standard) or AES (Advanced Encryption Standard). Therefore, a description thereof is omitted here.

The card identifier recording area 302 stores an identifier (ID) for uniquely identifying the card 102. The identifier is used for copy management by the server apparatus 105.

The encrypted title key recording area 303 stores an encrypted title key received by the recording apparatus 104 from the server apparatus 105. The encrypted content recording area 304 stores an encrypted content read by the recording apparatus 104 from the disc 101.

The disc manufacturing apparatus 103 encrypts a copyable content with use of a title key so as to obtain an encrypted content. Then, the disc manufacturing apparatus 103 records the encrypted content into the copyable content recording area 201 of the disc 101, and records an identifier (ID) that uniquely identifies the disc 101 into the disc identifier recording area 202. Furthermore, the disc manufacturing apparatus 103 transmits the following to the server apparatus 105: title information (e.g., title of the movie, identification information, etc.) of the encrypted content; the title key used for encryption; one or more disc identifiers of one or more discs 101 that each store the encrypted content. A detailed description the disc manufacturing apparatus 103 is provided below.

When the disc 101 is mounted, the recording apparatus 104 reads the copyable content from the disc 101. Also, the recording apparatus 104 connects to the server apparatus 105 to transmit thereto title information and a disc identifier that are read from the disc 101, and a key group and a card identifier that are read from the card 102, and receives an encrypted title key as copy permission from the server apparatus 105. Then, the recording apparatus 104 records the encrypted content read from the disc 101 into the encrypted content recording area 304 of the card 102, and records the encrypted title key received from the server apparatus 105 into the encrypted title key recording area 303 of the card 102. A detailed description of the recording apparatus 104 is provided below.

The server apparatus 105 receives, from the disc manufacturing apparatus 103, the title information, the title key, and the one or more disc identifiers, and registers them into a database. Furthermore, the server apparatus 105 receives, from the recording apparatus 104, the title information, the disc identifier, the key group, and the card identifier. Then, the server apparatus 105 judges whether to give copy permission, based on the database to which the title information, the title key, and the one or more disc identifiers are registered and managed. If judging to give copy permission, the server apparatus 105 transmits the encrypted title key, which is obtained by encrypting the title key, to the recording apparatus 104. A detailed description of the server apparatus 105 is provided below.

The mobile apparatus 106 reads the key group, the encrypted title key, and the encrypted content that are recorded on the mounted card 102, and plays back content. A detailed description of the mobile apparatus 106 is provided below.

2.2 Structure of Disc Manufacturing Apparatus 103

The following describes in detail a structure of the disc manufacturing apparatus 103.

Figure 5:
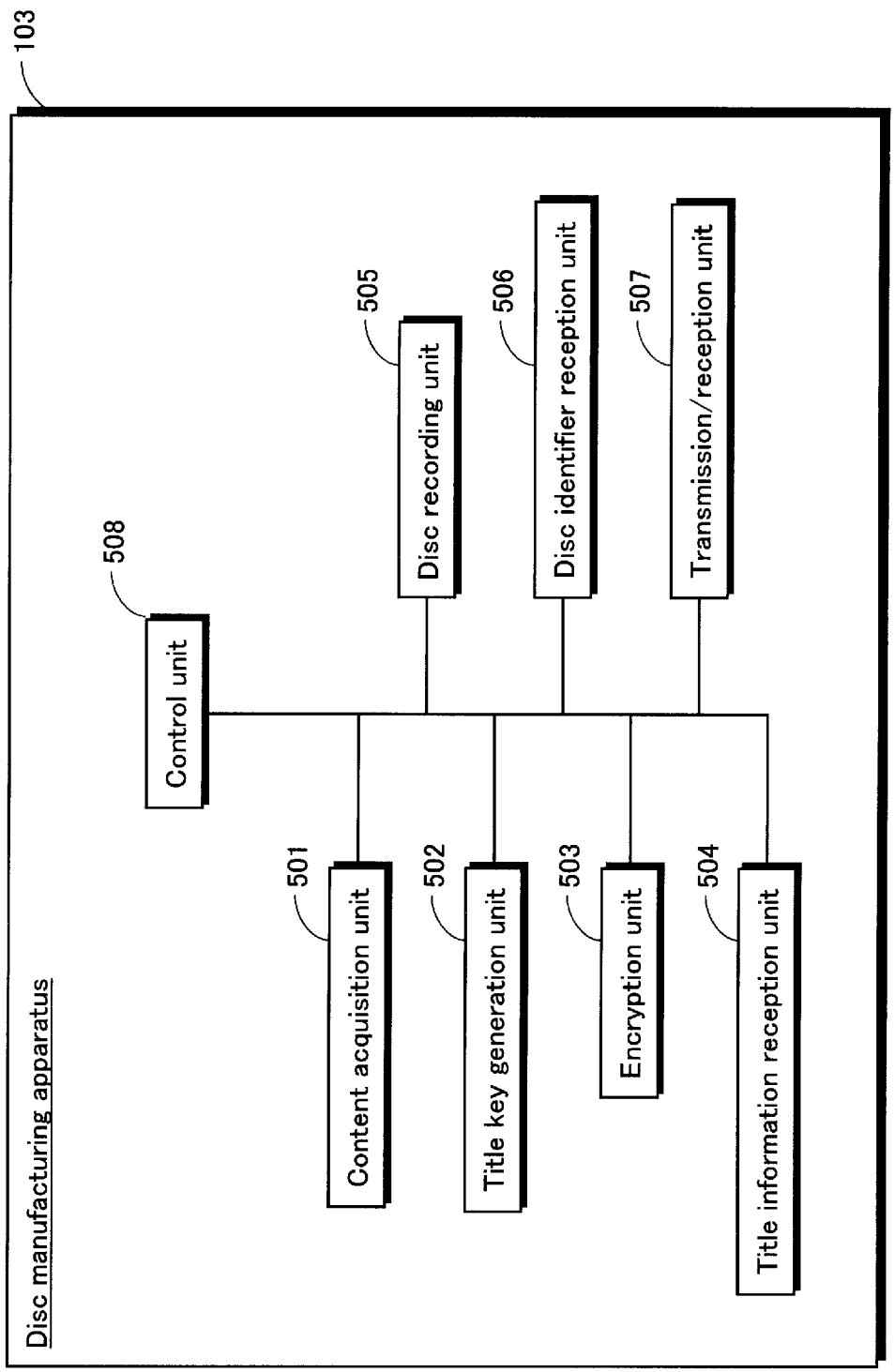
FIG. 5 is a block diagram showing the structure of a disc manufacturing apparatus 103.

As shown in FIG. 5, the disc manufacturing apparatus 103 includes a content acquisition unit 501, a title key generation unit 502, an encryption unit 503, a title information reception unit 504, a disc recording unit 505, a disc identifier reception unit 506, a transmission/reception unit 507, and a control unit 508.

The disc manufacturing apparatus 103 includes a microprocessor, a RAM, a ROM, a hard disk, etc. that are not specifically shown. Each of the RAM, the ROM, and the hard disk stores therein a computer program. The disc manufacturing apparatus 103 achieves its functions by the microprocessor operating in accordance with the programs.

As shown in FIG. 5, the functional blocks of the disc manufacturing apparatus 103 such as the content acquisition unit 501, the title key generation unit 502, the encryption unit 503, the title information reception unit 504, the disc recording unit 505, the disc identifier reception unit 506, the transmission/reception unit 507, the control unit 508, etc. are each typically realized by an LSI that is an integrated circuit. These functional blocks may be individually implemented by one chip. Alternatively, one or more units or a part of each unit may be implemented by one chip.

Although referred to as LSIs here, the functional blocks may be referred to as ICs, system LSIs, super LSIs, or ultra LSIs, depending on the degree of integration.

A method of circuit integration is not limited to an LSI, but may be realized by a dedicated circuit or a general processor. It is possible to employ an FPGA (Field Programmable Gate Array) that is programmable after the LSI is produced or a reconfigurable processor that allows the reconfiguration of the connection and settings of the circuit cells in the LSI.

Furthermore, if an integration technique that replaces LSIs emerges as a result of the advance of a semiconductor technique or a derivative technique, such a technique may of course be used to integrate functional blocks. For example, biotechnology may be employed as such a technique.

Finally, each functional block may be realized by software or a combination of an LSI and software. Also, the software may be tamper-resistant.

(1) Content Acquisition Unit 501

The content acquisition unit 501 externally acquires a digital content that is to be recorded onto the disc 101 as a copyable content.

(2) Title Key Generation Unit 502

The title key generation unit 502 generates a title key used for encrypting the digital content acquired by the content acquisition unit 501. n generating the title key, it is possible to employ a method using a random number generator. In this method, a random number sequence is generated with use of the random number generator. Then, a 128-bit data sequence is taken from the random number sequence to be used as the title key.

(3) Encryption Unit 503

The encryption unit 503 encrypts the digital content acquired by the content acquisition unit 501, with use of the title key generated by the title key generation unit 502. It is acceptable to employ a general-purpose encryption algorithm such as DES or AES. Therefore, a description thereof is omitted here.

(4) Title Information Reception Unit 504

The title information reception unit 504 receives title information, such as the title of the digital content acquired by the content acquisition unit 501, the resolution of the digital content, and the URL of the server in which the title key is registered.

(5) Disc Recording Unit 505

The disc recording unit 505 records, onto the disc 101, the encrypted content that is obtained by the encryption unit 503 encrypting the digital content, the title information received by the title information reception unit 504, etc.

(6) Disc Identifier Reception Unit 506

The disc identifier reception unit 506 receives one or more disc identifiers of one or more discs on which the encrypted content, the title information, etc. are recorded by the disc recording unit 505.

(7) Transmission/Reception Unit 507

The transmission/reception unit 507 transmits, to the server apparatus 105, the title information received by the title information reception unit 504, the title key generated by the title key generation unit 502, and the one or more disc identifiers received by the disc identifier reception unit 506.

(8) Control Unit 508

The control unit 508 manages and controls the units (1) to (7) described above, thereby realizing recording to the disc and data transmission to the server apparatus 105.

2.3 Structure of Recording Apparatus 104

The following describes in detail a structure of the recording apparatus 104.

Figure 6:
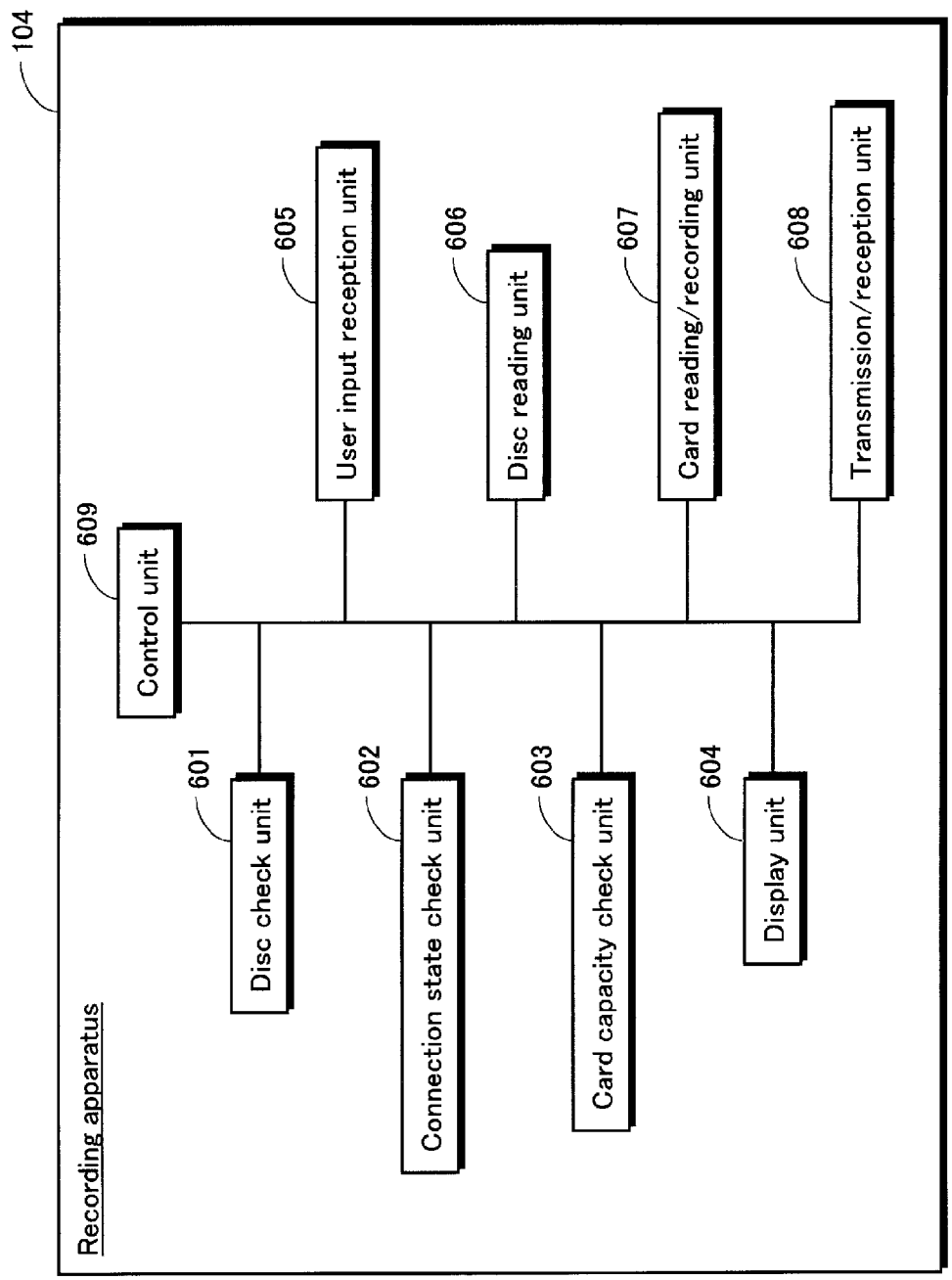
FIG. 6 is a block diagram showing the structure of a recording apparatus 104.

As shown in FIG. 6, the recording apparatus 104 includes a disc check unit 601, a connection state check unit 602, a card capacity check unit 603, a display unit 604, a user input reception unit 605, a disc reading unit 606, a card reading/recording unit 607, a transmission/reception unit 608, and a control unit 609.

The recording apparatus 104 includes a microprocessor, a RAM, a ROM, a hard disk, etc. that are not specifically shown. Each of the RAM, the ROM, and the hard disk stores therein a computer program. The recording apparatus 104 achieves its functions by the microprocessor operating in accordance with the programs.

Figure 16:
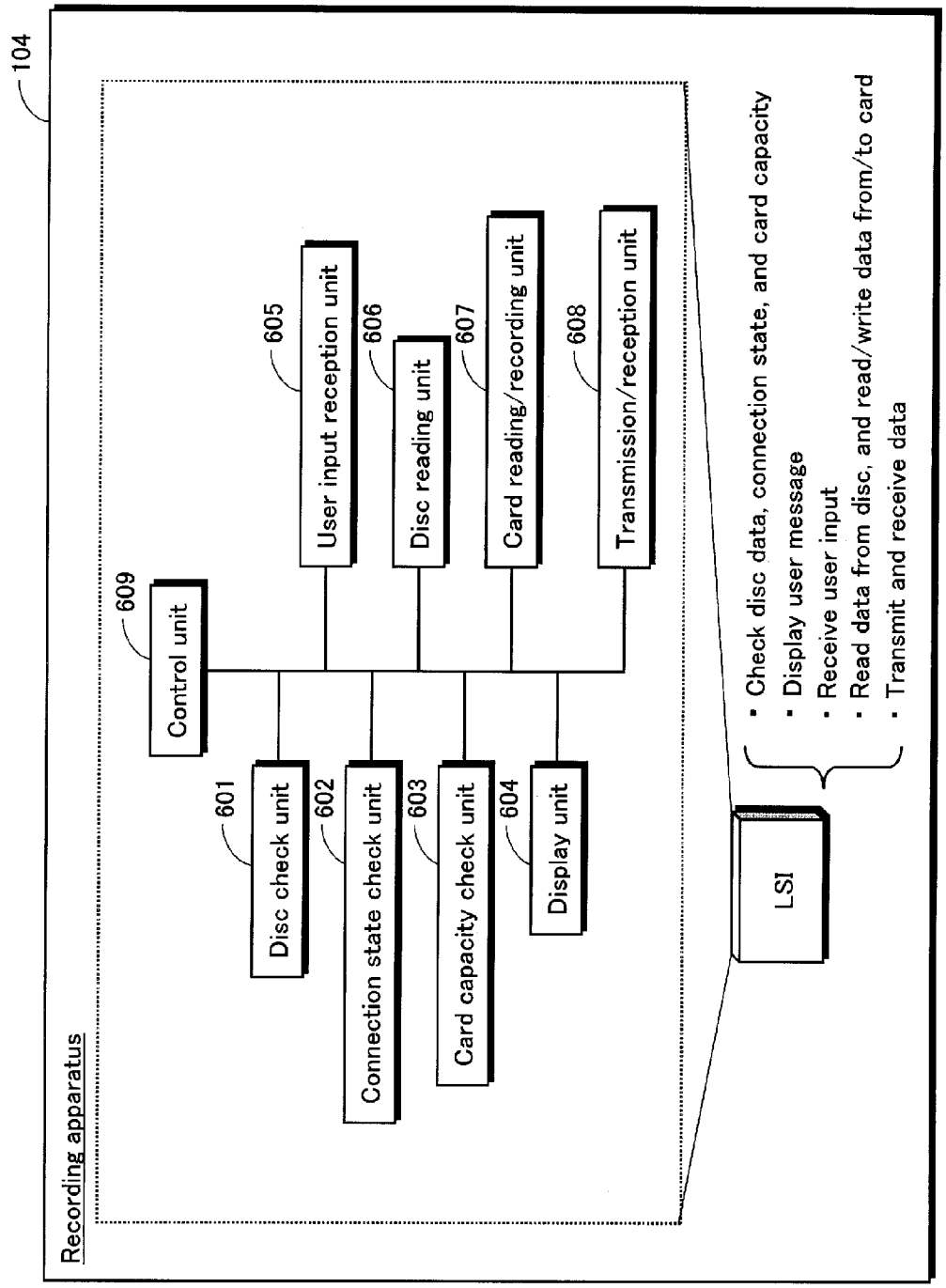
FIG. 16 shows the structure of an LSI that realizes the functions of the recording apparatus 104.

As shown in FIG. 6, the functional blocks of the recording apparatus 104 such as the disc check unit 601, the connection state check unit 602, the card capacity check unit 603, the display unit 604, the user input reception unit 605, the disc reading unit 606, the card reading/recording unit 607, the transmission/reception unit 608, and the control unit 609, etc. are each typically realized by an LSI that is an integrated circuit. These functional blocks may be individually implemented by one chip. Alternatively, one or more units or a part of each unit may be implemented by one chip. FIG. 16 shows one example of such an LSI.

Although referred to as LSIs here, the functional blocks may be referred to as ICs, system LSIs, super LSIs, or ultra LSIs, depending on the degree of integration.

A method of circuit integration is not limited to an LSI, but may be realized by a dedicated circuit or a general processor. It is possible to employ an FPGA (Field Programmable Gate Array) that is programmable after the LSI is produced or a reconfigurable processor that allows the reconfiguration of the connection and settings of the circuit cells in the LSI.

Furthermore, if an integration technique that replaces LSIs emerges as a result of the advance of a semiconductor technique or a derivative technique, such a technique may of course be used to integrate functional blocks. For example, biotechnology may be employed as such a technique.

Finally, each functional block may be realized by software or a combination of an LSI and software. Also, the software may be tamper-resistant.

(1) Disc Check Unit 601

When the disc 101 is mounted, the disc check unit 601 checks whether any copyable content is recorded in the copyable content recording area 201 of the disc 101.

(2) Connection State Check Unit 602

The connection state check unit 602 checks the connection state of the card 102 to the recording apparatus 104. For example, the connection state check unit 602 checks whether the card 102 is directly mounted in the recording apparatus 104 or whether the mobile apparatus 106 in which the card 102 is mounted is connected to the recording apparatus 104 via a wired or wireless connection.

(3) Card Capacity Check Unit 603

The card capacity check unit 603 judges whether a copyable content on the disc 101 can be copied (written) to the card 102 that is directly or indirectly connected to the recording apparatus 104. The judgment is performed by comparing the available memory size of the card 102 and the size of the copyable content.

(4) Display Unit 604

The display unit 604 displays, for the user, the type (i.e., title, resolution, etc.) of each copyable content recorded on the disc 101.

(5) User Input Reception Unit 605

The user input reception unit 605 receives a user input indicating a copyable content selected by the user from the copyable contents displayed by the display unit 604.

(6) Disc Reading Unit 606

The disc reading unit 606 reads the copyable content selected by the user from the disc 101, and temporarily stores the copyable content therein.

(7) Card Reading/Recording Unit 607

The card reading/recording unit 607 reads the key group from the key group recording area 301 of the card 102, and reads the card identifier from the card identifier recording area 302. Also, the card reading/recording unit 607 writes the encrypted content read from the disc 101 into the encrypted content recording area 304 of the card 102, and writes the encrypted title key received from the server apparatus 105 into the encrypted title key recording area 303.

(8) Transmission/Reception Unit 608

The transmission/reception unit 608 transmits, to the server apparatus 105, the title information and the disc identifier that are read from the disc 101, and the key group and the card identifier that are read from the card 102. Also, the transmission/reception unit 608 receives the encrypted title key from the server apparatus 105.

(9) Control Unit 609

The control unit 609 manages and controls the units (1) to (8) described above, thereby realizing copying of a copyable content from the disc 101 to the card 102.

2.4 Structure of Server Apparatus 105

The following describes in detail a structure of the server apparatus 105.

Figure 7:
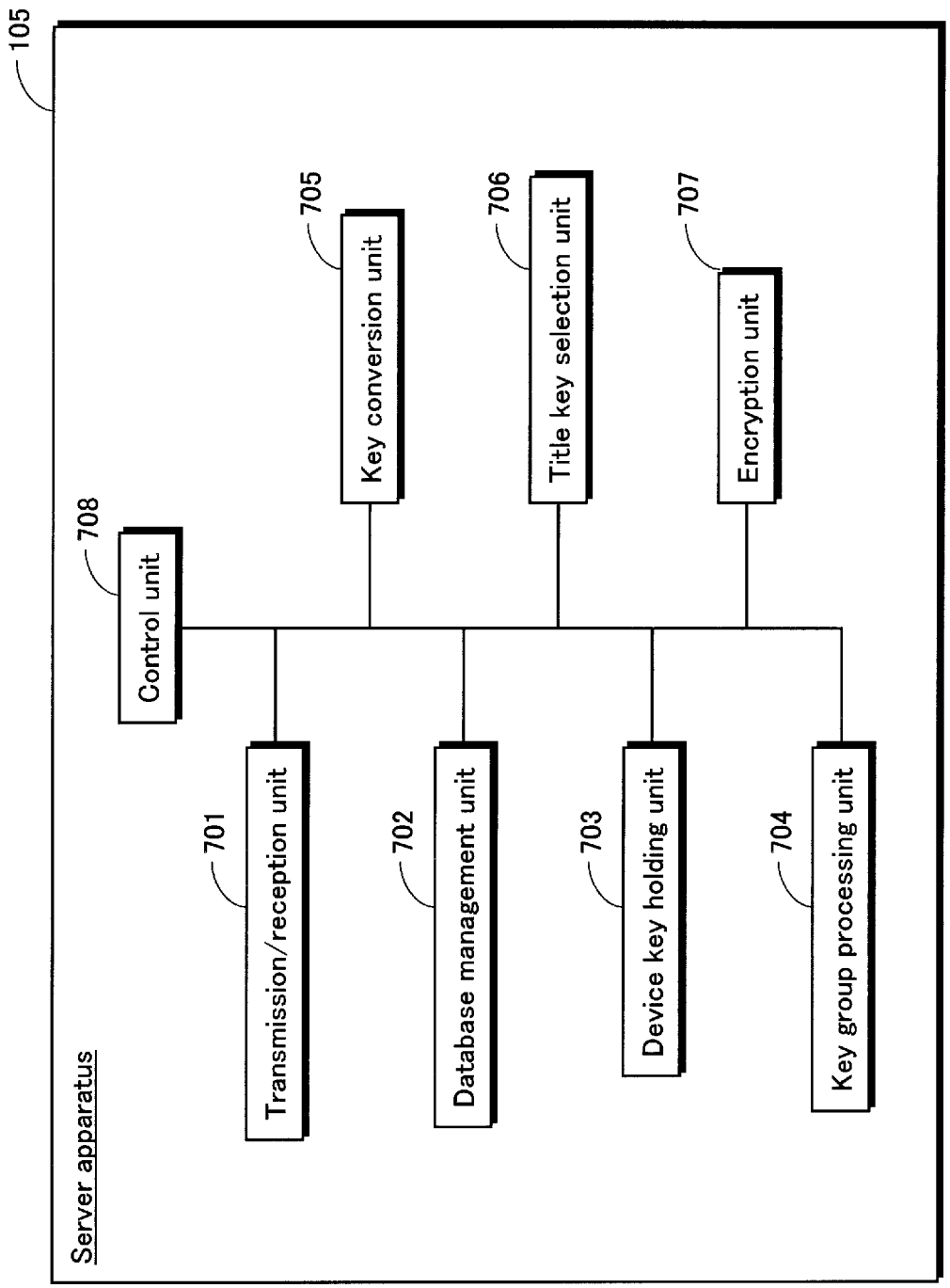
FIG. 7 is a block diagram showing the structure of a server apparatus 105.

As shown in FIG. 7, the server apparatus 105 includes a transmission/reception unit 701, a database management unit 702, a device key holding unit 703, a key group processing unit 704, a key conversion unit 705, a title key selection unit 706, an encryption unit 707, and a control unit 708.

The server apparatus 105 includes a microprocessor, a RAM, a ROM, a hard disk, etc. that are not specifically shown. Each of the RAM, the ROM, and the hard disk stores therein a computer program. The server apparatus 105 achieves its functions by the microprocessor operating in accordance with the programs.

As shown in FIG. 7, the functional blocks of the server apparatus 105 such as the transmission/reception unit 701, the database management unit 702, the device key holding unit 703, the key group processing unit 704, the key conversion unit 705, the title key selection unit 706, the encryption unit 707, and the control unit 708, etc. are each typically realized by an LSI that is an integrated circuit. These functional blocks may be individually implemented by one chip. Alternatively, one or more units or a part of each unit may be implemented by one chip.

Although referred to as LSIs here, the functional blocks may be referred to as ICs, system LSIs, super LSIs, or ultra LSIs, depending on the degree of integration.

A method of circuit integration is not limited to an LSI, but may be realized by a dedicated circuit or a general processor. It is possible to employ an FPGA (Field Programmable Gate Array) that is programmable after the LSI is produced or a reconfigurable processor that allows the reconfiguration of the connection and settings of the circuit cells in the LSI.

Furthermore, if an integration technique that replaces LSIs emerges as a result of the advance of a semiconductor technique or a derivative technique, such a technique may of course be used to integrate functional blocks. For example, biotechnology may be employed as such a technique.

Finally, each functional block may be realized by software or a combination of an LSI and software. Also, the software may be tamper-resistant.

(1) Transmission/Reception Unit 701

The transmission/reception unit 701 receives, from the disc manufacturing apparatus 103, the title information, the title key, and one or more disc identifiers. Further, the transmission/reception unit 701 receives, from the recording apparatus 104, the title information, the disc identifier, the key group, and the card identifier, and transmits the encrypted title key to the recording apparatus 104.

(2) Database Management Unit 702

The database management unit 702 registers, into the database, the title information, the title key, and the one or more disc identifiers that are received by the transmission/reception unit 701 from the disc manufacturing apparatus 103.

FIG. 14 shows a database 711a as one example of the database. In the example of FIG. 14, the disc 101 stores two types (i.e., VGA and QVGA) of copyable contents for a content titled "ABC". The VGA content is encrypted with use of the title key 712 indicating "0xFE . . . 23". The QVGA content is encrypted with use of the title key 713 indicating "0xD6 . . . 32". Furthermore, the copyable contents for the content titled "ABC" are recorded on a plurality of discs. The disc identifiers 714, 715, . . . and 716 of the respective discs are "00 . . . 11", "00 . . . 12", . . . , and "00 . . . A3". The database also records maximum permitted copy counts 717, 718, . . . 719 (up to 5 times in the example of FIG. 14) in order to manage the number of times copying is performed.

Also, the control unit 708 judges whether to give copy permission (i.e., transmit the encrypted title key) to the recording apparatus 104, based on the title information, the disc identifier, and the card identifier that are received from the recording apparatus 104. After receiving, from the recording apparatus 104, a notification indicating that recording of the copyable content to the card 102 is completed, the database management unit 702 registers the card identifier of the card 102.

FIG. 15 shows a database 711*b* as one example of the database. In the example of FIG. 15, the VGA content has already been copied onto two cards from the disc having the disc identifier 714 indicating "00 . . . 11". The card identifiers 721 and 722 of the two cards onto which the VGA content has been copied are "F2 . . . 01" and "12 . . . 96". Also, the QVGA content has already been copied onto one card from the disc having the disc identifier 731 indicating "00 . . . 12". The card identifier 732 of the card onto which the QVGA content has been copied is "62 . . . B8".

(3) Device Key Holding Unit 703

The device key holding unit 703 holds a device key for decrypting an encrypted media key included in the key group received from the recording apparatus 104.

(4) Key Group Processing Unit 704

The key group processing unit 704 extracts the encrypted media key from the key group, decrypts the encrypted media key with use of the device key held by the device key holding unit 703, and thereby obtains a media key.

(5) Key Conversion Unit 705

The key conversion unit 705 converts the media key obtained by the key group processing unit 704 with use of the card identifier received from the recording apparatus 104, and thereby generates a media unique key. Here, the conversion may be performed with use of a general arbitrary method. For example, the media key and the card identifier may be input to a one-way function, and an output thereof may be partly or wholly used as the media unique key.

(6) Title Key Selection Unit 706

The title key selection unit 706 selects a title key from the database, based on the title information, the disc identifier, and the card identifier that are received from the recording apparatus 104.

(7) Encryption Unit 707

The encryption unit 707 encrypts the title key selected by the title key selection unit 706 with use of the media unique key generated by the key conversion unit 705, and thereby obtains an encrypted title key.

(8) Control Unit 708

The control unit 708 manages and controls the units (1) to (7) described above, thereby realizing judgment of whether to give copy permission (i.e., transmit the encrypted title key) to the recording apparatus 104, based on the database managed by the database management unit 702. When it is judged that the encrypted title key is to be transmitted, the control unit 708 realizes transmission of the encrypted title key.

2.5 Structure of Mobile Apparatus 106

The following describes in detail a structure of the mobile apparatus 106.

Figure 8:
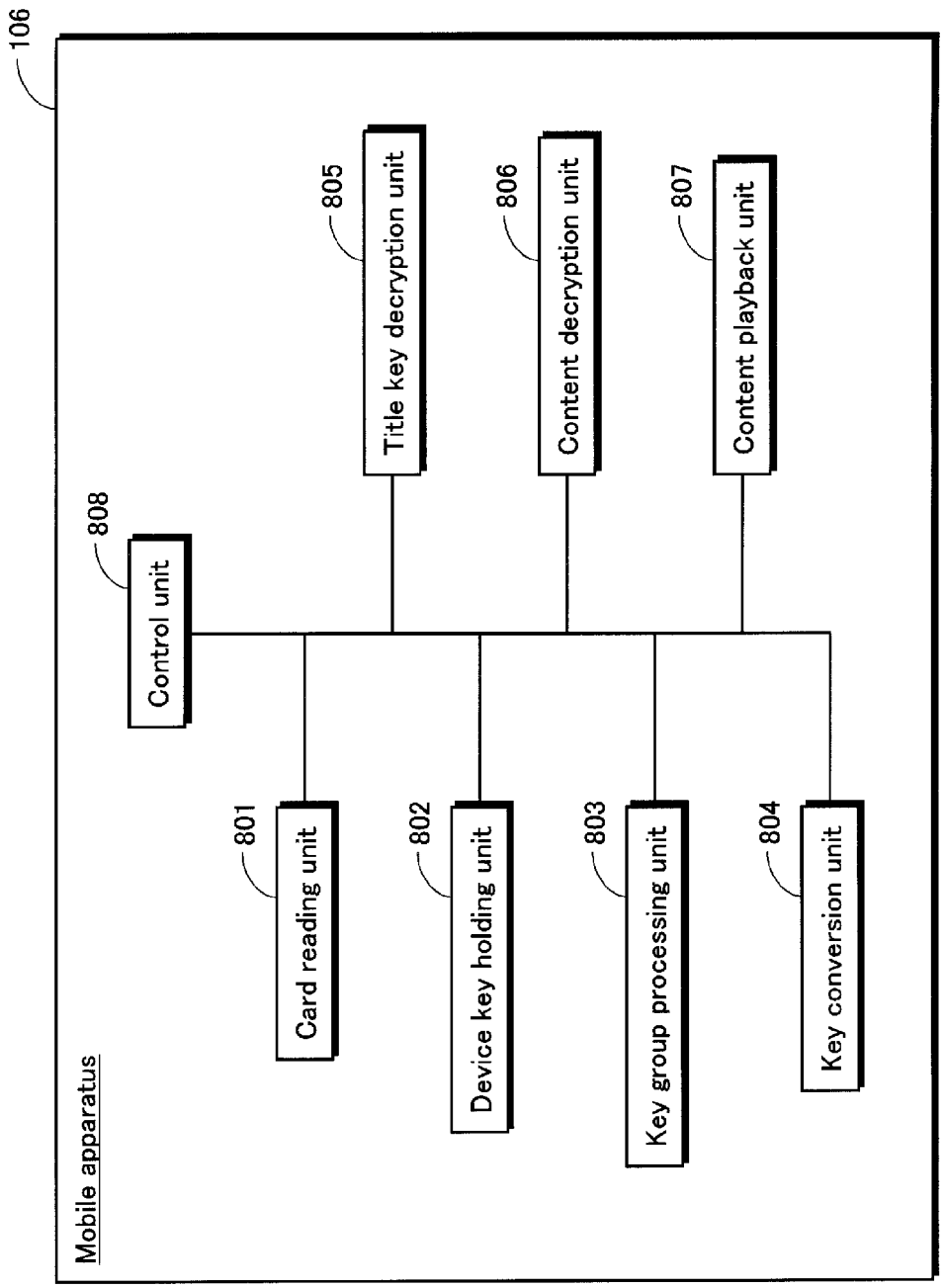
FIG. 8 is a block diagram showing the structure of a mobile apparatus 106.

As shown in FIG. 8, the mobile apparatus 106 includes a card reading unit 801, a device key holding unit 802, a key group processing unit 803, a key conversion unit 804, a title key decryption unit 805, a content decryption unit 806, a content playback unit 807, and a control unit 808.

The mobile apparatus 106 includes a microprocessor, a RAM, a ROM, a hard disk, etc. that are not specifically shown. Each of the RAM, the ROM, and the hard disk stores therein a computer program. The mobile apparatus 106 achieves its functions by the microprocessor operating in accordance with the programs.

As shown in FIG. 8, the functional blocks of the mobile apparatus 106 such as the card reading unit 801, the device key holding unit 802, the key group processing unit 803, the key conversion unit 804, the title key decryption unit 805, the content decryption unit 806, the content playback unit 807, and the control unit 808, etc. are each typically realized by an LSI that is an integrated circuit. These functional blocks may be individually implemented by one chip. Alternatively, one or more units or a part of each unit may be implemented by one chip.

Although referred to as LSIs here, the functional blocks may be referred to as ICs, system LSIs, super LSIs, or ultra LSIs, depending on the degree of integration.

A method of circuit integration is not limited to an LSI, but may be realized by a dedicated circuit or a general processor. It is possible to employ an FPGA (Field Programmable Gate Array) that is programmable after the LSI is produced or a reconfigurable processor that allows the reconfiguration of the connection and settings of the circuit cells in the LSI.

Furthermore, if an integration technique that replaces LSIs emerges as a result of the advance of a semiconductor technique or a derivative technique, such a technique may of course be used to integrate functional blocks. For example, biotechnology may be employed as such a technique.

Finally, each functional block may be realized by software or a combination of an LSI and software. Also, the software may be tamper-resistant.

(1) Card Reading Unit 801

The card reading unit 801 reads, from the mounted card 102, the key group, the card identifier, the encrypted title key, and the encrypted content.

(2) Device Key Holding Unit 802

The device key holding unit 802 holds a device key for decrypting an encrypted media key included in the key group read from the card 102.

(3) Key Group Processing Unit 803

The key group processing unit 803 extracts the encrypted media key from the key group, decrypts the encrypted media key with use of the device key held by the device key holding unit 802, and thereby obtains a media key.

(4) Key Conversion Unit 804

The key conversion unit 804 converts the media key obtained by the key group processing unit 803 with use of the card identifier read from the card 102, and thereby generates a media unique key. Here, the conversion may be performed with use of a general arbitrary method. For example, the media key and the card identifier may be input to a one-way function, and an output thereof may be partly or wholly used as the media unique key.

(5) Title Key Decryption Unit 805

The title key decryption unit 805 decrypts the encrypted title key read from the card 102 with use of the media unique key generated by the key conversion unit 804, and thereby obtains a title key.

(6) Content Decryption Unit 806

The content decryption unit 806 decrypts the encrypted content read from the card 102 with use of the title key obtained by the title key decryption unit 805, and thereby obtains a content.

(7) Content Playback Unit 807

The content playback unit 807 plays back and displays the content obtained by the content decryption unit 806.

(8) Control Unit 808

The control unit 808 manages and controls the units (1) to (7) described above, thereby allowing the viewing and listening of the content using the mobile apparatus 106.

2.6 Structure of Disc Manufacturing Apparatus 103

Figure 9:
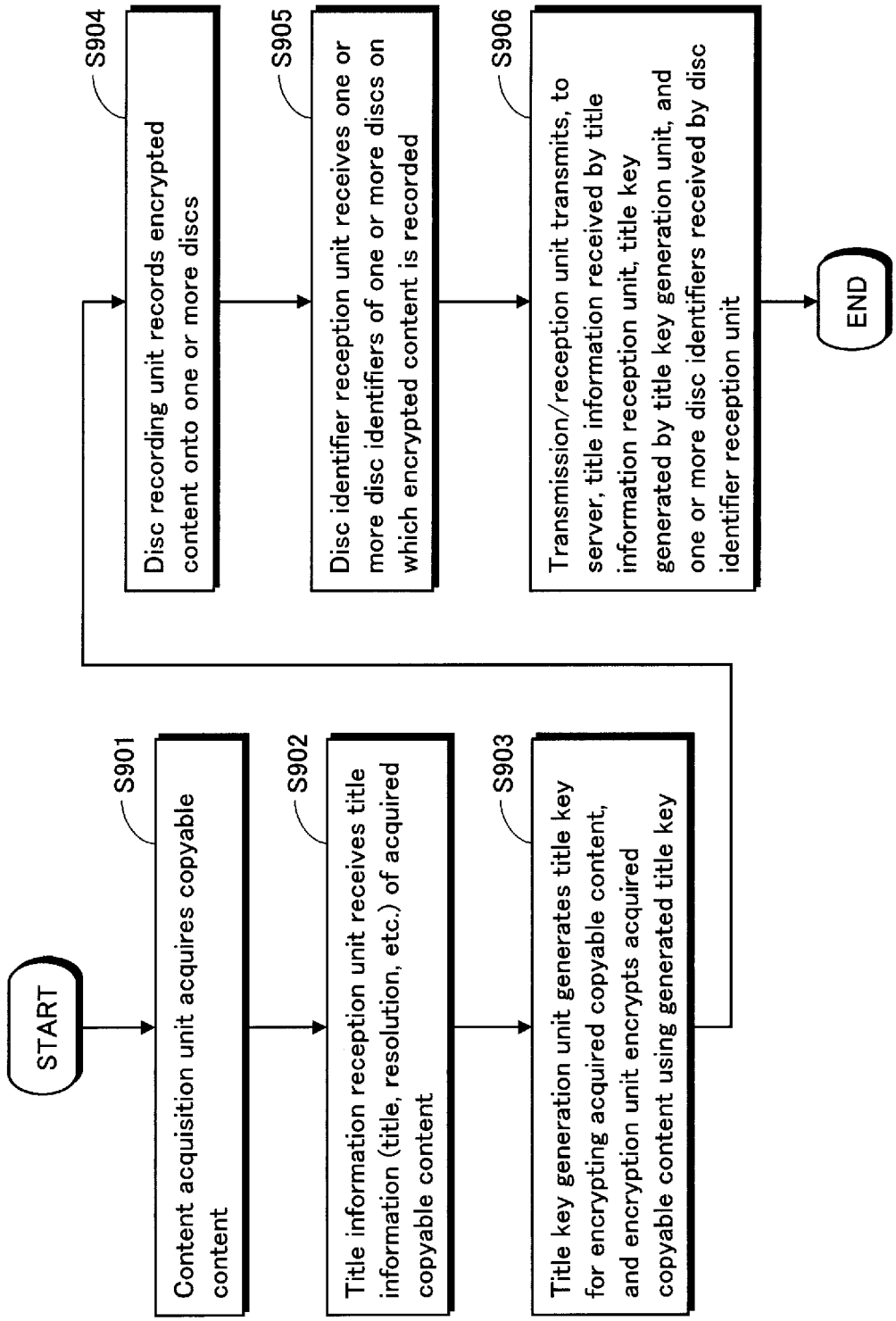
FIG. 9 shows operations of the disc manufacturing apparatus 103.

The following describes the operations of the disc manufacturing apparatus 103, with use of FIG. 9.

The content acquisition unit 501 of the disc manufacturing apparatus 103 externally acquires a copyable content (Step S901). The title information reception unit 504 receives title information (title, resolution, etc.) of the acquired copyable content (Step S902). The title key generation unit 502 generates a title key for encrypting the copyable content, and the encryption unit 503 encrypts the copyable content using the generated title key (Step S903). Then, the disc recording unit 505 records the encrypted content onto one or more discs (Step S904). The disc identifier reception unit 506 receives one or more disc identifiers of the one or more discs on which the encrypted content is recorded (Step S905). The transmission/reception unit 507 transmits, to the server apparatus 105, the title information received by the title information reception unit 504, the title key generated by the title key generation unit 502, and the one or more disc identifiers received by the disc identifier reception unit 506 (Step S906).

2.7 Operations of Recording Apparatus 104 and Server Apparatus 105

Figure 10:
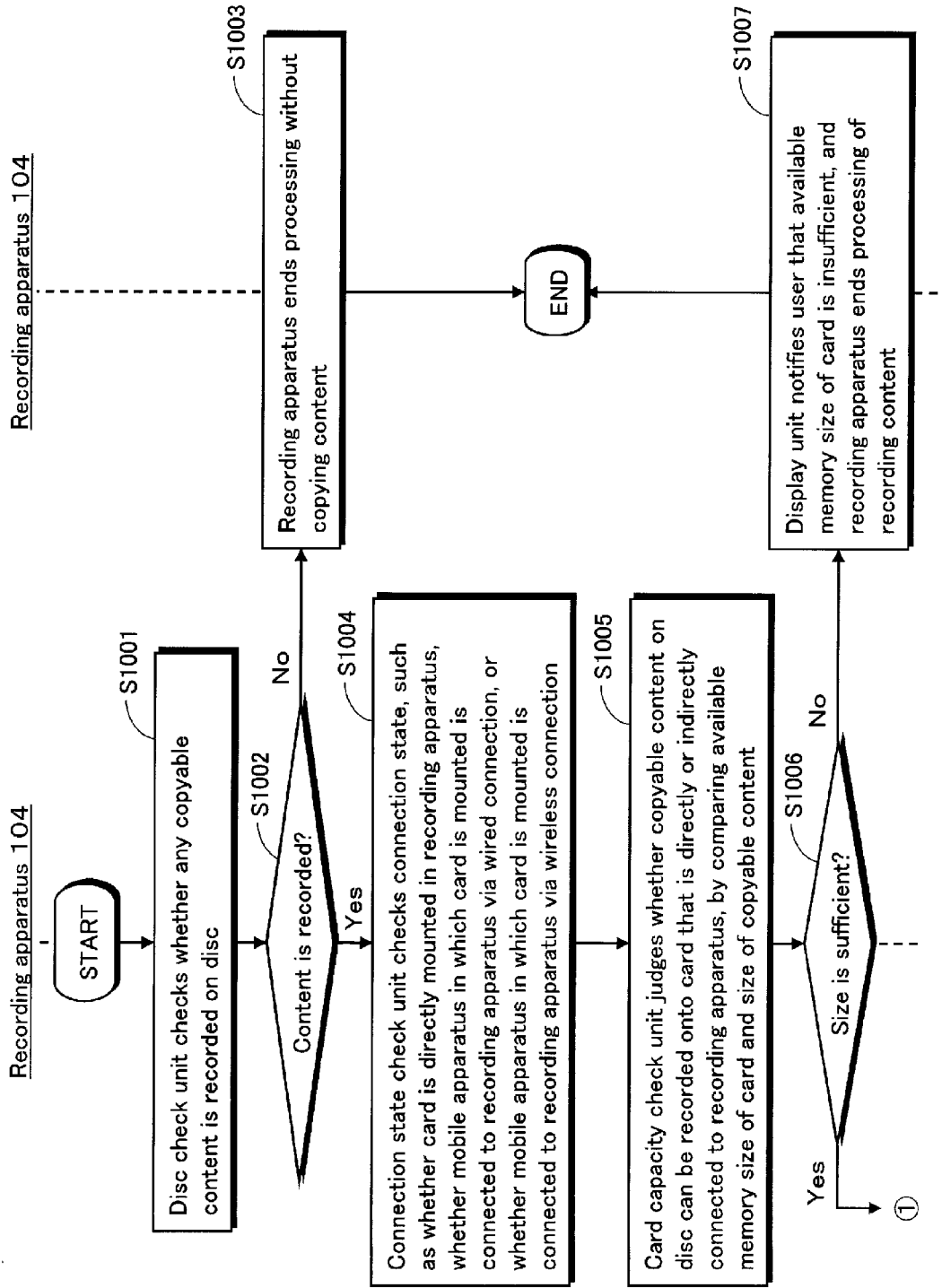
FIG. 10 is a diagram showing operations of the recording apparatus 104 and the server apparatus 105, followed by FIG. 11.
Figure 11:
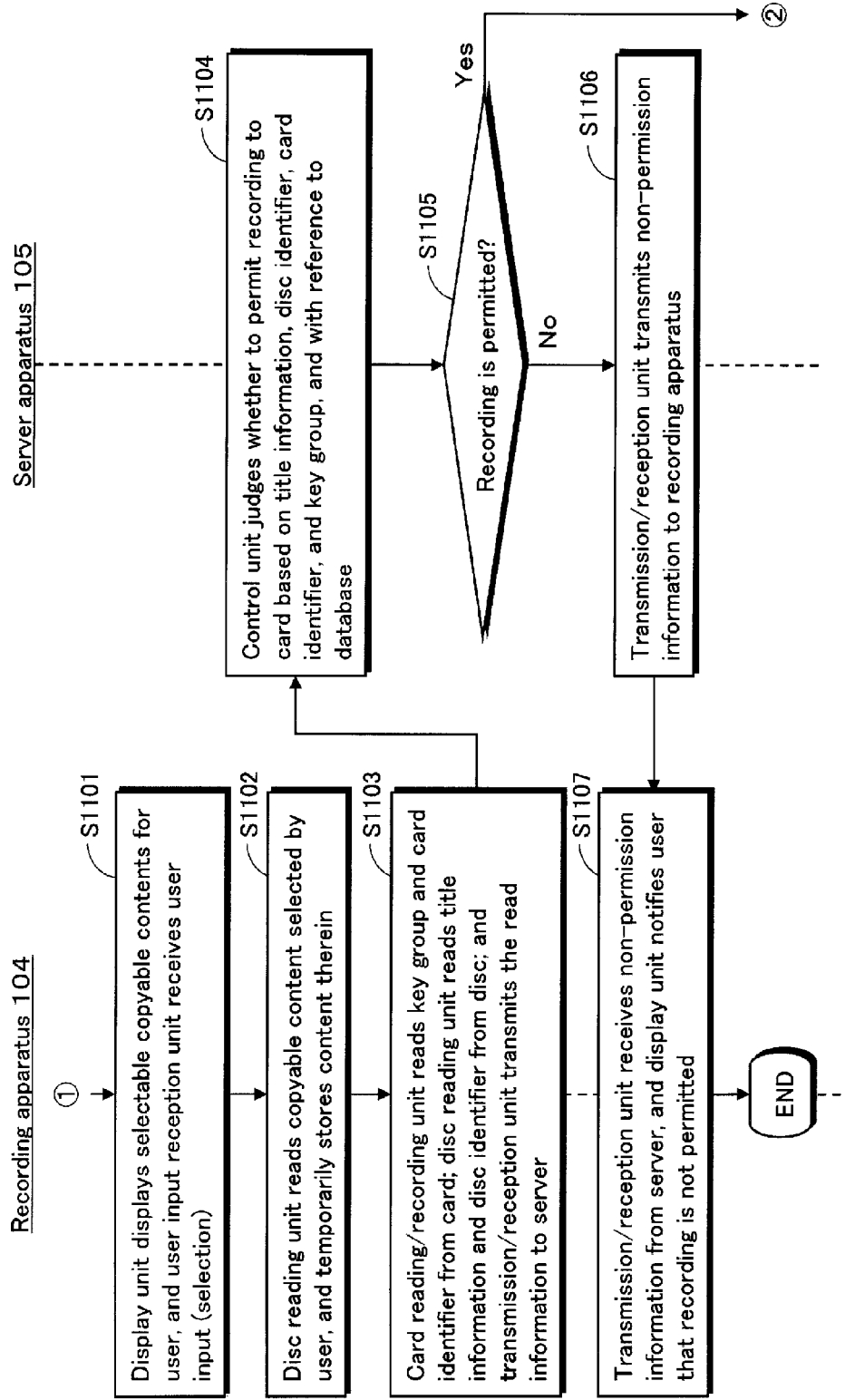
FIG. 11 is a diagram showing operations of the recording apparatus 104 and the server apparatus 105, followed by FIG. 12.
Figure 12:
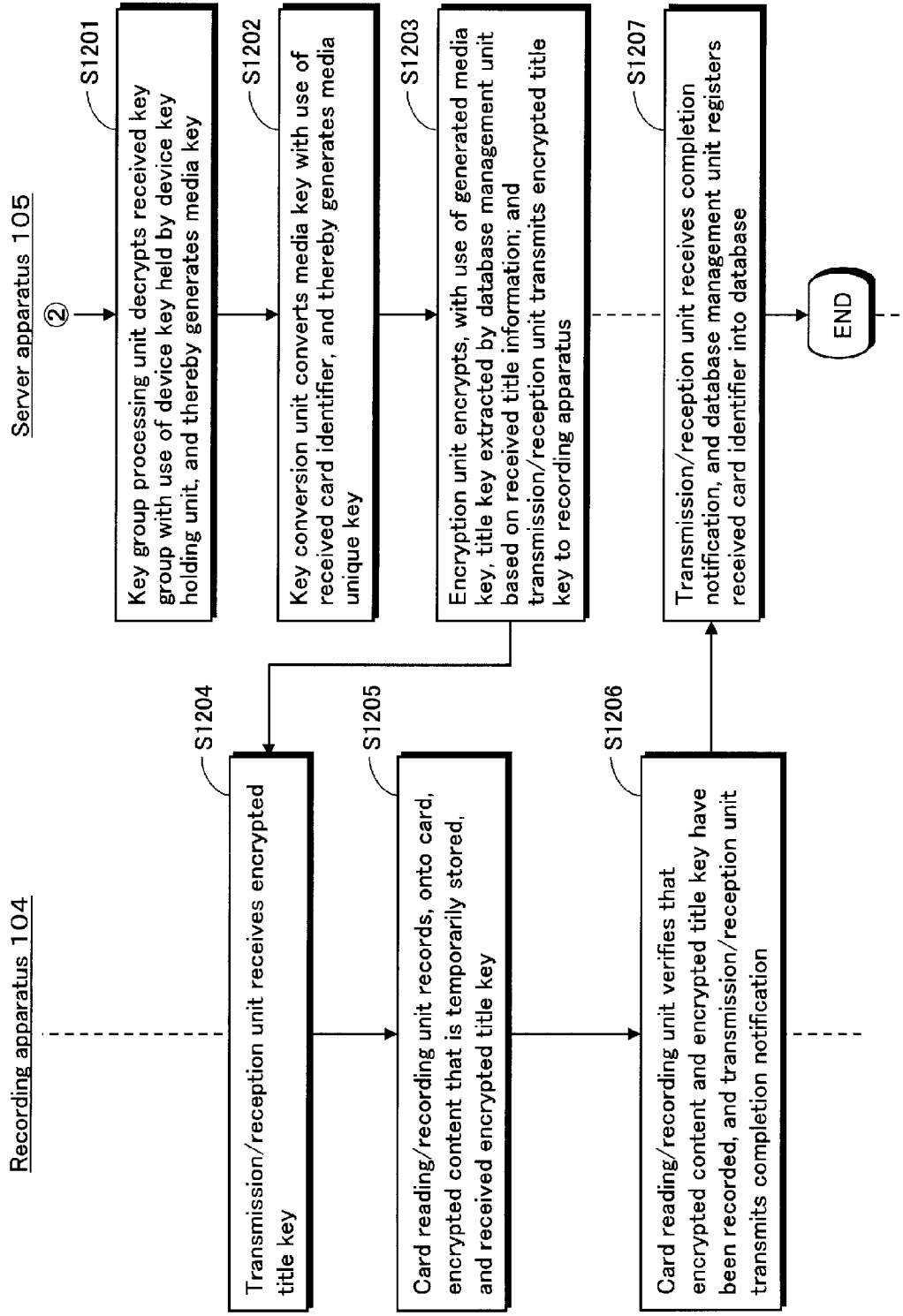
FIG. 12 is a diagram showing operations of the recording apparatus 104 and the server apparatus 105, following FIG. 11.

The following describes the operations of the recording apparatus 104 and the server apparatus 105, with reference to FIGS. 10 to 12.

The disc check unit 601 of the recording apparatus 104 checks whether any copyable content is recorded on the mounted disc 101 (Step S1001). When no copyable content is recorded ("No" in Step S1002), the recording apparatus 104 ends the processing without performing recording of a copyable content to the card 102 (Step S1003). When a copyable content is recorded ("Yes" in Step S1002), the connection state check unit 602 checks the connection state of the card 102, such as whether the card 102 is directly mounted in the recording apparatus 104 or the mobile apparatus 106 in which the card 102 is mounted is connected to the recording apparatus 104 via a wired or wireless connection (Step S1004). The card capacity check unit 603 judges whether the copyable content on the disc 101 can be recorded onto the card 102 that is directly or indirectly connected to the recording apparatus 104, the judgment being performed by comparing the available memory size of the card 102 and the size of the copyable content (Step S1005). When the available memory size of the card 102 is not sufficient for the recording of the copyable content ("No" in Step S1006), the display unit 604 notifies the user that the available memory size of the card 102 is insufficient for the recording, and the recording apparatus 104 ends the processing without performing the recording of the copyable content (Step S1007). When the available memory size of the card 102 is sufficient ("Yes" in Step S1006), the display unit 604 displays selectable copyable contents for the user, and the user input reception unit 605 receives a user input indicating a copyable content selected by the user (Step S1101). The disc reading unit 606 reads the copyable content selected by the user from the disc 101, and temporarily stores the copyable content therein (Step S1102). The card reading/recording unit 607 reads the key group and the card identifier from the card 102; the disc reading unit 606 reads the title information and the disc identifier from the disc 101; and the transmission/reception unit 608 transmits the read information to the server apparatus 105 (Step S1103). Then, the transmission/reception unit 701 of the server apparatus 105 receives, from the recording apparatus 104, the title information, the disc identifier, the key group, and the card identifier; and the control unit 708 judges whether to permit recording to the card 102 based on the received information, and with reference to the database (Step S1104). When the control unit 708 judges not to permit the recording ("No" in Step S1105), the transmission/reception unit 701 transmits, to the recording apparatus 104, non-permission information indicating that the recording is not permitted (Step S1106). The transmission/reception unit 608 of the recording apparatus 104 receives the non-permission information from the server apparatus 105, and the display unit 604 notifies the user that the recording is not permitted (Step S1107). When the control unit 708 judges to permit the recording ("Yes" in Step S1105), the key group processing unit 704 of the server apparatus 105 decrypts the key group received from the recording apparatus 104 with use of the device key held by the device key holding unit 703, and thereby generates a media key (Step S1201). The key conversion unit 705 converts the media key obtained in Step S1201 with use of the card identifier received from the recording apparatus 104, and thereby generates a media unique key (Step S1202). The encryption unit 707 encrypts, with use of the generated media unique key, the title key extracted by the database management unit 702 based on the received title information; and the transmission/reception unit 701 transmits the encrypted title key to the recording apparatus 104 (Step S1203).

Then, the transmission/reception unit 608 of the recording apparatus 104 receives the encrypted title key from the server apparatus 105 (Step S1204). The card reading/recording unit 607 records, onto the card 102, the encrypted content that is temporarily stored, and the received encrypted title key (Step S1205). Then, the card reading/recording unit 607 verifies that the encrypted content and the encrypted title key have been recorded, and the transmission/reception unit 608 transmits a completion notification indicating the completion of the recording to the server apparatus 105 (Step S1206). Finally, the transmission/reception unit 701 of the server apparatus 105 receives the completion notification from the recording apparatus 104, and the database management unit 702 registers the already received card identifier into the database and ends the processing (Step S1207).

2.8 Operation of Mobile Apparatus 106

Figure 13:
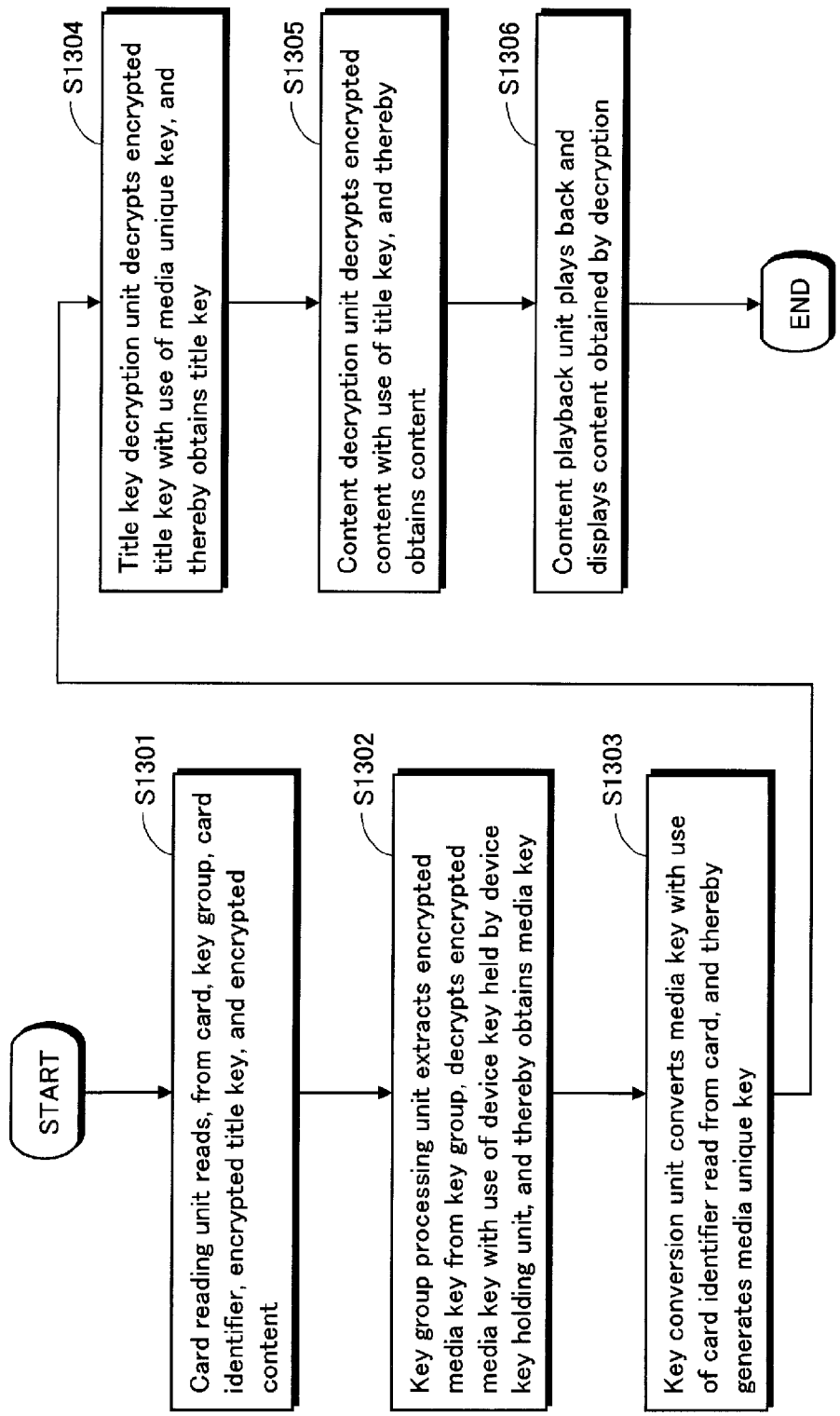
FIG. 13 shows operations of the mobile apparatus 106.

The following describes operations of the mobile apparatus 106, with reference to FIG. 13.

The card reading unit 801 of the mobile apparatus 106 reads, from the mounted card 102, the key group, the card identifier, the encrypted title key, and the encrypted content (Step S1301). The key group processing unit 803 extracts an encrypted media key from the key group, decrypts the encrypted media key with use of the device key held by the device key holding unit 802, and thereby obtains a media key (Step S1302). The key conversion unit 804 converts the media key obtained by the key group processing unit 803 with use of the card identifier read from the card 102, and thereby generates a media unique key (Step S1303). The title key decryption unit 805 decrypts the encrypted title key read from the card 102 with use of the media unique key generated by the key conversion unit 804, and thereby obtains a title key (Step S1304). The content decryption unit 806 decrypts the encrypted content read from the card 102 with use of the title key obtained by the title key decryption unit 805, and thereby obtains a content (Step S1305). The content playback unit 807 plays back and displays the content obtained by the content decryption unit 806 (Step S1306).

3. Modifications

Although the present invention has been described based on the aforementioned embodiment, the present invention is of course not limited to the aforementioned embodiment. For example, the following cases are also included in the present invention.

(1) In the aforementioned embodiment, the card capacity check unit 603 of the recording apparatus 104 compares the available memory size of the card 102 and the size of the copyable content, and notifies the user that the copyable content cannot be recorded onto the card 102 if the available memory size is not sufficient for the recording. However, the present invention is not limited to such a structure. For example, assume that although the available memory size of the card 102 is sufficient, the card 102 is being used for a different purpose by the recording apparatus and is thus not suitable to be removed from the recording apparatus and used in the mobile apparatus for viewing and listening of the copyable content. In this case, the display unit 604 may notify the user that the card 102 is not suitable, and encourages the user to mount a different card in the recording apparatus. The different purpose may be, for example, a case where the card 102 is being used as a local storage of the recording apparatus.

(2) In the aforementioned embodiment, the disc 101 has the disc identifier recording area 202 in which a disc identifier for uniquely identifying the disc 101 is recorded, and the disc reading unit 606 of the recording apparatus 104 reads the disc identifier from the disc 101. However, the present invention is not limited to such a structure. For example, information for uniquely identifying the disc may be printed on a surface of the disc or a package of the disc. Alternatively, a sheet on which an identifier of the disc is written may be included in the package of the disc. In such a case, the following process is performed instead of the disc reading unit 606 automatically reading the disc identifier from the disc. First, the display unit 604 displays a screen that encourages the user to input an identifier of the disc. Then, the user input reception unit 605 receives an input of the identifier from the user, and the transmission/reception unit 608 transmits the identifier to the server apparatus 105. Here, the disc check unit 601 of the recording apparatus 104 may check whether the disc identifier is recorded on the disc. Then, based on a result of the check, the disc check unit 601 may judge whether it is necessary to encourage the user to input the identifier of the disc.

Furthermore, even when the disc identifier is recorded on the disc, it is not always necessary to automatically read the disc identifier and transmits the disc identifier to the server apparatus 105. Instead, the display unit 604 may ask the user whether he/she wishes to transmit the disc identifier before the transmission. For example, the display unit 604 may display the read disc identifier on the screen and, at the same time, enable the user to input an identifier. Then, the display unit 604 may let the user select whether to transmit, to the server apparatus 105, the disc identifier displayed on the screen or the identifier input by the user. This structure is useful when, for example, there is a problem with the disc identifier recorded on the disc, and the server apparatus 105 judges whether to permit copying based on a different identifier input by the user.

(3) In the aforementioned embodiment, when a plurality of copyable contents are recorded on the disc, the display unit 604 of the recording apparatus 104 displays selectable copyable contents for the user. However, the present invention is not limited to such a structure. Instead, the display unit 604 may emphasize a recommended copyable content using color or bold characters, according to the specifications (e.g., whether a hard disk drive is provided or not) of the recording apparatus or the specifications of the mobile apparatus. Alternatively, the display unit 604 may gray out a non-recommended copyable content or may not display such a non-recommended copyable content.

Also, the recording apparatus 104 may include a judgment unit. In this case, the display unit 604 may display a screen to encourage the user to input the maker, model, etc. of the mobile apparatus of the user, and the user input reception unit 605 may receive an input from the user. The judgment unit then judges which copyable content on the disc is supported by the mobile apparatus 106, based on a specification list showing the specifications of mobile apparatuses that is stored in the recording apparatus, or a specification list showing the specifications of mobile apparatuses that is obtainable via external connection. Based on a result of the judgment by the judgment unit, the display unit 604 may change the display pattern. Furthermore, the server apparatus 105 may include a holding unit for holding a specification list showing the specifications of mobile apparatuses. Then, in response to a request from the recording apparatus 104, the server apparatus 105 may transmit the specification list. Alternatively, the recording apparatus 104 may transmit information indicating the maker, model, etc. of a mobile apparatus to the server apparatus 105. Then, upon receiving the information on the mobile apparatus, the server apparatus 105 may transmit the specifications of the mobile apparatus.

The specifications of the mobile apparatus 106 may show, for example, that the mobile apparatus 106 supports playback of a QVGA content but not a VGA content, or whether recording of a content is possible while the mobile apparatus 106 in which the card 102 is mounted is connected to the recording apparatus 104 via a wired/wireless connection. Assume that the mobile apparatus 106 of a user does not support playback of a VGA content. In this case, although a VGA content is recorded on the disc 101, the display unit 604 may not display the VGA content as a candidate for a copyable content based on a result of judgment by the judgment unit. Also, assume that the mobile apparatus 106 does not support writing via a wired connection with the recording apparatus 104. In this case, if the connection state check unit 602 of the recording apparatus 104 judges that the mobile apparatus is connected via a wired connection, the judgment unit judges whether it is necessary to warn the user, based on both the specifications of the mobile apparatus 106 and the connection state of the mobile apparatus 106. When judging that it is necessary to warn the user, the display unit 604 may display a warning screen indicating that writing via the wired connection is not supported, based on the judgment by the judgment unit.

(4) In the aforementioned embodiment, the transmission/reception unit 701 of the server apparatus 105 transmits the encrypted title key to the recording apparatus 104. However, the transmission/reception unit 701 may transmit an additional content along with the encrypted title key. Also, the card reading/recording unit 607 of the recording apparatus 104 may directly or falsely concatenate the additional content received from the server apparatus 105 with the content read from the disc, and write the concatenated content onto the card 102.

Furthermore, in a case where a content is one of a series of a plurality of episodes, the card reading/recording unit 607 may externally acquire the size of another episode, and record, onto the card 102, dummy data having the same size as the size of the other episode so as to ensure enough space for recording the other episode. Also, the recording apparatus 104 may manage the title information of the other episode. In this way, when the other episode is to be recorded next time, the dummy data may be overwritten with the other episode.

(5) In the aforementioned embodiment, the disc identifier recorded on the disc 101 or the disc identifier input by the user may include an expiry date for permitting copying. Alternatively, the title information on the disc may include a copy permission period in addition to a title, resolution, and a URL. The disc check unit 601 of the recording apparatus 104 may check both the copy permission period and the current date and time. If the copy permission period has expired as a result of the check, the recording apparatus 104 may not connect to the server apparatus 105 or notify the user that the copy permission period has expired. If the copy permission period has expired as a result of the check, the recording apparatus 104 may not connect to the server apparatus 105 or notify the user that the copy permission period has expired. Furthermore, if the remaining days before the copy permission period expires are below a predetermined threshold value as a result of the check, the recording apparatus 104 may notify the user that the number of remaining days is below the predetermined threshold value.

(6) In the aforementioned embodiment, the database management unit 702 of the server apparatus 105 may have the following structure. That is, the database management unit 702 may manage copying based on a pair of the disc identifier of the disc 101 and the card identifier of the card 102. Then, when the recording apparatus 104 fails to write a copyable content to the card 102 or when the user has deleted the content of the card 102 by mistake, the database management unit 702 may permit the retransmission of the encrypted title key, in response to the recording apparatus 104 requesting the retransmission of the encrypted title key, only when a pair of a disc identifier and a card identifier received from the recording apparatus 104 matches the pair on the database. In this case, since it is retransmission, the "current copy count" managed by the database does not increase, which enables the server apparatus 105 to address such problems as a writing failure or an unexpected deletion of a content by the user. Also, since the server apparatus 105 transmits a valid encrypted title key only to the same card 102, the number of cards to which the content has been copied does not increase, either.

Furthermore, when the recording apparatus 104 judges that the writing has failed, the database management unit 702 may not register the card identifier into the database, in response to a cancel request from the recording apparatus 104. In this case, it is assumed that the server apparatus 105 has authenticated the recording apparatus 104 and validated the authenticity of the recording apparatus 104, and that the server apparatus 105 is connected to the recording apparatus 104 via a secure channel such as SSL (Secure Sockets Layer). When the card 102 has been mounted appropriately, thus enabling the recording apparatus 104 to judge that the writing has failed, the recording apparatus 104 may transmit the cancel request to the server apparatus 105. When, for example, the card 102 is removed intentionally by the user, thus not enabling the recording apparatus 104 to judge whether the writing has failed, the recording apparatus 104 may not transmit the cancel request to the server apparatus 105.

(7) In the aforementioned embodiment, if the content is one of a series of a plurality of episodes, the database management unit 702 of the server apparatus 105 may judge whether all of the episodes have been copied onto the same card 102. When judging that all of the episodes have been copied, the database management unit 702 may permit the transmission of the additional content.

Alternatively, the recording apparatus 104 may hold a device identifier (i.e., device ID) thereof, and the transmission/reception unit 608 of the recording apparatus 104 may transmit the device identifier or a user identifier (i.e., user ID) of the user after requesting an input of the user identifier. When judging that all of the episodes have been copied by the same recording apparatus or the same user, the database management unit 702 may permit the transmission of the additional content in the same manner as described above.

Furthermore, it is possible to transmit only permission information indicating permission for copying (i.e., encrypted title key) instead of transmitting the additional content itself. Then, the additional content, i.e., the encrypted content may be separately obtained.

(8) In the aforementioned embodiment, the recording apparatus 104 may hold the device identifier (i.e., device ID), and transmit the device identifier to the server apparatus 105. The server apparatus 105 may include a device identifier holding unit for holding therein (i) a device identifier of the recording apparatus 104 that has made a retransmission request of the encrypted title key and (ii) a retransmission request count indicating the number of times the retransmission request has been made. If the retransmission request count exceeds a predetermined threshold value, the server apparatus 105 may not retransmit the encrypted title key.

(9) In the aforementioned embodiment, if a plurality of copyable contents are recorded on the disc 101 and a server apparatus to be connected is different for each copyable content, a database such as a copy count may be shared among the plurality of server apparatuses. This makes it possible to manage the copy count more strictly.

(10) In the aforementioned embodiment, the copyable content recorded on the disc 101 is copied (recorded) onto the card 102. However, the present invention is not limited to such a structure. For example, a copyable content recorded on a memory card, a USB memory, a hard disk drive, an internal memory of a device, or the like may be copied (recorded) onto a disc, a USB memory, a hard disk drive, an internal memory of the mobile apparatus or the like.

(11) In the aforementioned embodiment, each of the recording apparatus 104, the server apparatus 105, and the card 102 may include a mutual authentication unit for performing mutual authentication. Then, mutual authentication is performed (i) between the recording apparatus 104 and the server apparatus 105 or (ii) between the recording apparatus 104 and the card 102 so as to establish a secure channel. After the secure channel is established, data and information may be transmitted, received, read, and/or written via the secure channel.

(12) The aforementioned embodiment describes the implementation of the recording apparatus 104. However, the present invention is not limited to the recording apparatus 104. The present invention may be a playback apparatus, as long as the playback apparatus is capable of reading a disc and satisfies one of the following two conditions: (i) a card can be directly mounted into the playback apparatus; and (ii) the playback apparatus can connect to a mobile apparatus via a wired or wireless connection. Furthermore, the present invention may be a television or an STB as long as the television or the STB can record a copyable content to an internal memory or a hard disk drive thereof, and perform copying of the copyable content recorded therein.

(13) In the aforementioned embodiment, the title information to be recorded onto the disc 101 includes a title, resolution, and a URL. However, the present invention is not limited to such a structure. In addition to these information pieces, the title information may include information pieces relating to a codec, a copyright protection technique being used, the type of the content (e.g., video, music, etc.), an expiry date beyond which copying is not permitted, and so on. As for the URL, a default URL may be stored in the recording apparatus 104.

(14) In the aforementioned embodiment, the server apparatus 105 encrypts the title key with use of the card identifier of the card 102. However, the present invention is not limited to such a structure. For example, the server apparatus 105 and the recording apparatus 104 may perform mutual authentication with each other, share a key and establish a secure channel. Then, the server apparatus 105 may encrypt the title key with use of the shared key, and transmit the encrypted title key to the recording apparatus 104. Upon receiving the encrypted title key, the recording apparatus 104 may decrypt the encrypted title key with use of the shared key. Then, the recording apparatus 104 may perform the key group processing and key conversion, which are performed by the server apparatus 105 in the aforementioned embodiment, so as to generate an encrypted title key to be recorded onto the card 102.

Also, the server apparatus 105 and the recording apparatus 104 may perform mutual authentication to establish a secure channel by sharing a key, and then a doubly-encrypted title key is generated by encrypting the encrypted title key by using the shared key. Then, the server apparatus 105 may transmit the doubly-encrypted title key to the recording apparatus 104, and the recording apparatus 104 may decrypt the received doubly-encrypted title key by using the shared key to generate the encrypted title key, and record the encrypted title key onto the card 102.

(15) In the aforementioned embodiment, the server apparatus 105 records and manages a pair of the disc identifier of the disc 101 and the card identifier of the card 102. However, the present invention is not limited to such a structure. The server apparatus 105 may record and manage a pair of a disc identifier and a device identifier for identifying a recording apparatus for a pair of a disc identifier and a user identifier for identifying a user. Also, the server apparatus 105 may store a predetermined threshold value for the retransmission request and, for example, may not accept the retransmission request after the retransmission request count exceeds the predetermined threshold value, even if the retransmission request is made by the same user.

(16) In the aforementioned embodiment, one apparatus has multiple functions (i.e., components). However, the present invention is not limited to such a structure. The present invention includes a case where the functions (i.e., components) are implemented by a plurality of apparatuses, and a combination of these apparatuses realizes the similar advantageous effect and functions.

(17) Part or all of the components of each apparatus described above may be composed of a removable IC card or a single module. The IC card or the module is a computer system composed of a microprocessor, a ROM, a RAM, or the like. The IC card or the module may include the aforementioned super-multifunctional LSI. The IC card or the module achieves its functions by the microprocessor operating according to a computer program. The IC card or the module may be tamper-resistant.

(18) The management apparatus 105*a* and the copying apparatus 104*a* of Embodiment 1 correspond to the server apparatus 105 and the recording apparatus 104 of Embodiment 2, respectively. The original recording medium 101*a* and the copy recording medium 102*a* of Embodiment 1 correspond to the recording medium (disc) 101 and the recording medium (card) 102 of Embodiment 2, respectively.

(19) As shown in Step S1104 in FIG. 11, the control unit 708 determines whether or not to permit the recording onto the card 102, with reference to the database under the management, based on the received pieces of information.

Figure 18:
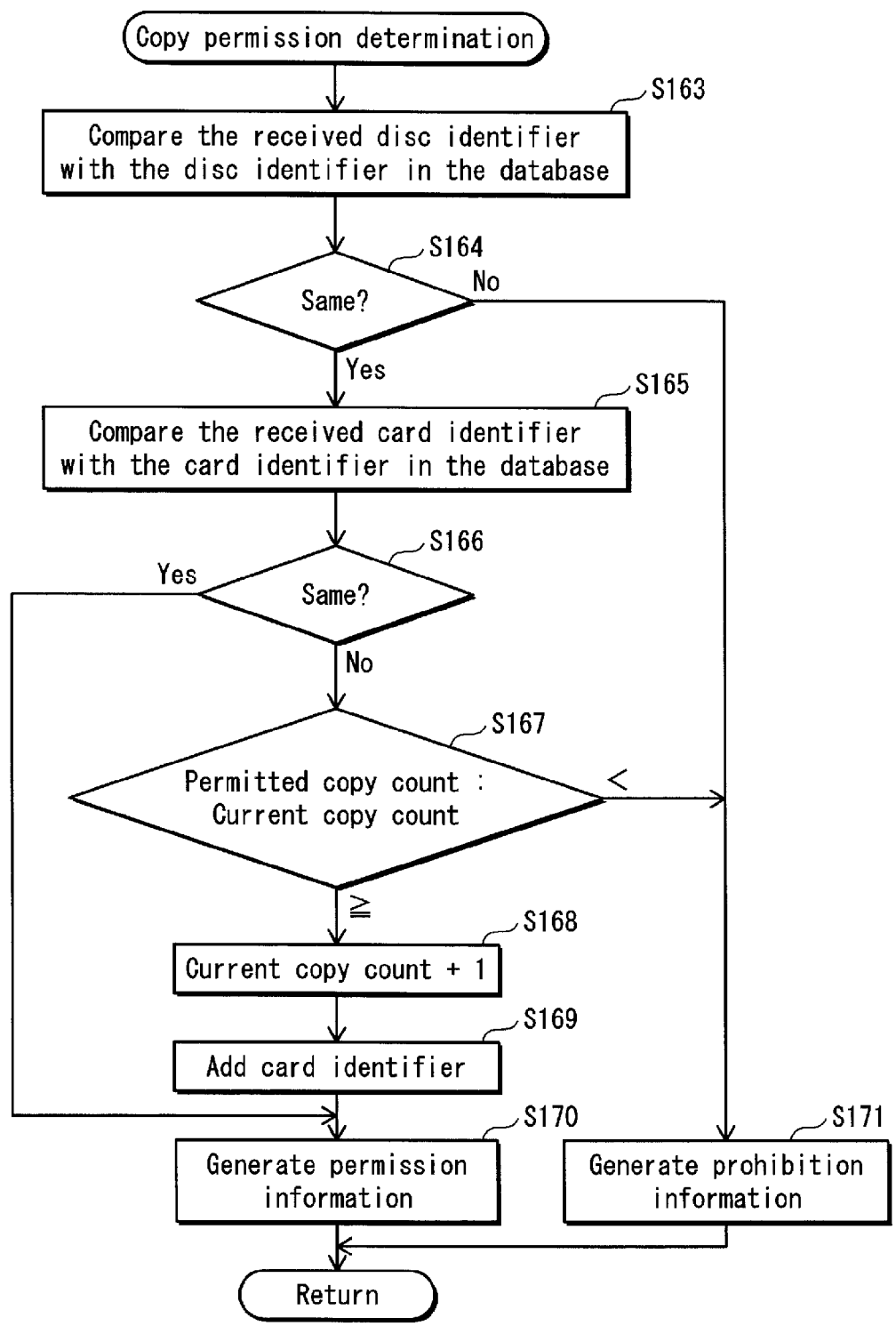
FIG. 18 is a flowchart showing operations performed by a database management unit 702 of the server apparatus 105 to determine whether to give copy permission.

The following describes in detail an example thereof, with reference to the flowchart shown in FIG. 18.

The control unit 708 compares the received disc identifier with the disc identifiers registered in the database (Step S163). If the same disc identifier as the received disc identifier is not registered in the database (No in Step S164), the control unit 708 generates prohibition information that indicates prohibition of the writing to the card 102 (i.e. prohibition of the copying) (Step S171), and ends the processing for the copy permission determination.

If the same disc identifier as the received disc identifier is registered in the database (Yes in Step S164), the control unit 708 next compares the received card identifier with the card identifier registered in the database in correspondence with the received disc identifier (Step S165). If the same card identifier as the received card identifier is registered in the database (Yes in Step S166), the control unit 708 generates permission information that indicates permission for copying to the card 102 (Step S170), and ends the processing for the copy permission determination.

If the same card identifier as the received card identifier is not registered in the database (No in Step S166), the control unit 708 compares a current copy count indicating the count of copies that have been made so far with a permitted copy count registered in the database in correspondence with the disc identifier. If the permitted copy count is less than the current copy count ("<" in Step S167), the control unit 708 generates the prohibition information (Step S171), and ends the processing for the copy permission determination.

If the permitted copy count is greater than or is equal to the current copy count (">  or =" in Step S167), the control unit 708 adds "1" to the current copy count in the database (Step S168), additionally writes the card identifier to the database (Step S169), generates the permission information (Step S170), and ends the processing for the copy permission determination.

(20) Examples of the recording medium (disc) 101 include a CD-ROM, an MO, a DVD, a DVD-ROM, a DVD-RAM and a BD (Blu-ray Disc). Note that the recording medium 101 may be a memory card having a semiconductor memory, or a portable magnetic disk device.

Examples of the recording medium (card) 102 include a memory card having a semiconductor memory. Note that the recording medium 102 may be a portable magnetic disk device, or a rewritable optical disc medium.

(21) In Embodiment 1, the management apparatus 105*a* and the copying apparatus 104*a* may be connected with each other via a network such as the Internet.

In Embodiment 2, the server apparatus 105 and the recording apparatus 104 may be connected with each other via a network such as the Internet.

The disc manufacturing apparatus 103 and the server apparatus 105 may be connected with each other via a network such as the Internet. The disc manufacturing apparatus 103 and the server apparatus 105 may be connected with each other via a dedicated line. The disc manufacturing apparatus 103 and the server apparatus 105 may exchange information by means of a recording medium, such as a DVD, a BD and a memory card.

(22) Examples of mobile apparatus 106 include a mobile telephone, a mobile information terminal, a mobile audio player, and a mobile video/audio player.

(23) Example of contents recorded on the recording medium 101 and the recording medium 102 include movie contents composed of video and audio data, audio contents such as music, moving picture contents such as videos, text data contents composed of characters, database contents, and spread sheet contents.

It is assumed above that the recording medium 101 stores thereon contents of the same title. However, this is not essential. The recording medium 101 may store thereon contents of several titles. If this is the case, the recording medium 101 stores thereon a single copyable content for each title. Specifically, the recording medium 101 may store thereon four movie contents corresponding to four titles, namely "ABC", "DEF", "HIG" and "JKL". If this is the case, the recording medium 101 may store thereon one or more copyable contents for each of the four movie titles.

(24) As described above as to Embodiment 2, the recording medium 101 stores thereon a high-quality main movie and two types of copyable contents. The main movie and the two types of copyable contents are of the same movie title, and are different only in their picture quality.

Note that the recording medium 101 may store thereon more types of copyable contents, together with the main movie. The main movie and the two types of copyable contents are different only in their picture quality.

The recording medium 101 may store thereon a high-quality audio content and two types of copyable audio contents. The audio content and the two types of copyable audio contents are different only in their audio quality.

(25) The key group 311 shown in FIG. 4 includes N encrypted media keys. The N encrypted media keys correspond to N devices which are each assigned a unique device key. Examples of the devices include a recording apparatus for recording contents, and a playback apparatus for playing contents. Each encrypted media key is generated by encrypting the same media key according to an encryption algorithm such as AES, by using the device key that is assigned to the corresponding device thereof.

(26) In Embodiment 2, a common key cryptosystem is used in the following cases. In a common key cryptosystem, the same (i.e. common) key is used in both encryption and decryption. A common key cryptosystem is also referred to as a secret key cryptosystem or a symmetric key encryption scheme.

The cases of encrypting a media key by using a device key;
The cases of decrypting an encrypted media key by using a device key;
The cases of encrypting contents by using a title key;
(the contents mentioned above are a main movie content and copyable contents.)
The cases of decrypting encrypted contents by using a title key;
(the encrypted contents mentioned above are an encrypted main movie content and encrypted copyable contents.)
The cases of encrypting a title key by using a media unique key; and
The cases of decrypting an encrypted title key by using a media unique key.

(27) The disc manufacturing apparatus 103 manufactures one or more discs for the contents of the same movie title.

(28) The following supplementarily describes the database held by the database management unit 702 of the server apparatus 105.

The database management unit 702 of the server apparatus 105 holds a database as described above. The following describes another example of the database, with reference to FIG. 19.

Figure 19:
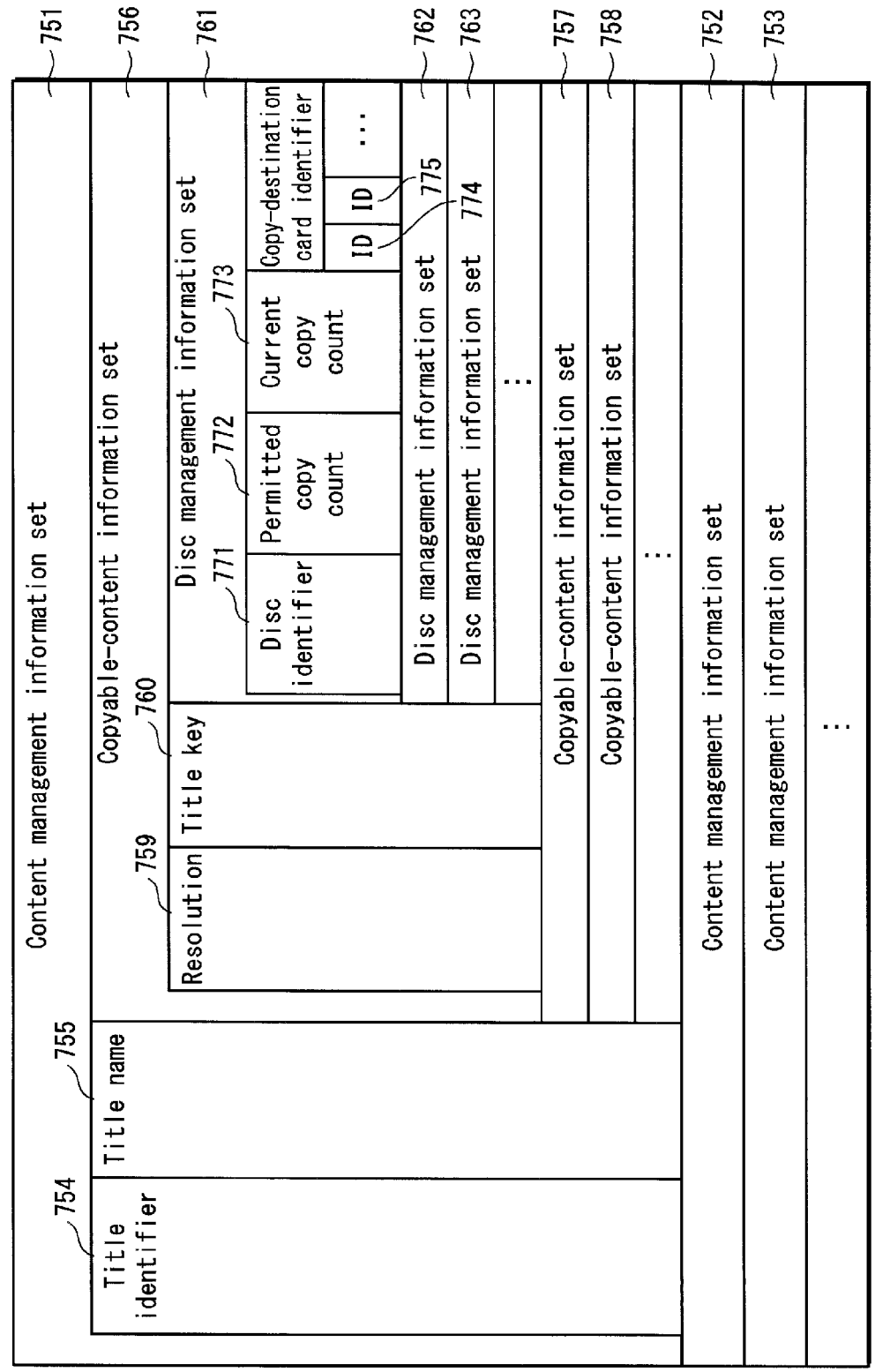
FIG. 19 shows a data structure of a database 711c as an example of a database that is under the management of the server apparatus 105.

The database 711c shown in FIG. 19 has areas for storing a plurality of content management information sets 751, 752, 753, etc. Each content management information set corresponds to the content of a single movie title. The content management information set 751 contains a title identifier 754, a title name 755 and a plurality of copyable-content information sets 756, 757, 758, etc. Each content management information set (752, 753, etc.) has the same structure as the content management information set 751.

The title identifier 754 is an identifier for uniquely identifying the corresponding movie content.

The title name 755 is a name for identifying the corresponding movie content.

Each copyable-content information set corresponds to the copyable content generated for the content of the movie title. The copyable-content information set 756 contains resolution 759, a title key 760 and a disc management information sets 761, 762, 763, etc. Each copyable-content information set (757, 758, etc.) has the same structure as the copyable-content information set 756.

The resolution 759 indicates the resolution of the corresponding copyable content.

The title key 760 is an encrypted key to be used for encryption of the corresponding copyable content.

Each disc management information set corresponds to a single disc manufactured for the corresponding movie content. The disc management information set 761 contains a disc identifier 771, a permitted copy count 772, a current copy count 773 and copy-destination card identifiers 774, 775, etc.

The disc identifier 771 is an identifier for uniquely identifying a single disc manufactured for the corresponding movie content.

The permitted copy count 772 indicates the maximum number of times for which copying of the copyable content is permitted as to a single disc manufactured for the corresponding movie content.

The current copy count 773 indicates the count of copies of the copyable content that have been made so far as to a single disc manufactured for the corresponding movie content.

Each of the copy-destination card identifiers 774, 775, etc. is an identifier that uniquely identifies the card as the copy destination of the copyable content when the copyable content is copied to the card, as to a single disc manufactured for the corresponding movie content.

Next, FIG. 20 is described. FIG. 20 shows a database 711d as a specific example of the database 711c shown in FIG. 19.

The database 711d contains a content management information set 740. The content management information set 740 corresponds to the content of a single movie title. The title identifier 741 identifying the content of the movie is "000123", and the title name 742 identifying the content of the movie is "ABC". The content management information set 740 contains two copyable-content information sets. The two copyable-content information sets are the same as that of the database 711b shown in FIG. 15. Thus, detailed explanation thereof is omitted.

(29) The following supplementarily explains the method for generating the media unique key.

The key conversion unit 705 of the server apparatus 105 and the key conversion unit 804 of the mobile apparatus 106 generate a media unique key by a same method.

A media unique key may be generated in the following manner

Each of the key conversion unit 705 and the key conversion unit 804 may concatenate the media key and the card identifier in this order, apply a one-way function to the concatenated entity to obtain a calculation result, and use the whole calculation result as the media unique key.

Here, it is not essential to use the whole calculation result. For example, part of the calculation result, such as first 64 bits or 128 bits may be extracted from the calculation result, and the extracted data may be used as the media unique key.

As the one-way function, an encryption algorithm or a hash function may be used. Examples of the encryption algorithm include DES and AES. Examples of the hash function include SHA (Secure Hash Algorithm)-1, SHA-224, SHA-256, SHA-384 and SHA-512.

Although it is described above that the media key and the card identifier are concatenated in this order, this is not essential. The card identifier and the media key may be concatenated in this order. An exclusive OR operation may be performed on the media key and the card identifier. Also, an encryption algorithm may be applied to the card identifier by using the media key as the key. Also, an encryption algorithm may be applied to the media key by using the card identifier as the key.

Figure 21:
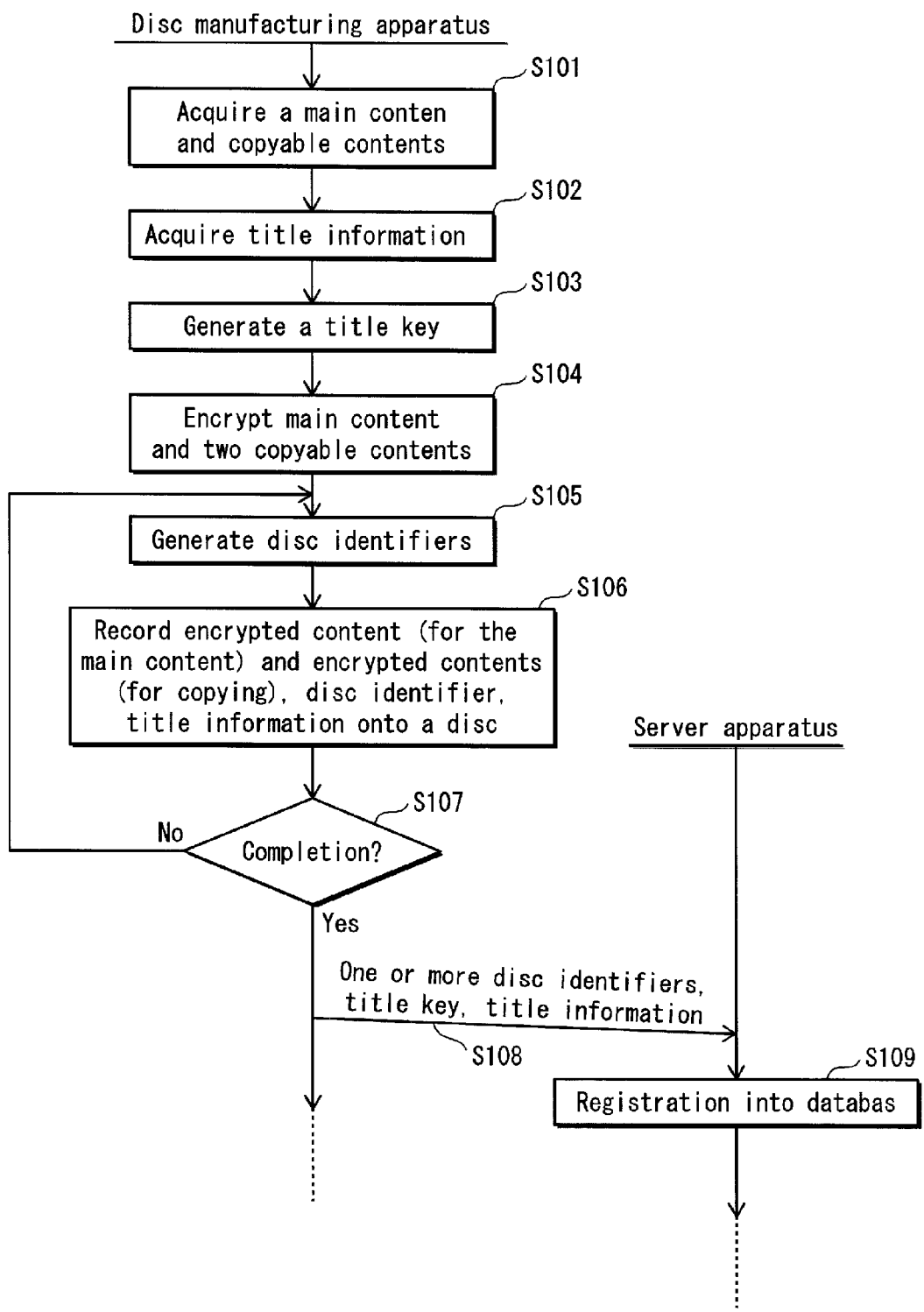
FIG. 21 is a diagram showing operations performed between the disc manufacturing apparatus 103 and the server apparatus 105.

(30) The following explains the operations performed between the disc manufacturing apparatus 103 and the server apparatus 105, with reference to the flowchart shown in FIG. 21.

The disc manufacturing apparatus 103 acquires a main content and two copyable contents from a content server apparatus (not illustrated) which stores therein the main content and the two copyable contents (Step S101), acquires the title information and so on (Step S102), generates a title key (Step S103), and encrypts the acquired main content and the acquired two copyable contents by using the generated title key, thereby generating three encrypted contents in total (i.e. main content and two copyable contents) (Step S104).

Next, the disc manufacturing apparatus 103 generates, for each of a plurality of discs to store the main content and the two copyable contents, disc identifiers that uniquely identify the discs (Step S105), and records an encrypted content (for the main content) two encrypted contents (for copying), the disc identifier, the title information and so on, onto a disc (Step S106).

The disc manufacturing apparatus 103 repeats Steps S105 to S106 for each of the discs. When the recording completes for all the discs (Step S107), the disc manufacturing apparatus 103 transmits all the generated disc identifiers, title keys, title information pieces and so on, to the server apparatus 105 (Step S108).

The server apparatus 105 receives all the disc identifiers, title keys, title information pieces and so on (Step S108), and additionally records all the received disc identifiers, title keys, title information pieces and so on to the database (Step S109).

Figure 22:
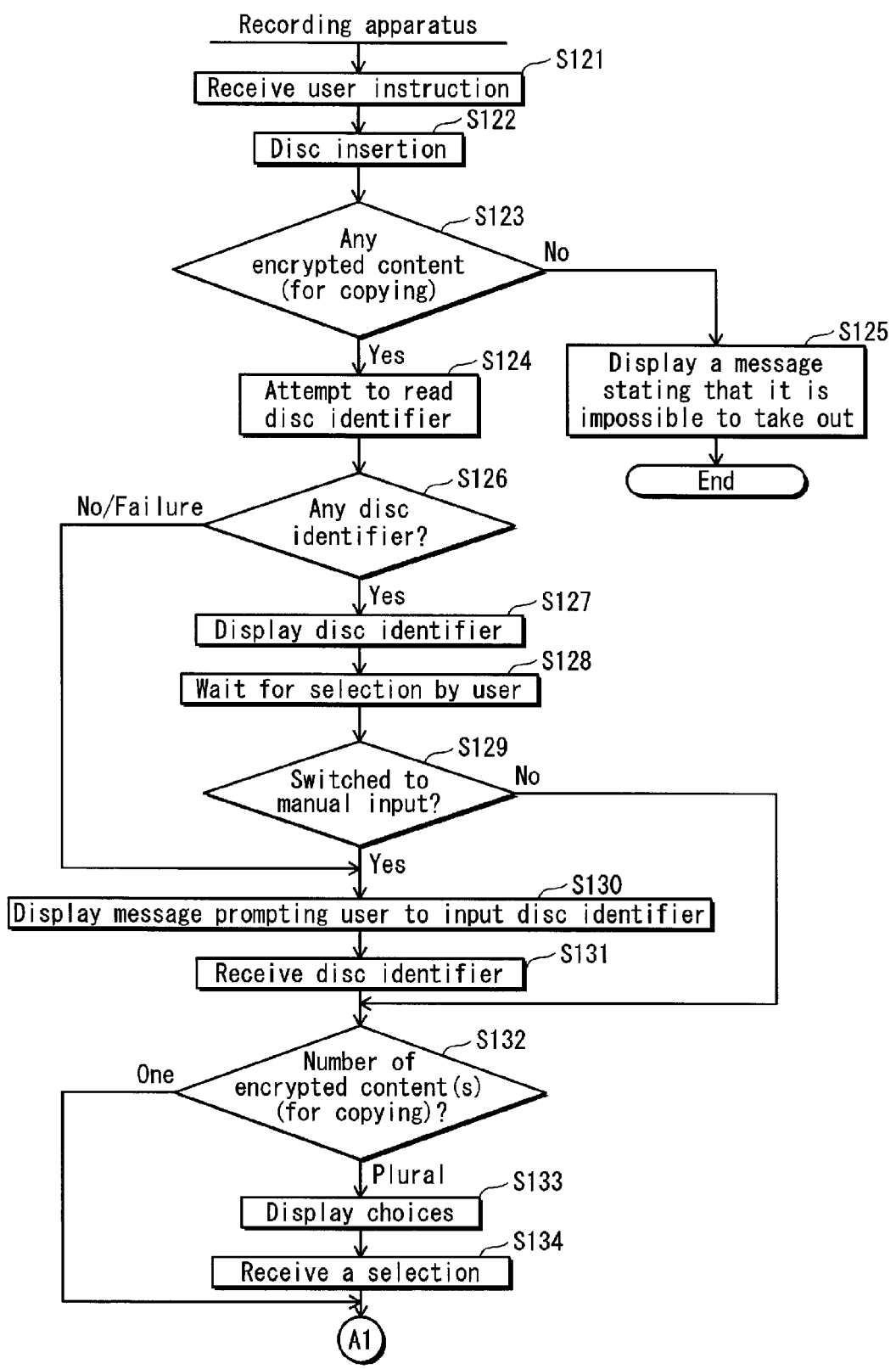
FIG. 22 is a diagram showing operations performed between the recording apparatus 104 and the server apparatus 105, followed by FIG. 23.
Figure 23:
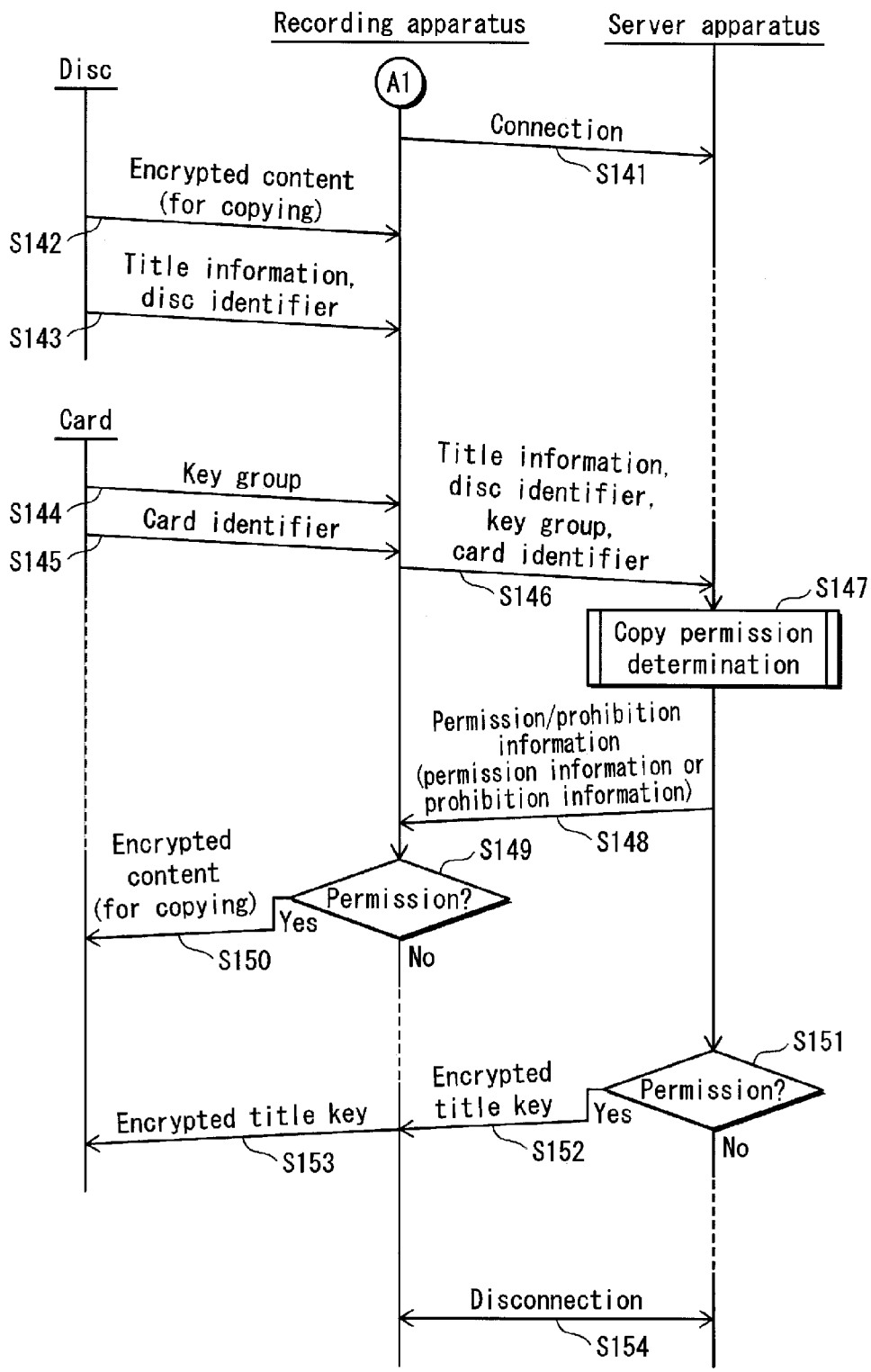
FIG. 23 is a diagram showing operations performed between the recording apparatus 104 and the server apparatus 105, following FIG. 22.

(31) The following explains the operations performed between the recording apparatus 104 and the server apparatus 105, with reference to the flowchart shown in FIG. 22 to FIG. 23.

The user input reception unit 605 of the recording apparatus 104 receives, from the user, an instruction to copy a copyable content recorded on the disc to the card 102 (Step S121), and the user mounts the disc 101 and the card 102 onto the recording apparatus 104 (Step S122).

When the disc 101 is mounted, the disc check unit 601 checks whether any encrypted content corresponding to a copyable content is recorded in the copyable content recording area 201 of the disc 101 (Step S123).

When the disc check unit 601 determines that no encrypted content is recorded on the disc 101 (No in Step S123), the display unit 604 displays a message stating that it is impossible to take out the content (Step S125), and the recording apparatus 104 ends the processing for copying the content.

When it is determined that an encrypted content is recorded on the disc 101 (Yes in Step S123), the disc check unit 601 attempts to read a disc identifier from the disc 101 (Step S124). When a disc identifier is recorded on the disc 101 and the disc check unit 101 successfully reads the disc identifier from the disc 101 (Step S126), the display unit 604 displays the read disc identifier (Step S127). The user input reception unit 605 waits for a selection between using the disc identifier read from the disc 101 and receiving a manual input from the user (Step S128). When the use of the disc identifier read from the disc 101 is selected (No in Step S129), the disc check unit 601 determines whether the number of encrypted contents recorded in the copyable content recording area 201 of the disc 101 is 1 or plural (Step S132). When it is determined that the number is plural ("Plural" in Step S132), the display unit 604 displays choices showing the plurality of copyable contents (Step S133), and the user input reception unit 605 receives an input from the user selecting one of the copyable contents (Step S134). When it is determined that the number of encrypted contents recorded in the copyable content recording area 201 of the disc 101 is 1, the disc check unit 601 assumes that the single copyable encrypted content is selected. When the user input reception unit 605 receives an input selecting a single copyable content from the choices, the disc check unit 601 assumes that the encrypted copyable content indicated by the input is selected. Next, the processing moves to Step S141.

When the disc check unit 601 determines that no disc identifier is recorded on the disc 101, or when the reading of a disc identifier from the disc 101 fails (No/Failure in Step S126), or when the user input reception unit 605 receives a selection of receiving a manual input from the user (Yes in Step S129), the display unit 604 displays a message prompting the user to input a disc identifier (Step S130), and the user input reception unit 605 receives a disc identifier from the user (Step S131). Next, the processing moves to Step S132.

The transmission/reception unit 608 of the recording apparatus 104 connects to the server apparatus 105 (Step S141), the disc reading unit 606 reads the encrypted copyable content from the disc 101 (Step S142), and reads the title information and the disc identifier (Step S143). The card reading/recording unit 607 reads the key group 311 from the card 102 (Step S144), reads the card identifier (Step S145). The transmission/reception unit 507 transmits the title information, the disc identifier, the key group and the card identifier to the server apparatus 105 (Step S146).

The transmission/reception unit 701 of the server apparatus 105 receives the title information, the disc identifier, the key group and the card identifier from the recording apparatus 104 (Step S146). The control unit 708 determines whether to permit the copying (Step S147). The transmission/reception unit 701 transmits permission/prohibition information (permission information indicating permission for recording to the card 102 or prohibition information indicating prohibition of the copying to the card 102) to the recording apparatus 104 (Step S148).

The transmission/reception unit 608 of the recording apparatus 104 receives the permission/prohibition information from the server apparatus 105 (Step S148). The control unit 609 determines whether the received permission/prohibition information is permission information or prohibition information (Step S149). When the received permission/prohibition information is permission information (Yes in Step S149), the card reading/recording unit 607 writes the encrypted copyable content read from the disc 101 into the encrypted content recording area 304 of the card 102 (Step S150).

Next, when the database management unit 702 permits the copying (Yes in Step S151), the transmission/reception unit 701 of the server apparatus 105 transmits the encrypted title key to the recording apparatus 104 (Step S152), and the card reading/recording unit 607 of the recording apparatus 104 writes the encrypted title key into the encrypted title key recording area 303 of the card 102 (Step S153).

Next, the transmission/reception unit 608 of the recording apparatus 104 and the transmission/reception unit 701 of the server apparatus terminate the connection (Step S154).

As described above, the encrypted content is recorded onto the card 102 after the copying to the card 102 is permitted, and after the completion of the recording of the encrypted content to the card 102, the encrypted title key is recorded onto the card 102.

Figure 24:
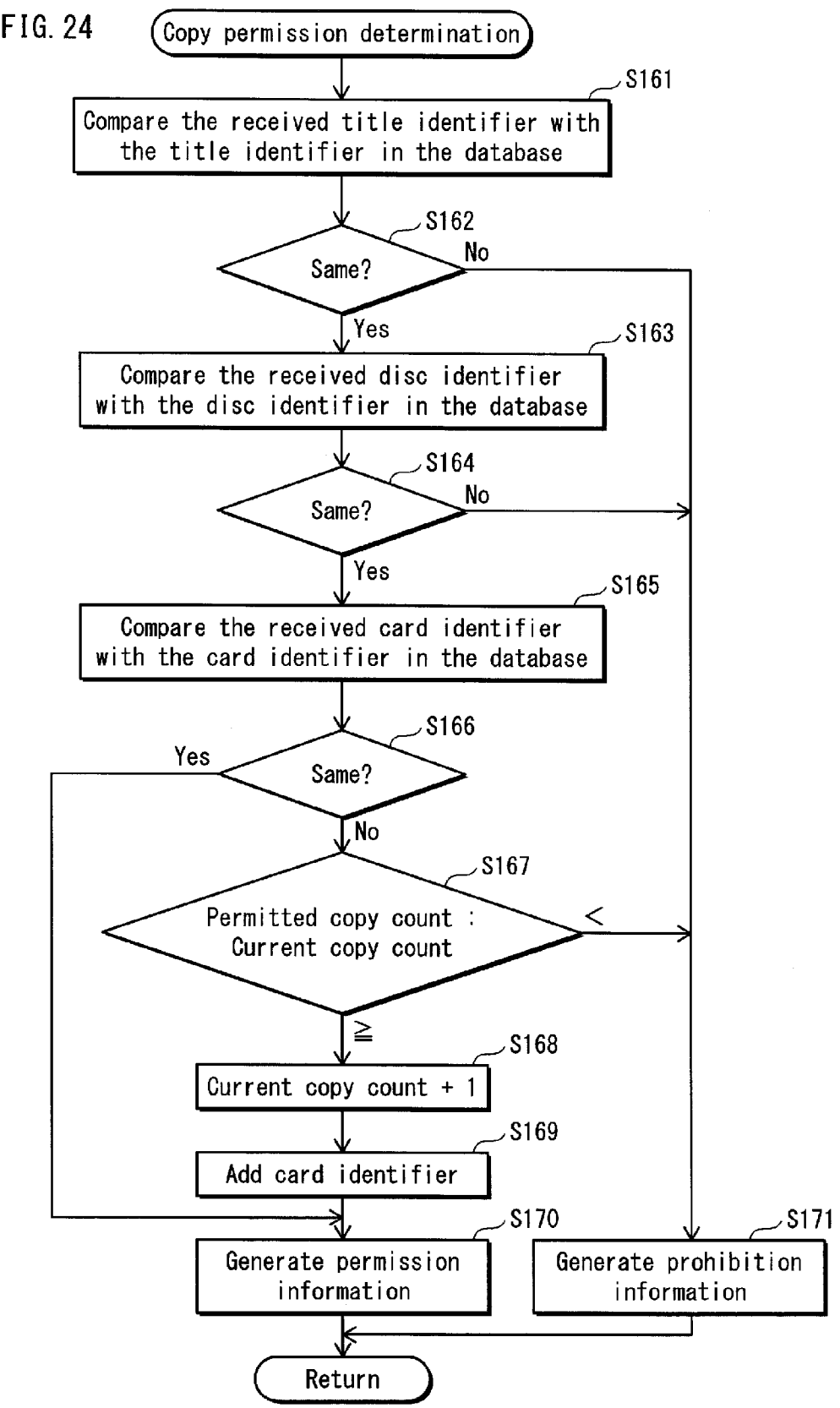
FIG. 24 shows an example operation performed in Step S147 in FIG. 23.

(32) The following describes the operations for the copy permission determination performed by the control unit 708 of the server apparatus 105, with reference to the flowchart shown in FIG. 24. Note that the explanation of the copy permission determination given here shows the details of Step S147 in FIG. 23.

The control unit 708 compares the received title identifier with the title identifiers registered in the database (Step S161). If the same title identifier as the received title identifier is not registered in the database (No in Step S162), the control unit 708 generates prohibition information that indicates prohibition of the writing to the card 102 (i.e. prohibition of the copying) (Step S171), and ends the processing for the copy permission determination.

If the same title identifier as the received title identifier is registered in the database (Yes in Step S162), the control unit 708 next compares the received disc identifier with the disc identifier registered in the database (Step S163). If the same disc identifier as the received disc identifier is not registered in the database (No in Step S164), the control unit 708 generates prohibition information that indicates prohibition of the writing to the card 102 (i.e. prohibition of the copying) (Step S171), and ends the processing for the copy permission determination.

If the same disc identifier as the received disc identifier is registered in the database (Yes in Step S164), the control unit 708 next compares the received card identifier with the card identifier registered in the database in correspondence with the received disc identifier (Step S165). If the same card identifier as the received card identifier is registered in the database (Yes in Step S166), the control unit 708 generates permission information that indicates permission for copying to the card 102 (Step S170), and ends the processing for the copy permission determination.

If the same card identifier as the received card identifier is not registered in the database (No in Step S166), the control unit 708 compares a current copy count indicating the count of copies that have been made so far with a permitted copy count registered in the database in correspondence with the disc identifier. If the permitted copy count is less than the current copy count ("<" in Step S167), the control unit 708 generates the prohibition information (Step S171), and ends the processing for the copy permission determination.

If the permitted copy count is greater than or is equal to the current copy count (">" or "=" in Step S167), the control unit 708 adds "1" to the current copy count in the database (Step S168), additionally writes the card identifier to the database (Step S169), generates the permission information (Step S170), and ends the processing for the copy permission determination.

Figure 25:
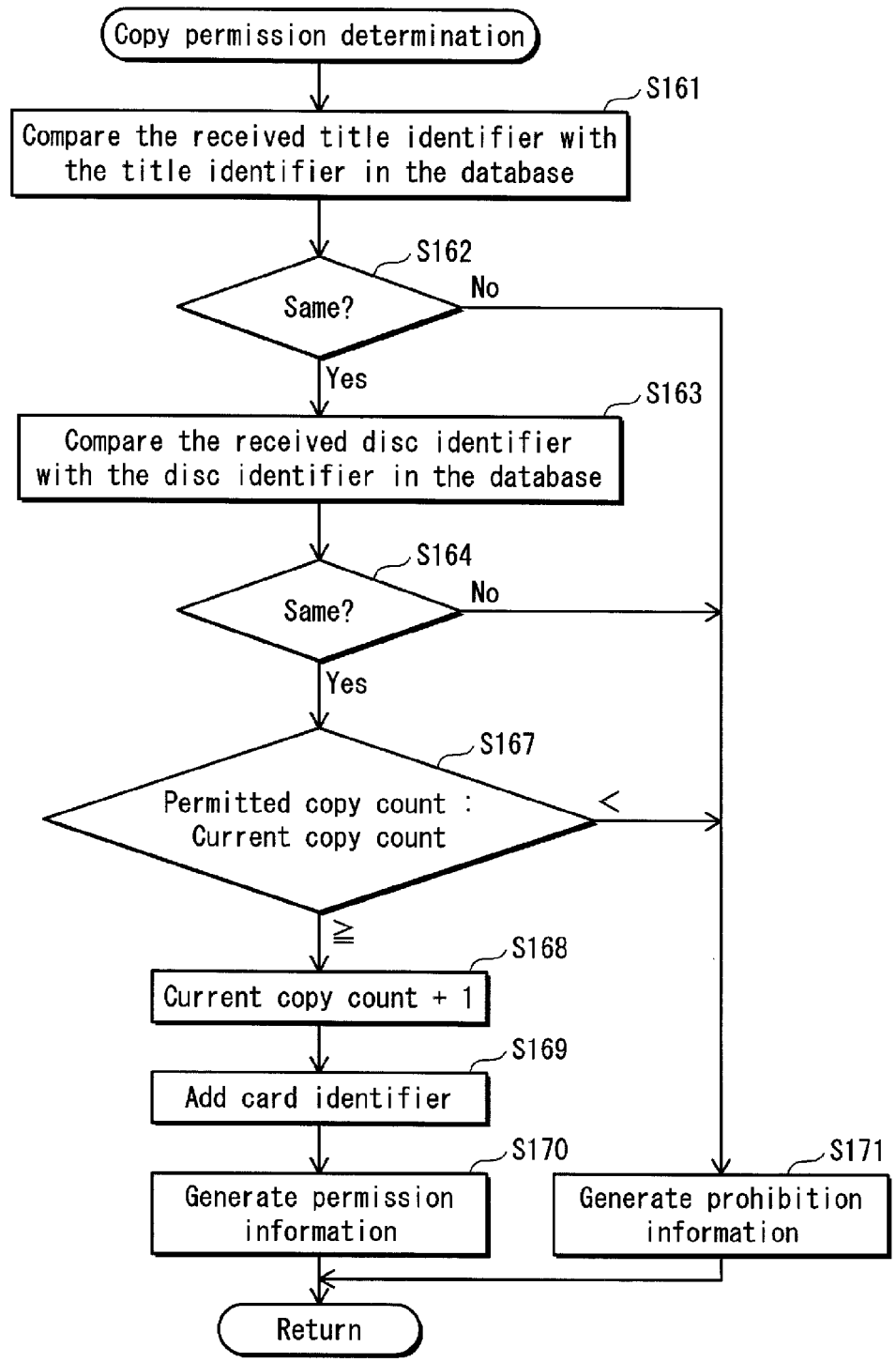
FIG. 25 shows another example operation performed in Step S147 in FIG. 23.

(33) The following describes another example of the operations for the copy permission determination performed by the control unit 708 of the server apparatus 105, with reference to the flowchart shown in FIG. 25. Note that the explanation of the copy permission determination given here shows the details of Step S147 in FIG. 23.

The control unit 708 compares the received title identifier with the title identifiers registered in the database (Step S161). If the same title identifier as the received title identifier is not registered in the database (No in Step S162), the control unit 708 generates prohibition information that indicates prohibition of the writing to the card 102 (i.e. prohibition of the copying) (Step S171), and ends the processing for the copy permission determination.

If the same title identifier as the received title identifier is registered in the database (Yes in Step S162), the control unit 708 next compares the received disc identifier with the disc identifier registered in the database (Step S163). If the same disc identifier as the received disc identifier is not registered in the database (No in Step S164), the control unit 708 generates prohibition information that indicates prohibition of the writing to the card 102 (i.e. prohibition of the copying) (Step S171), and ends the processing for the copy permission determination.

If the same disc identifier as the received disc identifier is registered in the database (Yes in Step S164), the control unit 708 compares the current copy count with the permitted copy count registered in the database in correspondence with the disc identifier. If the permitted copy count is less than the current copy count ("<" in Step S167), the control unit 708 generates the prohibition information (Step S171), and ends the processing for the copy permission determination.

If the permitted copy count is greater than or is equal to the current copy count (">" or "=" in Step S167), the control unit 708 adds "1" to the current copy count in the database (Step S168), additionally writes the card identifier to the database (Step S169), generates the permission information (Step S170), and ends the processing for the copy permission determination.

Figure 26:
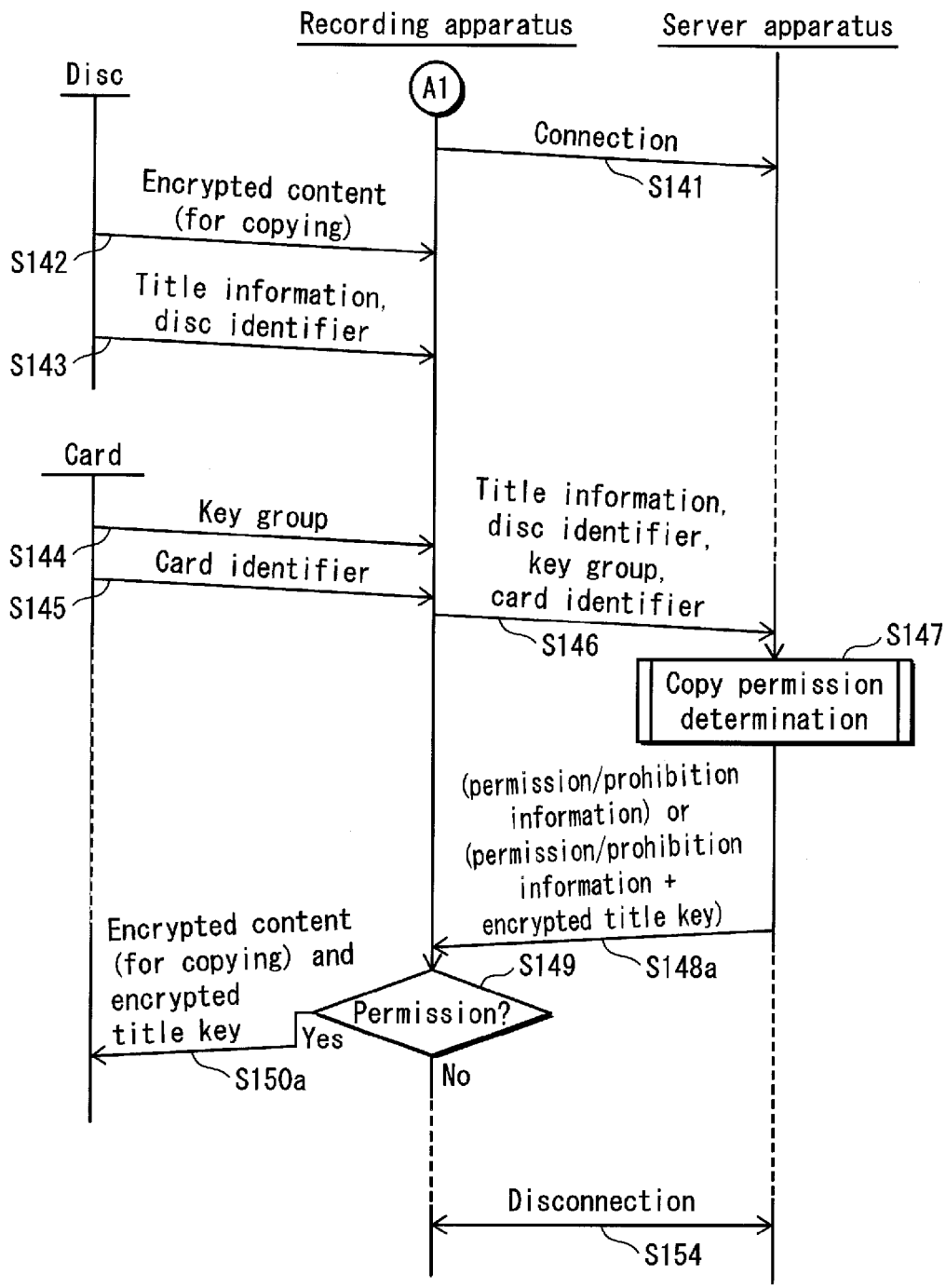
FIG. 26 is a diagram showing other operations performed between the disc manufacturing apparatus 103 and the server apparatus 105, following FIG. 22.

(34) The following explains the operations performed between the recording apparatus 104 and the server apparatus 105, with reference to the flowchart shown in FIG. 26. In the following operations: Steps S141 to S147 are the same as Steps S141 to S147 shown in FIG. 23; Steps S148a to S150a replace the Step S148 to S153 in FIG. 23; and Step S154 is the same as Step S154 shown in FIG. 23.

The transmission/reception unit 608 of the recording apparatus 104 connects to the server apparatus 105 (step S141), the disc reading unit 606 reads the encrypted copyable content from the disc 101 (step S142), and reads the title information and the disc identifier (step S143). The card reading/recording unit 607 reads the key group 311 from the card 102 (step S144), reads the card identifier (step S145). The transmission/reception unit 507 transmits the title information, the disc identifier, the key group and the card identifier to the server apparatus 105 (step S146).

The transmission/reception unit 701 of the server apparatus 105 receives the title information, the disc identifier, the key group and the card identifier from the recording apparatus 104 (Step S146). The database management unit 702 determines whether to permit the copying (Step S147). The transmission/reception unit 701 transmits the permission/prohibition information, or the permission/prohibition information and the encrypted title key, to the recording apparatus 104 (step S148a).

The transmission/reception unit 608 of the recording apparatus 104 receives the permission/prohibition information, or the permission/prohibition information and the encrypted title key, from the server apparatus 105 (Step S148a). The control unit 609 determines whether the received permission/prohibition information is permission information or prohibition information (Step S149). When the received permission/prohibition information is permission information (Yes in Step S149), the card reading/recording unit 607 writes the encrypted copyable content read from the disc 101 into the encrypted content recording area 304 of the card 102, and writes the encrypted title key into the encrypted title key recording area 303 of the card 102 (Step S150a).

Next, the transmission/reception unit 608 of the recording apparatus 104 and the transmission/reception unit 701 of the server apparatus terminate the connection (Step S154).

(35) In the description above, it is assumed that the card 102 is inserted into the recording apparatus 104. However, this is not essential.

The card 102 may be inserted into the mobile apparatus 106, and the mobile apparatus 106, into which the card 102 has been inserted, may be connected with the recording apparatus 104 via a cable or a wired or wireless network. If this is the case, the recording apparatus 104 reads the key group and the card identifier from the card 102 via the mobile apparatus 106. Also, the recording apparatus 104 writes the encrypted content and the encrypted title key into the card 102 via the mobile apparatus 106.

(36) The disc manufacturing apparatus 103 may include a content acquisition circuit, a title key generation circuit, an encryption circuit, a title information reception circuit, a disc recording circuit, a disc identifier reception circuit, a transmission/reception circuit and a control circuit.

The recording apparatus 104 as a copying apparatus may include a disc check circuit, a connection state check circuit, a card capacity check circuit, a display circuit, a user input reception circuit, a disc reading circuit, a card reading/recording circuit, a transmission/reception circuit and a control circuit.

The server apparatus 105 as a management apparatus may include a transmission/reception circuit, a database management circuit, a device key holding circuit, a key group processing circuit, a key conversion circuit, a title key selection circuit, an encryption circuit and a control circuit.

The mobile apparatus 106 may include a card reading circuit, a device key holding circuit, a key group processing circuit, a key conversion circuit, a title key decryption circuit, a content decryption circuit, a content playback circuit and a control circuit.

(37) The transmission/reception unit 701 of the server apparatus 105 as a management apparatus may further be configured to receive a retransmission request and a device identifier from the recording apparatus 104 as a copying apparatus. The retransmission request is for requesting retransmission of the content for copying recorded on the disc 101, and the device identifier identifies the recording apparatus 104. The content for copying is, in other words, information to be copied. The server apparatus 105 includes a holding unit configured to hold a retransmission request count and a permitted retransmission count threshold, in association with the device identifier identifying the recording apparatus 104. The retransmission request count indicates a count of retransmission requests made by the copying apparatus identified by the device identifier. The control unit 708 may further be configured to count up the retransmission requests to obtain the retransmission request count, and to prohibit the transmission/reception unit 701 from retransmitting the permission information when the retransmission request count exceeds the permitted retransmission count threshold.

Figure 27:
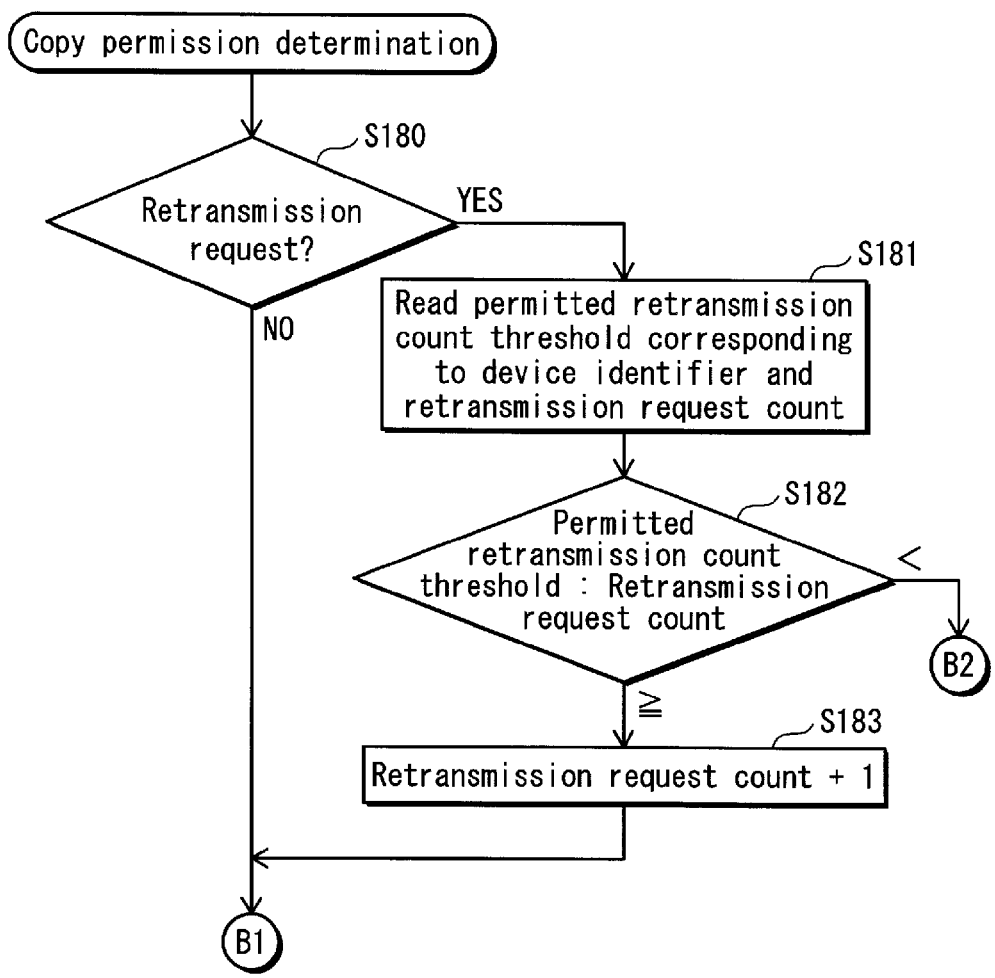
FIG. 27 shows another example operation performed in Step S147 in FIG. 23, followed by FIG. 28.

As shown in FIG. 27, on receipt of a retransmission request (Yes in Step S180), the control unit 708 reads, from the holding unit, the permitted retransmission count threshold and the retransmission request count that correspond to the device identifier (Step S181), and compares the permitted retransmission count threshold with the retransmission request count. When the permitted retransmission count threshold is less than the retransmission request count ("<" in Step S182), the control unit 708 prohibits transmission/reception unit 701 from retransmitting the permission information, and generates prohibition information (Step S171).

When the permitted retransmission count threshold is equal to or greater than retransmission request count (">" or "=" in Step S181), the control unit 708 adds "1" to the retransmission request count (Step S183), and moves to Step S161.

Figure 28:
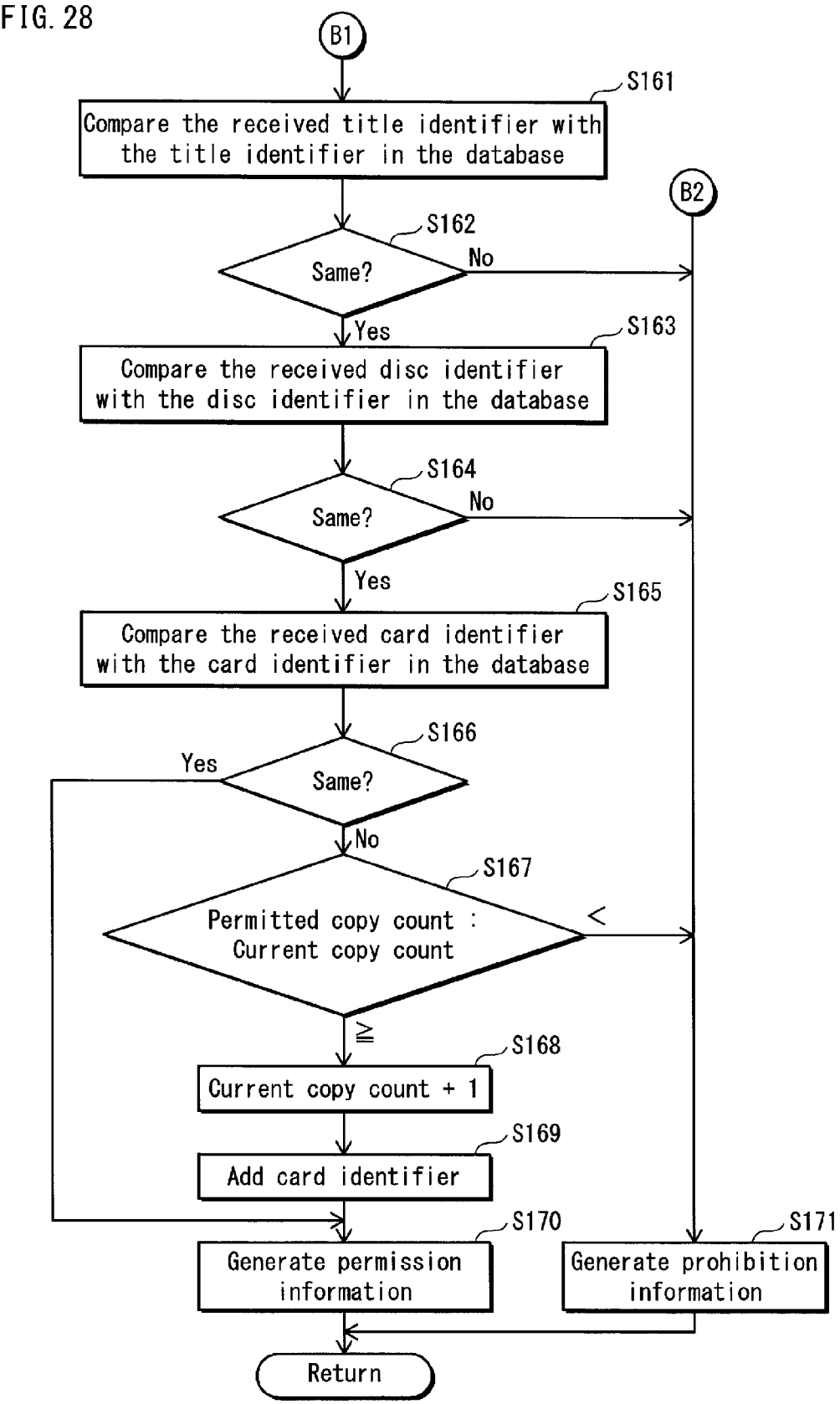
FIG. 28 shows another example operation performed in Step S147 in FIG. 23, following FIG. 27.

The Steps S161-S171 shown in FIG. 28 are the same as the Steps S161-S171 shown in FIG. 24. Thus, explanation thereof is omitted here.

Note that the control unit 708 may prohibit the retransmission of the permission information in response to any retransmission request made after the retransmission request count has reached the permitted retransmission count threshold. In other words, the control unit 708 compares the permitted retransmission count threshold with the retransmission request count, and when the permitted retransmission count threshold is less than or equal to the retransmission request count, the control unit 708 prohibits the retransmission of the permission information and generates the prohibition information. On the other hand, when the permitted retransmission count threshold is greater than the retransmission request count, the control unit 708 permits the retransmission of the permission information.

(38) There may be a plurality of server apparatuses (i.e. management apparatuses) that each have the same structure as the server apparatus 105 as a management apparatus.

The server apparatus 105 and the other server apparatuses may share part or all of a database as is shown in FIG. 14 and FIG. 19, for example.

The transmission/reception unit 701 of the server apparatus 105 transmits or receives part or all of the database held by the database management unit 702 to or from other server apparatuses, and the database management unit 702 shares part or all of the database with the other server apparatuses.

In other words, when the database held by the server apparatus 105 is updated, updated data is transmitted to the other server apparatuses, and the databases held by the other server apparatuses are updated with the update data. In this way, the server apparatus 105 and the other server apparatuses share part or all of the database having the same content.

For example, assume that the server apparatus 105 holds a database that has the same data structure as the database 711c shown in FIG. 19, and that the server apparatus 105 provides a single content copy service. Also assume that the other server apparatuses each hold a database that has the same data structure as the database 711c shown in FIG. 19, and that the other server apparatuses each provide a single content copy service.

Here, furthermore assume that a single disc can be used in a plurality of content copy services in common, but once the disc is used in one copy service, the disc can not be used in any other content copy services.

The database held by the server apparatus 105 stores therein disc identifiers "00 . . . 11", "00 . . . 12", . . . , and "00 . . . A3" as shown in FIG. 20, for example. Also, each of the databases held by the other server apparatuses stores therein disc identifiers "00 . . . 11", "00 . . . 12", . . . , and "00 . . . A3", for example.

When the server apparatus 105 receives a request to copy the content recorded on the disc identified by the disc identifier "00 . . . 11", the server apparatus 105 checks with the other server apparatus about whether the content recorded on the disc identified by the disc identifier "00 . . . 11" has already been copied or not. In other words, the server apparatus 105 checks the other server apparatuses about whether the current copy count corresponding to the disc identifier "00 . . . 11" in their respective databases is "0" or not. If the server apparatus 105 receives an answer showing that the "current copy count" corresponding to the disc identifier "00 . . . 11" in the database is "0" from all the other server apparatuses, the server apparatus 105 issues a permission to the request to copy the content recorded on the disc identified by the disc identifier "00 . . . 11". On the other hand, if the server apparatus 105 receives an answer showing that the "current copy count" corresponding to the disc identifier "00 . . . 11" in the database is not "0" from any one of the other server apparatuses, the server apparatus 105 prohibits the copying of the content recorded on the disc identified by the disc identifier "00 . . . 11".

As explained above, the ID (i.e. disc identifier) that has been used in one service may be prohibited from being used in any other services.

(39) The recording apparatus 104 as a copying apparatus may further include: a disc check unit 601 configured to check whether the information recorded on the disc 101 as the original recording medium, namely the copyable content, is for the copying or not; and a control unit 609 configured to cause the transmission/reception unit 608 to transmit the disc identifier as the acquired original-medium identifier to the server apparatus 105 as a management apparatus when the disc check unit 601 determines that the content stored on the disc 101 is for the copying. Here, the transmission/reception unit 608 transmits the acquired disc identifier to the server apparatus 105, under the control of the control unit 609.

The recording apparatus 104 as a copying apparatus may further include: a disc check unit 601 configured to determine whether the information stored on the disc 101 as the original recording medium, namely the copyable content, is for the copying and whether the disc identifier is stored on the disc 101; a display unit 604 configured to display a message for prompting a user to input the disc identifier when the disc check unit 601 determines that the content stored on the disc 101 is for the copying and the disc identifier is not stored on the disc 101; and an user input reception unit 605 configured to receive the disc identifier from the user. The transmission/reception unit 608 may transmit the received disc identifier to the server apparatus 105 as a management apparatus.

(40) The recording apparatus 104 as a copying apparatus may further include: a card capacity check unit 603 configured to compare a size of a free space on the card 102 with a size of the copyable content recorded on the disc 101; and a display unit 604 configured to display a message for prompting a user to replace the card 102 with another recording medium when the size of the free space on the card 102 is smaller than the size of the copyable content recorded on the disc 101.

(41) The recording apparatus 104 as a copying apparatus may further include: a connection state check unit 602 configured to determine whether the card 102 as the copy recording medium is used as a local storage for the recording apparatus 104; and a display unit 604 configured to display a message for prompting a user to replace the card 102 with another recording medium when the connection state check unit 602 determines that the card 102 is used as a local storage for the recording apparatus 104.

(42) The disc 101 as an original recording medium may store thereon a plurality of information sets for the copying, namely a plurality of copyable contents. The recording apparatus 104 as a copying apparatus may further include: user input reception unit 605 configured to receive an identifier of the mobile apparatus 106; a list holding unit configured to hold a list that shows functions that the mobile apparatus 106 has; a selection unit configured to select a recommended information set from among the plurality of information sets for the copying recorded on the disc 101 by using the list and the identifier of the mobile apparatus 106; and a display unit 604 configured to display the recommended information set selected by the selection unit.

Here, the list holding unit may receive and hold the list that has been updated and is transmitted from the server apparatus 105 as a management apparatus via the transmission/reception unit 608.

(43) The present invention may be embodied as a computer for managing copying of information from an original recording medium that stores the information thereon to a copy recording medium. The computer includes: a memory unit storing therein a computer program composed of a plurality of computer instructions; and a processor configured to fetch the computer instructions one by one, to decode the computer instructions, and to operate according to the result of the decoding.

The computer program may cause the computer to perform: a transmission/reception step of receiving an original-medium identifier from a copying apparatus and to transmit permission information to the copying apparatus, the original-medium identifier identifying the original recording medium, and the permission information indicating permission for the copying of the information; and a control step of determining whether to permit the copying of the information based on the received original-medium identifier and a registered original-medium identifier that identifies a registered original recording medium, and to allow the permission information to be transmitted in the transmission/reception step when it is determined to permit the copying.

(43) The present invention may be embodied as a computer for copying information from an original recording medium that stores the information thereon to a copy recording medium. The computer includes: a memory unit storing therein a computer program composed of a plurality of computer instructions; and a processor configured to fetch the computer instructions one by one, to decode the computer instructions, and to operate according to the result of the decoding.

The computer program may cause the computer to perform: an identifier acquisition step of acquiring an original-medium identifier that identifies the original recording medium; a transmission/reception step of transmitting the acquired original-medium identifier to a management apparatus, and receiving permission information from the management apparatus, the permission information indicating permission for the copying of the information; a reading step of reading the information from the original recording medium; and a writing step of writing the received information onto the copy recording medium, and when the permission information is received, writing the received permission information onto the copy recording medium.

(44) The present invention may be embodied as a non-transitory computer-readable program recording medium storing thereon a computer program for management used in a management apparatus for managing copying of information from an original recording medium that stores thereon the information to a copy recording medium. The computer program causes the computer to perform: a transmission/reception step of receiving an original-medium identifier from a copying apparatus and to transmit permission information to the copying apparatus, the original-medium identifier identifying the original recording medium, and the permission information indicating permission for the copying of the information; and a control step of determining whether to permit the copying of the information based on the received original-medium identifier and a registered original-medium identifier that identifies a registered original recording medium, and to allow the permission information to be transmitted in the transmission/reception step when it is determined to permit the copying.

The present invention may be embodied as a non-transitory computer-readable program recording medium storing thereon a computer program for copying used in a copying apparatus for copying information from an original recording medium that stores thereon the information to a copy recording medium. The computer program causes the computer to perform: an identifier acquisition step of acquiring an original-medium identifier that identifies the original recording medium; a transmission/reception step of transmitting the acquired original-medium identifier to a management apparatus, and receiving permission information from the management apparatus, the permission information indicating permission for the copying of the information; a reading step of reading the information from the original recording medium; and a writing step of writing the received information onto the copy recording medium, and when the permission information is received, writing the received permission information onto the copy recording medium.

(45) The present invention may be embodied as the methods described above. Furthermore, the present invention may be embodied as a computer program for causing a computer to realize the methods, or may be a digital signal representing the computer program.

Furthermore, the present invention may be embodied as a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be embodied as the computer program or the digital signal stored on any of the aforementioned recording media.

Furthermore, the present invention may be embodied as the computer program or the digital signal transmitted via an electric communication network, a wireless or wired communication network, a network of which the Internet is representative, a data broadcast or the like.

Furthermore, the present invention may be embodied as a computer system that includes a memory and a microprocessor, where the memory storing the computer program, and the microprocessor operating according to the computer program.

Furthermore, the program or the digital signal may be transferred to another independent computer system, after being recorded on one of the aforementioned recording media or via any of the aforementioned network. The independent computer system may then execute the computer program or the digital signal.

(46) The present invention may be any combination of the aforementioned embodiment and modifications.

(47) The present invention may relate to a technique for preventing unauthorized copying and improving user convenience, in a service for securely copying a digital content (e.g., movie, music, etc.) recorded on a recording medium to another recording medium, by associating the recording medium with a playback apparatus or a recording apparatus that is connected to an external network.

Conventionally, a DVD or a Blu-ray Disc developed for the users to enjoy its content with a household stationary apparatus cannot satisfy the users' demand because of the following reason. In general, a content of such a DVD or a Blu-ray Disc is not permitted to be taken out or copied for viewing on a mobile terminal, since the content needs to be protected from unauthorized copying and the like.

In view of the aforementioned problem, an object of the present invention is to provide a content recording apparatus, a content recording method, and a content recording system for securely copying a content recorded on a recording medium to another recording medium while preventing unauthorized copying and improving user convenience.

In order to solve the aforementioned problem, one aspect of the present invention is a server apparatus for judging whether to give a recording apparatus permission to copy a content recorded on a first recording medium onto a second recording medium, the server apparatus comprising: a transmission/reception unit operable to receive, from the recording apparatus, a first identifier for identifying the first recording medium, a second identifier for identifying the second recording medium, and title information for specifying the content, and to transmit, to the recording apparatus, permission information indicating the permission to copy the content; and a database management unit holding a database in which a pair of the first identifier and the second identifier has been registered, and operable to manage a copy count for the first identifier, to judge whether to give the permission to the recording apparatus based on the database, and to cause the transmission/reception unit to transmit the permission information to the recording apparatus when the database management unit judges to give the permission.

In the server apparatus, the content may have been encrypted with use of a title key, and the permission information may be the title key for decrypting the content.

The server apparatus may further comprise a key conversion unit operable, prior to the transmission of the title key, to convert the title key into a key only usable for the second recording medium with use of the second identifier.

In the server apparatus, the transmission/reception unit may receive a key group including one or more encrypted media keys, the server apparatus may further comprise a key group processing unit holding a device key and operable to extract an encrypted media key from the key group, and obtain a media key by decrypting the extracted encrypted media key with use of the device key, and the conversion by the key conversion unit may be performed by encrypting the title key with use of the media key in addition to the second identifier.

The server apparatus may further comprise a mutual authentication unit operable to perform mutual authentication with the recording apparatus, and establish a secure channel by sharing a key for the channel with the recording apparatus, wherein the transmission/reception unit may transmit the title key that has been encrypted with use of the key shared with the recording apparatus.

In the server apparatus, the transmission/reception unit may further receive, from the recording apparatus, a retransmission request of the permission information, a third identifier for identifying the first recording medium, and a fourth identifier for identifying the second recording medium, the database management unit may further judge whether the pair of the first identifier and the second identifier matches a pair of the third identifier and the fourth identifier, and the transmission/reception unit may retransmit the permission information when the database management unit judges that the pairs match each other.

The server apparatus may further comprise a key conversion unit operable, prior to the transmission of the title key, to convert the title key into a key only usable for the second recording medium with use of the second identifier.

In the server apparatus, the transmission/reception unit may receive a key group including one or more encrypted media keys, the server apparatus may further comprise a key group processing unit holding a device key and operable to extract an encrypted media key from the key group, and obtain a media key by decrypting the extracted encrypted media key with use of the device key, and the conversion by the key conversion unit may be performed by encrypting the title key with use of the media key in addition to the second identifier.

The server apparatus may further comprise a mutual authentication unit operable to perform mutual authentication with the recording apparatus, and establish a secure channel by sharing a key for the channel with the recording apparatus, wherein the transmission/reception unit may transmit the title key that has been encrypted with use of the key shared with the recording apparatus.

The server apparatus may further comprise a device identifier holding unit operable to hold a device identifier for identifying the recording apparatus, and a request count indicating a number of times the retransmission request has been made from the recording apparatus corresponding to the device identifier, wherein the transmission/reception unit may further receive the device identifier, in addition to the retransmission request, and when the request count exceeds a predetermined threshold value, the server apparatus may not accept the retransmission request.

In the server apparatus, the transmission/reception unit may further be operable to exchange the database with another server apparatus so as to share the database with the other server apparatus.

Another aspect of the present invention is a recording apparatus for copying a content recorded on a first recording medium onto a second recording medium, the recording apparatus comprising: a first check unit operable to check whether a copyable content is recorded on the first recording medium; a second check unit operable to check whether a first identifier is recorded on the first recording medium, the first identifier being for identifying the first recording medium; an identifier reception unit operable to receive a third identifier for identifying the first recording medium; a transmission/reception unit operable to transmit a request for copying the copyable content to a server apparatus, and to receive, from the server apparatus, permission information indicating permission to copy the copyable content; and a write unit operable to write the copyable content onto the second recording medium when the transmission/reception unit receives the permission information from the server apparatus, wherein the transmission/reception unit transmits the request for copying to the server apparatus when the first check unit judges that the copyable content is recorded on the first recording medium and the second check unit judges that the first identifier is recorded on the first recording medium, and transmits the request for copying to the server apparatus after the identifier reception unit receives the third identifier, when the first check unit judges that the copyable content is recorded on the first recording medium and the second check unit judges that the first identifier is not recorded on the first recording medium.

In the recording apparatus, the identifier reception unit may receive the third identifier even when the second check unit judges that the first identifier is recorded on the first recording medium, and the transmission/reception unit may further transmit either the first identifier or the third identifier to the server apparatus.

The recording apparatus may further comprise: a medium check unit operable to check an available memory size of the second recording medium; and a display unit operable to display a message that encourages replacement of the second recording medium, wherein the medium check unit may check the available memory size of the second recording medium by comparing the available memory size thereof with a size of the copyable content recorded on the first recording medium, and the display unit may display the message when the medium check unit judges that the available memory size is smaller than the size of the copyable content.

In the recording medium, the display unit may display the message even when the medium check unit judges that the available memory size is larger than the size of the copyable content as a result of the comparison, if the second recording medium is in use as a local storage of the recording apparatus.

The recording apparatus may further comprise: a connection state check unit operable to check a connection state of the second recording medium by judging whether the second recording medium is directly mounted in the recording apparatus or a mobile apparatus in which the second recording medium is mounted is connected to the recording apparatus via a wired or wireless connection; an identification information reception unit operable to receive identification information for identifying the mobile apparatus; a list holding unit operable to hold a list indicating whether the recording apparatus is capable of writing the copyable content, when the mobile apparatus is connected to the recording apparatus via the wired or wireless connection; a judgment unit operable to judge whether the recording apparatus is ready to write the copyable content, based on the list, the identification information of the mobile apparatus, and the connection state; and a display unit operable to display a message that encourages change of a method for connecting the second recording medium to the recording apparatus, when the judgment unit judges that the recording apparatus is not ready to write the copyable content.

In the recording apparatus, the list held by the list holding unit may be of a latest version received from the server apparatus via the transmission/reception unit.

The recording apparatus may further comprise: an identification information reception unit operable to receive identification information for identifying a mobile apparatus; a list holding unit operable to hold a list indicating a function of the mobile apparatus; a determination unit operable, in a case where a plurality of copyable contents are recorded on the first recording medium, to determine a recommended content based on the list held by the list holding unit and the identification information of the mobile apparatus; and a display unit operable to display the recommended content.

In the recording apparatus, the list held by the list holding unit may be of a latest version received from the server apparatus via the transmission/reception unit.

Another aspect of the present invention is a permission-giving method for judging whether to give a recording apparatus permission to copy a content recorded on a first recording medium onto a second recording medium, the permission-giving method comprising: a transmission/reception step of receiving, from the recording apparatus, a first identifier for identifying the first recording medium, a second identifier for identifying the second recording medium, and title information for specifying the content, and of transmitting, to the recording apparatus, permission information indicating the permission to copy the content; and a database management step of, based on a database that is held by a server apparatus and in which a pair of the first identifier and the second identifier has been registered, managing a copy count for the first identifier, judging whether to give the permission to the recording apparatus, and causing the transmission/reception step to transmit the permission information to the recording apparatus when judging to give the permission.

With the permission-giving method, the content may have been encrypted with use of a title key, and the permission information may be the title key for decrypting the content.

The permission-giving method may further comprise a key conversion step of, prior to the transmission of the title key, converting the title key into a key only usable for the second recording medium with use of the second identifier.

In the permission-giving method, the transmission/reception step may further receive, from the recording apparatus, a retransmission request of the permission information, a third identifier for identifying the first recording medium, and a fourth identifier for identifying the second recording medium, the database management step may further judge whether the pair of the first identifier and the second identifier matches a pair of the third identifier and the fourth identifier, and the transmission/reception step may retransmit the permission information when the database management step judges that the pairs match each other.

Another aspect of the present invention is a recording method for copying a content recorded on a first recording medium onto a second recording medium, the recording method comprising: a first check step of checking whether a copyable content is recorded on the first recording medium; a second check step of checking whether a first identifier is recorded on the first recording medium, the first identifier being for identifying the first recording medium; an identifier reception step of receiving a third identifier for identifying the first recording medium; a transmission/reception step of transmitting a request for copying the copyable content to a server apparatus, and of receiving, from the server apparatus, permission information indicating permission to copy the copyable content; and a write step of writing the copyable content onto the second recording medium when the transmission/reception step receives the permission information from the server apparatus, wherein the transmission/reception step transmits the request for copying to the server apparatus when the first check step judges that the copyable content is recorded on the first recording medium and the second check step judges that the first identifier is recorded on the first recording medium, and transmits the request for copying to the server apparatus after the identifier reception step receives the third identifier, when the first check step judges that the copyable content is recorded on the first recording medium and the second check step judges that the first identifier is not recorded on the first recording medium.

In the recording method, the identifier reception step may receive the third identifier even when the second check step judges that the first identifier is recorded on the first recording medium, and the transmission/reception step may further transmit either the first identifier or the third identifier to the server apparatus.

The recording method may further comprise: a medium check step of checking an available memory size of the second recording medium; and a display step of displaying a message that encourages replacement of the second recording medium, wherein the medium check step may check the available memory size of the second recording medium by comparing the available memory size thereof with a size of the copyable content recorded on the first recording medium, and the display step may display the message when the medium check step judges that the available memory size is smaller than the size of the copyable content.

The recording method may further comprise: a connection state check unit operable to check a connection state of the second recording medium by judging whether the second recording medium is directly mounted in a recording apparatus or a mobile apparatus in which the second recording medium is mounted is connected to the recording apparatus via a wired or wireless connection; an identification information reception step of receiving identification information for identifying the mobile apparatus; a list holding step of holding a list indicating whether the recording apparatus is capable of writing the copyable content, when the mobile apparatus is connected to the recording apparatus via the wired or wireless connection; a judgment step of judging whether the recording apparatus is ready to write the copyable content, based on the list, the identification information of the mobile apparatus, and the connection state; and a display step of displaying a message that encourages change of a method for connecting the second recording medium to the recording apparatus, when the judgment step judges that the recording apparatus is not ready to write the copyable content.

The recording method may further comprise: an identification information reception step of receiving identification information for identifying a mobile apparatus; a list holding step of holding a list indicating a function of the mobile apparatus; a determination step of, in a case where a plurality of copyable contents are recorded on the first recording medium, determining a recommended content based on the list held by the list holding step and the identification information of the mobile apparatus; and a display step of displaying the recommended content.

Another aspect of the present invention is an integrated circuit used for a server apparatus for judging whether to give a recording apparatus permission to copy a content recorded on a first recording medium onto a second recording medium, the integrated circuit comprising: a transmission/reception unit operable to receive, from the recording apparatus, a first identifier for identifying the first recording medium, a second identifier for identifying the second recording medium, and title information for specifying the content, and to transmit, to the recording apparatus, permission information indicating the permission to copy the content; and a database management unit holding a database in which a pair of the first identifier and the second identifier has been registered, and operable to manage a copy count for the first identifier, to judge whether to give the permission to the recording apparatus based on the database, and to cause the transmission/reception unit to transmit the permission information to the recording apparatus when the database management unit judges to give the permission.

In the integrated circuit, the content may have been encrypted with use of a title key, and the permission information may be the title key for decrypting the content.

Another aspect of the present invention is an integrated circuit used for a recording apparatus for copying a content recorded on a first recording medium onto a second recording medium, the integrated circuit comprising: a first check unit operable to check whether a copyable content is recorded on the first recording medium; a second check unit operable to check whether a first identifier is recorded on the first recording medium, the first identifier being for identifying the first recording medium; an identifier reception unit operable to receive a third identifier for identifying the first recording medium; a transmission/reception unit operable to transmit a request for copying the copyable content to a server apparatus, and to receive, from the server apparatus, permission information indicating permission to copy the copyable content; and a write unit operable to write the copyable content onto the second recording medium when the transmission/reception unit receives the permission information from the server apparatus, wherein the transmission/reception unit transmits the request for copying to the server apparatus when the first check unit judges that the copyable content is recorded on the first recording medium and the second check unit judges that the first identifier is recorded on the first recording medium, and transmits the request for copying to the server apparatus after the identifier reception unit receives the third identifier, when the first check unit judges that the copyable content is recorded on the first recording medium and the second check unit judges that the first identifier is not recorded on the first recording medium.

In the integrated circuit, the identifier reception unit may receive the third identifier even when the second check unit judges that the first identifier is recorded on the first recording medium, and the transmission/reception unit may further transmit either the first identifier or the third identifier to the server apparatus.

Another aspect of the present invention is a content recording system including (i) a recording apparatus for copying a content recorded on a first recording medium onto a second recording medium and (ii) a server apparatus for judging whether to give the recording apparatus permission to copy the content, wherein the server apparatus comprises: a transmission/reception unit operable to receive, from the recording apparatus, a first identifier for identifying the first recording medium, a second identifier for identifying the second recording medium, and title information for specifying the content, and to transmit, to the recording apparatus, permission information indicating the permission to copy the content; and a database management unit holding a database in which a pair of the first identifier and the second identifier has been registered, and operable to manage a copy count for the first identifier, to judge whether to give the permission to the recording apparatus based on the database, and to cause the transmission/reception unit to transmit the permission information to the recording apparatus when the database management unit judges to give the permission, and the recording apparatus comprises: a first check unit operable to check whether the content is recorded on the first recording medium; a second check unit operable to check whether the first identifier is recorded on the first recording medium; an identifier reception unit operable to receive a third identifier for identifying the first recording medium; a transmission/reception unit operable to transmit a request for copying the content to a server apparatus, and to receive, from the server apparatus, permission information indicating permission to copy the content; and a write unit operable to write the content onto the second recording medium when the transmission/reception unit receives the permission information from the server apparatus, wherein the transmission/reception unit transmits the request for copying to the server apparatus when the first check unit judges that the content is recorded on the first recording medium and the second check unit judges that the first identifier is recorded on the first recording medium, and the identifier reception unit causes, after receiving the third identifier, the transmission/reception unit to transmit the request for copying to the server apparatus, when the first check unit judges that the content is recorded on the first recording medium and the second check unit judges that the first identifier is not recorded on the first recording medium.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

INDUSTRIAL APPLICABILITY

The content recording apparatus and the content recording system according to the present invention are useful in: industries that supply digital contents to users; manufacturing industries that manufacture recording apparatuses for copying the digital contents, and mobile apparatuses for playing back the copied digital contents; and distributing industries that distribute apparatuses for copying or playing back the digital contents.

REFERENCE SIGNS LIST

101: recording medium (disc)
102: recording medium (card)
103: disc manufacturing apparatus
104: recording apparatus
105: server apparatus
106: mobile apparatus

The invention claimed is:

1. A management apparatus for managing copying of a content from an original recording medium that stores the content thereon to a copy recording medium, the management apparatus comprising:
   a transmission/reception unit configured to receive title information, a copy-medium identifier, an original-medium identifier and a key group from a copying apparatus and to transmit permission information to the copying apparatus, the title information identifying the content, the original-medium identifier identifying the original recording medium, the copy-medium identifier identifying the copy recording medium, the key group having been read from the copy recording medium, and the permission information indicating permission for the copying of the content;
   a control unit configured to determine whether to permit the copying of the content based on the received title information, the received original-medium identifier and the received copy-medium identifier, and to allow the transmission/reception unit to transmit the permission information when determining to permit the copying; and
   a management unit configured to hold a database for storing therein registered title information that identifies a registered content, a registered original-medium identifier that identifies a registered original recording medium and a registered copy-medium identifier that identifies a registered copy recording medium in association with each other,
   wherein the control unit determines whether a set of the received title information and the received original-medium identifier matches a set of the registered title information and the registered original-medium identifier stored in the database and whether the received copy-medium identifier matches the registered copy-medium identifier associated with the set stored in the database, and allows the transmission/reception unit to transmit the permission information when determining that the set of the received title information and the received original-medium identifier matches the set of the registered title information and the registered original-medium identifier, and the received copy-medium identifier does not match the registered copy-medium identifier, and when the control unit determines that the set of the received title information and the received original-medium identifier matches the set of the registered title information and the registered original-medium identifier, and the received copy-medium identifier does not match the registered copy-medium identifier, the management unit registers the received copy-medium identifier into the database in association with the registered title information and the registered original-medium identifier.

2. The management apparatus of claim 1, wherein the transmission/reception unit is further configured to transmit/receive part or all of the database to/from another management apparatus, and the management unit is further configured to share part or all of the database with the other management apparatus.

3. The management apparatus of claim 1, wherein the transmission/reception unit is further configured to receive from the copying apparatus a retransmission request for retransmitting the permission information, and the control unit, in response to the retransmission request from the copying apparatus, determines whether the received original-medium identifier matches the registered original-medium identifier that identifies the registered original recording medium and whether the received copy-medium identifier matches the registered copy-medium identifier that identifies the registered copy recording medium, and allows the transmission/reception unit to retransmit the permission information when determining that the received original-medium identifier matches the registered original-medium identifier and the received copy-medium identifier matches the registered copy-medium identifier.

4. The management apparatus of claim 3, wherein the transmission/reception unit is further configured to receive a device identifier from the copying apparatus, the device identifier identifying the copying apparatus, the management apparatus further comprises a holding unit for holding a permitted retransmission count threshold and a retransmission request count in association with the device identifier that identifies the copying apparatus, the retransmission request count indicating a count of retransmission requests made by the copying apparatus identified by the device identifier, and the control unit is further configured to count up the retransmission requests to obtain the retransmission request count, and to prohibit the transmission/reception unit from retransmitting the permission information when the retransmission request count exceeds the permitted retransmission count threshold.

5. The management apparatus of claim 1, wherein the content stored on the original recording medium is an encrypted content generated by encrypting a content by using a title key, the management apparatus further comprises an encryption unit configured to generate an encrypted title key as the permission information by encrypting the title key, and the transmission/reception unit transmits the encrypted title key as the permission information.

6. The management apparatus of claim 5, wherein the management apparatus further comprises a key conversion unit configured to generate a key by using the received copy-medium identifier, the key being available only for the copy recording medium, and the encryption unit encrypts the title key by using the key generated by the key conversion unit.

7. The management apparatus of claim 6, wherein the key group is a group of one or more encrypted media keys, the management apparatus further comprises a key group processing unit configured to extract from the key group an encrypted media key that corresponds to the management apparatus, and to generate a media key by decrypting the extracted encrypted media key by using a device key held therein, and the key conversion unit generates the key that is available only for the copy recording medium, by using both the generated media key and the copy-medium identifier received by the transmission/reception unit.

8. The management apparatus of claim 7 further comprising:

a mutual authentication unit configured to perform mutual authentication with the copying apparatus, to share a common key with the copying apparatus, and to establish a secure communication path, wherein the encryption unit encrypts the encrypted title key by using the shared key.

9. The management apparatus of claim 1, wherein the transmission/reception unit is further configured to receive a retransmission request and a device identifier, the retransmission request being a request for retransmitting the permission information, and the device identifier identifying the copying apparatus, the management apparatus further comprises a holding unit for holding a permitted retransmission count threshold and a retransmission request count in association with the device identifier that identifies the copying apparatus, the retransmission request count indicating a count of retransmission requests made by the copying apparatus identified by the device identifier, and the control unit is further configured to count up the retransmission requests to obtain the retransmission request count, and to prohibit the transmission/reception unit from retransmitting the permission information when the retransmission request count exceeds the permitted retransmission count threshold.

10. A copying apparatus for copying a content from an original recording medium that stores the content thereon to a copy recording medium, the copy recording medium storing a copy-medium identifier and key information prior to the copying of the content onto the copy recording medium, the copy-medium identifier identifying the copy recording medium, the copying apparatus comprising:

a first acquisition unit configured to acquire an original-medium identifier and title information, the original-medium identifier identifying the original recording medium and the title information identifying the content;

a second acquisition unit configured to acquire the copy-medium identifier and the key information from the copy recording medium;

a transmission/reception unit configured to transmit the acquired title information, the acquired original-medium identifier, the acquired copy-medium identifier, and the key information to a management apparatus, and to receive permission information from the management apparatus, the permission information indicating permission for the copying of the content;

a reading unit configured to read the content from the original recording medium; and a writing unit configured to write the read content onto the copy recording medium, and when receiving the permission information, to write the received permission information onto the copy recording medium.

11. The copying apparatus of claim 10 further comprising:
a determination unit configured to determine whether the content stored on the original recording medium is for the copying; and
a control unit configured to cause the transmission/reception unit to transmit the acquired original-medium identifier to the management apparatus when the determination unit determines that the content stored on the original recording medium is for the copying, wherein
the transmission/reception unit transmits the acquired original-medium identifier to the management apparatus, under control of the control unit.

12. The copying apparatus of claim 10 further comprising:
a determination unit configured to determine whether the content stored on the original recording medium is for the copying and whether the original-medium identifier is stored on the original recording medium;
a display unit configured to display a message for prompting a user to input the original-medium identifier when the determination unit determines that the content stored on the original recording medium is for the copying and the original-medium identifier is not stored on the original recording medium; and
an input reception unit configured to receive the original-medium identifier from the user, wherein
the transmission/reception unit transmits the received original-medium identifier to the management apparatus.

13. The copying apparatus of claim 10, wherein
the original recording medium stores thereon the original-medium identifier that identifies the original recording medium, and
the first acquisition unit acquires the original-medium identifier by reading the original-medium identifier from the original recording medium.

14. The copying apparatus of claim 13 further comprising:
a display unit configured to display the original-medium identifier acquired by the identifier acquisition unit, and a message for prompting a user to select whether to cause the transmission/reception unit to transmit the original-medium identifier read from the original recording medium or to manually input another original-medium identifier;
an input reception unit configured to receive the other original-medium identifier from the user when the user selects to manually input the other original-medium identifier, wherein
the input/reception unit transmits the original-medium identifier read from the original-recording medium when the user selects to cause the transmission/reception unit to transmit the original-medium identifier read from the original recording medium, and transmits the other original-medium identifier when the user selects to manually input the other original-medium identifier.

15. The copying apparatus of claim 10, wherein
the first acquisition unit acquires the original-medium identifier by receiving the original-medium identifier from a user.

16. The copying apparatus of claim 10 further comprising:
a capacity check unit configured to compare a size of a free space on the copy recording medium with a size of the content recorded on the original recording medium; and
a display unit configured to display a message for prompting a user to replace the copy recording medium with another copy recording medium when the size of the free space is smaller than the size of the content.

17. The copying apparatus of claim 10 further comprising:
a connection state check unit configured to determine whether the copy recording medium is used as a local storage for the copying apparatus; and
a display unit configured to display a message for prompting a user to replace the copy recording medium with another copy recording medium when the connection state check unit determines that the copy recording medium is used as a local storage for the copying apparatus.

18. The copying apparatus of claim 10 further comprising:
a connection state check unit configured to determine whether the copy recording medium is directly coupled to the copying apparatus or is coupled to a mobile apparatus that is connected to the copying apparatus via a wired/wireless connection;
an input reception unit configured to receive an identifier of the mobile apparatus;
a list holding unit configured to hold a list that shows, in association with the identifier of the mobile apparatus, whether the copying apparatus is permitted to copy the content recorded on the original recording medium to the mobile apparatus when the mobile apparatus is connected to the copying apparatus via a wired/wireless connection;
a determination unit configured to determine whether the copying apparatus is under a condition that allows the copying apparatus to copy the content to the copy recording medium via the mobile apparatus, based on the received identifier and the determination by the connection state check unit; and
a display unit configured to display a message for prompting a user to connect the mobile apparatus to the copying apparatus in a different manner when the determination unit determines that the copying apparatus is not under a condition that allows the copying apparatus to copy the content to the copy recording medium via the mobile apparatus.

19. The copying apparatus of claim 18, wherein
the list holding unit receives and holds the list that has been updated and is transmitted from the management apparatus via the transmission/reception unit.

20. The copying apparatus of claim 10, wherein
the original recording medium stores thereon a plurality of content sets for the copying, and
the copying apparatus further comprises:
an input reception unit configured to receive an identifier of the mobile apparatus;
a list holding unit configured to hold a list that shows functions that the mobile apparatus has;
a selection unit configured to select a recommended content set from among the plurality of content sets by using the list and the identifier of the mobile apparatus; and
a display unit configured to display the recommended content set selected by the selection unit.

21. The copying apparatus of claim 20, wherein
the list holding unit receives and holds the list that has been updated and is transmitted from the management apparatus via the transmission/reception unit.

22. A management method used in a management apparatus for managing copying of a content from an original recording medium that stores the content thereon to a copy recording medium, the management method comprising:
- a transmission/reception step of receiving title information, a copy-medium identifier, an original-medium identifier and a key group from a copying apparatus and transmitting permission information to the copying apparatus, the title information identifying the content, the original-medium identifier identifying the original recording medium, the copy-medium identifier identifying the copy recording medium, the key group having been read from the copy recording medium, and the permission information indicating permission for the copying of the content;
- a control step of determining whether to permit the copying of the content based on the received title information, the received original-medium identifier and the received copy-medium identifier, and allowing the transmission/reception step to transmit the permission information when determining to permit the copying; and
- a management step of holding a database for storing therein registered title information that identifies a registered content, a registered original-medium identifier that identifies a registered original recording medium and a registered copy-medium identifier that identifies a registered copy recording medium in association with each other,
- wherein the control step comprises determining whether a set of the received title information and the received original-medium identifier matches a set of the registered title information and the registered original-medium identifier stored in the database and whether the received copy-medium identifier matches the registered copy-medium identifier associated with the set stored in the database, and allowing the transmission/reception step to transmit the permission information when determining that the set of the received title information and the received original-medium identifier matches the set of the registered title information and the registered original-medium identifier, and the received copy-medium identifier does not match the registered copy-medium identifier, and
- when a determination is made in the control step that the set of the received title information and the received original-medium identifier matches the set of the registered title information and the registered original-medium identifier, and the received copy-medium identifier does not match the registered copy-medium identifier, the management step comprises registering the received copy-medium identifier into the database in association with the registered title information and the registered original-medium identifier.

23. A copying method used in a copying apparatus for copying a content from an original recording medium that stores the content thereon to a copy recording medium, the copy recording medium storing a copy-medium identifier and key information prior to the copying of the content onto the copy recording medium, the copy-medium identifier identifying the copy recording medium, the copying method comprising:
- a first acquisition step of acquiring an original-medium identifier and title information, the original-medium identifier identifying the original recording medium and the title information identifying the content;
- a second acquisition step of acquiring the copy-medium identifier and the key information from the copy recording medium;
- a transmission/reception step of transmitting the acquired title information, the acquired original-medium identifier, the acquired copy-medium identifier, and the key information to a management apparatus, and receiving permission information from the management apparatus, the permission information indicating permission for the copying of the content;
- a reading step of reading the content from the original recording medium; and
- a writing step of writing the read content onto the copy recording medium, and when receiving the permission information, writing the received permission information onto the copy recording medium.

24. The copying method of claim 23 further comprising:
- a determination step of determining whether the content stored on the original recording medium is for the copying; and
- a control step of causing the transmission/reception step to transmit the acquired original-medium identifier to the management apparatus when the content stored on the original recording medium is determined in the determination step as being for the copying, wherein
- in the transmission/reception step, the acquired original-medium identifier is transmitted to the management apparatus, under control of the control step.

25. The copying method of claim 23 further comprising:
- a determination step of determining whether the content stored on the original recording medium is for the copying and whether the original-medium identifier is stored on the original recording medium;
- a display step of displaying a message for prompting a user to input the original-medium identifier when the content stored on the original recording medium is determined in the determination step as being for the copying and the original-medium identifier is determined in the determination step as not being stored on the original recording medium; and
- an input reception step of receiving the original-medium identifier from the user, wherein
- in the transmission/reception step, the received original-medium identifier is transmitted to the management apparatus.

26. The copying method of claim 23, wherein
the original recording medium stores thereon the original-medium identifier that identifies the original recording medium, and
in the identifier acquisition step, the original-medium identifier is acquired by reading the original-medium identifier from the original recording medium.

27. An integrated circuit included in a management apparatus for managing copying of a content from an original recording medium that stores the content thereon to a copy recording medium, the integrated circuit comprising:
- a transmission/reception circuit configured to receive title information, a copy-medium identifier, an original-medium identifier and a key group from a copying apparatus and to transmit permission information to the copying apparatus, the title information identifying the content, the original-medium identifier identifying the original recording medium, the copy-medium identifier identifying the copy recording medium, the key group having been read from the copy recording medium, and the permission information indicating permission for the copying of the content;

a control circuit configured to determine whether to permit the copying of the content based on the received title information, the received original-medium identifier and the received copy-medium identifier, and to allow the transmission/reception circuit to transmit the permission information when determining to permit the copying; and a management circuit configured to hold a database for storing therein registered title information that identifies a registered content, a registered original-medium identifier that identifies a registered original recording medium and a registered copy-medium identifier that identifies a registered copy recording medium in association with each other, wherein the control circuit determines whether a set of the received title information and the received original-medium identifier matches a set of the registered title information and the registered original-medium identifier stored in the database and whether the received copy-medium identifier matches the registered copy-medium identifier associated with the set stored in the database, and allows the transmission/reception circuit to transmit the permission information when determining that the set of the received title information and the received original-medium identifier matches the set of the registered title information and the registered original-medium identifier, and the received copy-medium identifier does not match the registered copy-medium identifier, and when the control circuit determines that the set of the received title information and the received original-medium identifier matches the set of the registered title information and the registered original-medium identifier, and the received copy-medium identifier does not match the registered copy-medium identifier, the management circuit registers the received copy-medium identifier into the database in association with the registered title information and the registered original-medium identifier.

28. An integrated circuit included in a copying apparatus for copying a content from an original recording medium that stores the content thereon to a copy recording medium, the copy recording medium storing a copy-medium identifier and key information prior to the copying of the content onto the copy recording medium, the copy-medium identifier identifying the copy recording medium, the integrated circuit comprising:

an identifier acquisition circuit configured to acquire an original-medium identifier and title information, the original-medium identifier identifying the original recording medium and the title information identifying the content;

a second acquisition circuit configured to acquire the copy-medium identifier and the key information from the copy recording medium;

a transmission/reception circuit configured to transmit the acquired title information, the acquired original-medium identifier, the acquired copy-medium identifier, and the key information to a management apparatus, and to receive permission information from the management apparatus, the permission information indicating permission for the copying of the content;

a reading circuit configured to read the content from the original recording medium; and a writing circuit configured to write the read content onto the copy recording medium, and when receiving the permission information, to write the received permission information onto the copy recording medium.

29. A non-transitory computer-readable program recording medium storing thereon a management computer program used in a management apparatus for managing copying of a content from an original recording medium that stores the content thereon to a copy recording medium, the management computer program causing a computer to perform:

a transmission/reception step of receiving title information, a copy-medium identifier, an original-medium identifier and a key group from a copying apparatus and transmitting permission information to the copying apparatus, the title information identifying the content, the original-medium identifier identifying the original recording medium, the copy-medium identifier identifying the copy recording medium, the key group having been read from the copy recording medium, and the permission information indicating permission for the copying of the content;

a control step of determining whether to permit the copying of the content based on the received title information, the received original-medium identifier and the received copy-medium identifier, and allowing the transmission/reception step to transmit the permission information when determining to permit the copying; and a management step of holding a database for storing therein registered title information that identifies a registered content, a registered original-medium identifier that identifies a registered original recording medium and a registered copy-medium identifier that identifies a registered copy recording medium in association with each other, wherein the control step comprises determining whether a set of the received title information and the received original-medium identifier matches a set of the registered title information and the registered original-medium identifier stored in the database and whether the received copy-medium identifier matches the registered copy-medium identifier associated with the set stored in the database, and allowing the transmission/reception step to transmit the permission information when determining that the set of the received title information and the received original-medium identifier matches the set of the registered title information and the registered original-medium identifier, and the received copy-medium identifier does not match the registered copy-medium identifier, and when a determination is made in the control step that the set of the received title information and the received original-medium identifier matches the set of the registered title information and the registered original-medium identifier, and the received copy-medium identifier does not match the registered copy-medium identifier, the management step comprises registering the received copy-medium identifier into the database in association with the registered title information and the registered original-medium identifier.

30. A non-transitory computer-readable program recording medium storing thereon a copying computer program used in a copying apparatus for copying a content from an original recording medium that stores the content thereon to a copy recording medium, the copy recording medium storing a copy-medium identifier and key information prior to the copying of the content onto the copy recording medium, the copy-medium identifier identifying the copy recording medium, the copying computer program causing a computer to perform:

a first acquisition step of acquiring an original-medium identifier and title information, the original-medium identifier identifying the original recording medium and the title information identifying the content;

a second acquisition step of acquiring the copy-medium identifier and the key information from the copy recording medium;

a transmission/reception step of transmitting the acquired title information, the acquired original-medium identifier, the acquired copy-medium identifier, and the key information to a management apparatus, and receiving permission information from the management apparatus, the permission information indicating permission for the copying of the content;

a reading step of reading the content from the original recording medium; and a writing step of writing the read content onto the copy recording medium, and when receiving the permission information, writing the received permission information onto the copy recording medium.

31. An information copying system that includes (i) a management apparatus for managing copying of a content from an original recording medium that stores the content thereon to a copy recording medium, the copy recording medium storing a copy-medium identifier and key information prior to the copying of the content onto the copy recording medium, the copy-medium identifier identifying the copy recording medium, and (ii) a copying apparatus for copying the content, the management apparatus comprising:

a transmission/reception unit configured to receive title information, the copy-medium identifier, an original-medium identifier and a key group from the copying apparatus and to transmit permission information to the copying apparatus, the title information identifying the content, the original-medium identifier identifying the original recording medium, the key group having been read from the copy recording medium, and the permission information indicating permission for the copying of the content;

a control unit configured to determine whether to permit the copying of the content based on the received title information, the received original-medium identifier and the received copy-medium identifier, and to allow the transmission/reception unit to transmit the permission information when determining to permit the copying; and a management unit configured to hold a database for storing therein registered title information that identifies a registered content, a registered original-medium identifier that identifies a registered original recording medium and a registered copy-medium identifier that identifies a registered copy recording medium in association with each other, wherein the control unit determines whether a set of the received title information and the received original-medium identifier matches a set of the registered title information and the registered original-medium identifier stored in the database and whether the received copy-medium identifier matches the registered copy-medium identifier associated with the set stored in the database, and allows the transmission/reception unit to transmit the permission information when determining that the set of the received title information and the received original-medium identifier matches the set of the registered title information and the registered original-medium identifier, and the received copy-medium identifier does not match the registered copy-medium identifier, and when the control unit determines that the set of the received title information and the received original-medium identifier matches the set of the registered title information and the registered original-medium identifier, and the received copy-medium identifier does not match the registered copy-medium identifier, the management unit registers the received copy-medium identifier into the database in association with the registered title information and the registered original-medium identifier, and the copying apparatus comprising:

a first acquisition unit configured to acquire the original-medium identifier and the title information;

a second acquisition unit configured to acquire the copy-medium identifier and the key information from the copy recording medium;

a transmission/reception unit configured to transmit the acquired title information, the acquired original-medium identifier, the acquired copy-medium identifier, and the key information to the management apparatus, and to receive the permission information from the management apparatus;

a reading unit configured to read the content from the original recording medium; and a writing unit configured to write the read content onto the copy recording medium, and when receiving the permission information, to write the received permission information onto the copy recording medium.

32. The management apparatus of claim 1, wherein when allowing the transmission/reception unit to transmit the permission information, the control unit generates a media unique key from a media key extracted from the received key group, encrypts a title key with the generated media unique key, and transmits the encrypted title key to the copying apparatus.

* * * * *